United States Patent
Soundararajan

(10) Patent No.: US 11,706,329 B2
(45) Date of Patent: Jul. 18, 2023

(54) SYSTEM, METHOD, AND ARTICLE OF MANUFACTURE TO CONTINUOUSLY PROVIDE A GLIMPSE INTO A NAVIGATION APPLICATION RUNNING IN THE BACKGROUND OF THE MOBILE DEVICE THAT IS IN A SCREEN LOCKED STATE

(71) Applicant: RAID ONE IP LLC, Tampa, FL (US)

(72) Inventor: Ramraj Soundararajan, Tampa, FL (US)

(73) Assignee: RAID ONE IP LLC, Tampa, FL (US)

( * ) Notice: Subject to any disclaimer, the term of this patent is extended or adjusted under 35 U.S.C. 154(b) by 0 days.

(21) Appl. No.: 17/963,184

(22) Filed: Oct. 10, 2022

(65) Prior Publication Data
US 2023/0034256 A1 Feb. 2, 2023

Related U.S. Application Data

(63) Continuation of application No. 17/176,160, filed on Feb. 15, 2021, now Pat. No. 11,470,193, which is a
(Continued)

(51) Int. Cl.
*H04W 4/00* (2018.01)
*H04M 1/67* (2006.01)
(Continued)

(52) U.S. Cl.
CPC ......... *H04M 1/67* (2013.01); *H04M 1/72403* (2021.01); *H04W 4/023* (2013.01); *H04W 4/18* (2013.01)

(58) Field of Classification Search
CPC ... H04W 4/18; H04W 4/023; H04M 1/72403; H04M 1/67
See application file for complete search history.

(56) References Cited

U.S. PATENT DOCUMENTS

| 8,156,128 B2 | 4/2012 | Ramer et al. |
| 8,230,016 B1 | 7/2012 | Pattan et al. |

(Continued)

FOREIGN PATENT DOCUMENTS

| EP | 2428906 A1 | 3/2012 |
| GB | 2491220 A | 11/2012 |

(Continued)

OTHER PUBLICATIONS

S. Aguinaga et al., "Method for Privacy-Protecting Display and Exchange of Emergency Information on Mobiles Devices," 2012 International Conference on Collaboration Technologies and Systems (CTS), May 21-25, 2012, Denver, CO, 4pgs.

(Continued)

*Primary Examiner* — Omoniyi Obayanju
(74) *Attorney, Agent, or Firm* — IP Authority, LLC

(57) ABSTRACT

A navigation application running in the foreground of the mobile device is run in the background when the mobile device enters a screen locked state. A display may be activated while the mobile device remains in the screen locked state, and an image is rendered over a lock screen of the mobile device, where the image providing a glimpse into the navigation application running in the background while the mobile device remains in the screen locked state. The image displayed over the lock screen is iteratively updated to provide a continuous glimpse into the navigation application running in the background of the mobile device that is in the screen locked state, without having to unlock the mobile device.

26 Claims, 60 Drawing Sheets

Related U.S. Application Data continuation of application No. 16/012,759, filed on Jun. 19, 2018, now Pat. No. 10,924,600, which is a continuation of application No. 15/912,453, filed on Mar. 5, 2018, now Pat. No. 10,015,301, which is a continuation of application No. 14/280,555, filed on May 16, 2014, now Pat. No. 9,912,795.

(51) Int. Cl.
*H04M 1/72403* (2021.01)
*H04W 4/18* (2009.01)
*H04W 4/02* (2018.01)

(56) References Cited

U.S. PATENT DOCUMENTS

| | | | |
|---|---|---|---|
| 8,412,158 | B2 | 4/2013 | Forutanpour et al. |
| 8,660,965 | B1 | 2/2014 | Bickerstaff |
| 8,666,895 | B2 | 3/2014 | Grigg et al. |
| 8,676,273 | B1 | 3/2014 | Fujisaki |
| 8,688,492 | B2 | 4/2014 | Kruglick |
| 8,910,274 | B2 | 12/2014 | Sanders |
| 8,914,875 | B2 | 12/2014 | Matus |
| 2004/0267663 | A1 | 12/2004 | Karns |
| 2006/0160617 | A1 | 7/2006 | Hansen et al. |
| 2007/0069946 | A1* | 3/2007 | Kaplan ............ H04M 1/72427 455/456.3 |
| 2007/0300063 | A1 | 12/2007 | Adams |
| 2008/0248815 | A1 | 10/2008 | Busch |
| 2009/0119527 | A1 | 5/2009 | Kim |
| 2009/0201126 | A1 | 8/2009 | Ikeguchi |
| 2009/0307139 | A1 | 12/2009 | Mardikar |
| 2010/0125509 | A1 | 5/2010 | Kranzley |
| 2010/0330953 | A1 | 12/2010 | Rogel |
| 2011/0251910 | A1 | 10/2011 | Dimmick |
| 2012/0011561 | A1 | 1/2012 | Courtney et al. |
| 2012/0054046 | A1 | 3/2012 | Albisu |
| 2012/0060123 | A1 | 3/2012 | Smith |
| 2012/0095911 | A1 | 4/2012 | Ibasco et al. |
| 2012/0185066 | A1 | 7/2012 | Kern et al. |
| 2012/0185398 | A1 | 7/2012 | Weis |
| 2012/0197743 | A1 | 8/2012 | Grigg et al. |
| 2012/0223890 | A1 | 9/2012 | Borovsky et al. |
| 2012/0233571 | A1 | 9/2012 | Wever |
| 2012/0284789 | A1* | 11/2012 | Kim ..................... H04W 4/021 726/19 |
| 2013/0031623 | A1 | 1/2013 | Sanders |
| 2013/0050250 | A1 | 2/2013 | Brinda et al. |
| 2013/0069962 | A1 | 3/2013 | Nealer et al. |
| 2013/0080964 | A1 | 3/2013 | Shigeta |
| 2013/0082945 | A1 | 4/2013 | Jo |
| 2013/0110678 | A1 | 5/2013 | Vigier et al. |
| 2013/0256403 | A1 | 10/2013 | Keith |
| 2013/0282193 | A1 | 10/2013 | Tyagi et al. |
| 2014/0033273 | A1 | 1/2014 | Rathburn |
| 2014/0040035 | A1 | 2/2014 | Cusack |
| 2014/0058862 | A1 | 2/2014 | Celkonas |
| 2014/0189578 | A1 | 7/2014 | Shuttleworth et al. |
| 2014/0244507 | A1 | 8/2014 | Udd |
| 2014/0267064 | A1 | 9/2014 | Lu |
| 2014/0289683 | A1 | 9/2014 | Park |
| 2014/0304280 | A1 | 10/2014 | Oursbourn |
| 2014/0310174 | A1 | 10/2014 | Heeter |
| 2014/0323121 | A1 | 10/2014 | Kim et al. |
| 2014/0380464 | A1* | 12/2014 | Lee ..................... G06F 3/04883 726/19 |
| 2018/0130548 | A1 | 5/2018 | Fisher |

FOREIGN PATENT DOCUMENTS

| | | |
|---|---|---|
| WO | 2012072808 A1 | 6/2012 |
| WO | 2013177391 A2 | 12/2012 |

OTHER PUBLICATIONS

A. Ajadaan et al., "QR-Codes for the Chronically Homeless," CHI 2008 Proceedings—Student Design Competition, Apr. 5-10, 2008, Florence, Italy, pp. 3879-3883.

"Apple buys into fingerprint recognition with AuthenTec deal," biometric Technology, Sep. 2012, 1pg.

L. Beighley, "Visual Quickstart Guide iPhone 5: Chapter 4: Using Your iPhone as a Phone," Peachpit Press, 31 pgs.

T. Caldwell, "Locking down the e-wallet," Computer Fraud & Security, Apr. 2012, pp. 5-8.

A. Formiga et al., "An Assessment of Data Matrix Barcode Recognition under Scaling, Rotation and Cylindrical Warping," SACC'11, Mar. 21-25, 2011, TaiChung, Taiwan, pp. 266-267.

T. Hao et al., "COBRA: Color Barcode Streaming for Smartphone Systems," MobiSys'12, Jun. 25-29, 2012, Low Wood Bay, Lake District, UK, pp. 85-97.

T. Hao et al., "Demo: A Barcode Streaming System for Smartphones," MobiSys'12, Jun. 25-29, 2012, Low Wood Bay, Lake District, UK, p. 451.

R. Kemp, "Mobile payments: Current and emerging regulatory and contracting issues," Computer Law & Security Review, v29, 2013, pp. 175-179.

A. Kemshall, "Why mobile two-factor authentication makes sense," Network Security, Apr. 2011, pp. 9-12.

Y. Kristian et al., "Utilizing GPS and SMS for Tracking and Security Lock Application on Android Based Phone," Procedia—Social and Behavioral Sciences, v57, 2012, pp. 299-305.

R. Law, "Using Quick Response Codes for Student Interaction During Lectures," ITiCSE'12, Jul. 3-5, 2012, Haifa, Israel, p. 401.

P. Ljungstrand et al., "WebStickers: Using Physical Objects as WWW Bookmarks," CHI 99, May 15-20, 1999, pp. 332-333.

T. Rosa, "NFC on Mobile: On the Real Security of Mobile Payments," CARDS 2012, Oct. 16-17, 2012, Prague, Czech Republic, 95 pgs.

T. Rosa, "Mobile Devices Security: On Practical Risks of NFC Payments," Mobile Payments 2012, Prague, Czech Republic, 51 pgs.

"QUALCOMM Incorporated; Patent Issued for Mobile Device Having Increased Security That is Less Obtrusive," Computer Weekly News, 1676, Apr. 18, 2013, 3 pgs.

* cited by examiner

FIG. 3 accessing a profile and identifying at least one application for which an application screen dump is to be generated while the mobile device is in a screen locked state and while the at least one application is running on the mobile device
1402 identifying the mobile device is about to enter the screen locked state
1404 generating an application screen dump of the identified at least one application running on the mobile device, the application screen dump generated automatically by the mobile device just prior to the mobile device being placed in the screen locked state
1406 placing the mobile device in the screen locked state and updating the lock screen wallpaper of the mobile device with the generated application screen dump of the identified at least one application
1408 activating a display of the mobile device and rendering the application screen dump of the identified at least one application running on the mobile device as the lock screen wallpaper on the activated display of the mobile device which remains in the screen locked state
1410

FIG. 14 accessing a first image, the first image associated with a first GPS location
4802 identifying location of the mobile device as being within a first pre-determined radius of the first GPS location
4804 while the mobile device is within the first pre-determined radius of the first GPS location and while the mobile device is in a screen locked state, temporarily replacing the previously set lock screen wallpaper with the first image associated with the first GPS location and leaving the previously set home screen wallpaper unchanged
4806 while the mobile device is within the first pre-determined radius of the first GPS location and while the mobile device is in the screen locked state, activating a display of the mobile device for a first pre-determined time period and rendering, during the pre-determined time period, the temporarily replaced image as the lock screen wallpaper on the activated display of the mobile device
4808

FIG. 48 receiving a first image and second image, both the first image and second image associated with a first GPS location
5002 identifying location of the mobile device as being within a first pre-determined radius of the first GPS location and outside a second pre-determined radius of the first GPS location
5004 while the mobile device is within the first pre-determined radius of the first GPS location and outside the second pre-determined radius of the first GPS location and while the mobile device is in a screen locked state, temporarily replacing the previously set lock screen wallpaper with the first image associated with the first GPS location and leaving the previously set home screen wallpaper unchanged
5006 while the mobile device is within the first pre-determined radius of the first GPS location and outside the second pre-determined radius of the first GPS location and while the mobile device is in the screen locked state, activating a display of the mobile device for a first pre-determined time period and rendering, during the first pre-determined time period, the first image as the lock screen wallpaper on the activated display of the mobile device
5008 identifying location of the mobile device as being within a first pre-determined radius of the first GPS location and inside a second pre-determined radius of the first GPS location
5010 while the mobile device is within the first pre-determined radius of the first GPS location and inside the second pre-determined radius of the first GPS location and while the mobile device is in a screen locked state, temporarily replacing lock screen wallpaper with the second image associated with the first GPS location and leaving the previously set home screen wallpaper unchanged
5012 while the mobile device is within the first pre-determined radius of the first GPS location and inside the second pre-determined radius of the first GPS location and while the mobile device is in the screen locked state, activating a display of the mobile device for a second pre-determined time period and rendering, during the second pre-determined time period, the second image as the lock screen wallpaper on the activated display of the mobile device
5014

FIG. 50A accessing a first image and second image, both the first image and second image associated with a first GPS location
5102

↓ identifying location of the mobile device as being within a first pre-determined radius of the first GPS location and outside a second pre-determined radius of the first GPS location
5104

↓ while the mobile device is within the first pre-determined radius of the first GPS location and outside the second pre-determined radius of the first GPS location and while the mobile device is in a screen locked state, temporarily replacing the previously set lock screen wallpaper with the first image associated with the first GPS location and leaving the previously set home screen wallpaper unchanged
5106

↓ while the mobile device is within the first pre-determined radius of the first GPS location and outside the second pre-determined radius of the first GPS location and while the mobile device is in the screen locked state, activating a display of the mobile device for a first pre-determined time period and rendering, during the first pre-determined time period, the first image as the lock screen wallpaper on the activated display of the mobile device
5108

↓ identifying location of the mobile device as being within a first pre-determined radius of the first GPS location and inside a second pre-determined radius of the first GPS location
5110

↓ while the mobile device is within the first pre-determined radius of the first GPS location and inside the second pre-determined radius of the first GPS location and while the mobile device is in a screen locked state, temporarily replacing lock screen wallpaper with the second image associated with the first GPS location and leaving the previously set home screen wallpaper unchanged
5112

↓ while the mobile device is within the first pre-determined radius of the first GPS location and inside the second pre-determined radius of the first GPS location and while the mobile device is in the screen locked state, activating a display of the mobile device for a second pre-determined time period and rendering, during the second pre-determined time period, the second image as the lock screen wallpaper on the activated display of the mobile device
5114

FIG. 51A

SYSTEM, METHOD, AND ARTICLE OF MANUFACTURE TO CONTINUOUSLY PROVIDE A GLIMPSE INTO A NAVIGATION APPLICATION RUNNING IN THE BACKGROUND OF THE MOBILE DEVICE THAT IS IN A SCREEN LOCKED STATE

RELATED APPLICATIONS

This application is a continuation of U.S. application Ser. No. 17/176,160, filed Feb. 15, 2021, pending, which is a continuation of U.S. application Ser. No. 16/012,759 filed Jun. 19, 2018, issued as U.S. Pat. No. 10,924,600, which is a continuation of U.S. application Ser. No. 15/912,453 filed Mar. 5, 2018, issued as U.S. Pat. No. 10,015,301, which is a continuation of U.S. application Ser. No. 14/280,555 filed May 16, 2014 issued as U.S. Pat. No. 9,912,795.

BACKGROUND OF THE INVENTION

Field of Invention

The present invention relates generally to mobile devices. More specifically, the present invention is related to a system, method, and article of manufacture to continuously provide a glimpse into a navigation application running in the background of the mobile device that is in a screen locked state.

Discussion of Related Art

Current generation mobile devices (e.g., mobile phones, tablets, smart phones, etc.) have a home screen wallpaper and a lock screen wallpaper, where the lock screen wallpaper is rendered as the background of the mobile device that is in a screen locked state, should the display be activated by a user input, for example. These wall papers are static images that are either set by the manufacturer or may be set by the user of such a device. However, the prior art is silent on how to leverage the lock screen wallpaper to display information that is pertinent to the user of the mobile device.

Embodiments of the present invention are an improvement over prior art systems and methods.

SUMMARY OF THE INVENTION

In one embodiment, the present invention provides an article of manufacture having a non-transitory computer readable storage medium comprising computer readable program code executable by a processor in a mobile device configured to run applications in either a foreground or a background, the non-transitory computer readable storage medium comprising: (a) computer readable program code running a navigation application in the foreground while the mobile device is not in a screen locked state; (b) computer readable program code running another application in the foreground after placing the navigation application in the background while the mobile device is not in the screen locked state; (c) computer readable program code receiving an input to place the mobile device in the screen locked state and responsive to the input, running both the navigation application and the another application in the background, wherein the another application running in the background is a last run application in the mobile device and the navigation application running in the background is not the last run application in the mobile device; (d) computer readable program code accessing a profile storing at least one preference associated with the mobile device, the at least one preference in the profile identifying the navigation application running in the background for which a glimpse is to be provided when the mobile device is in the screen locked state even when the navigation application is not the last run application in the mobile device; (e) computer readable program code activating a display of the mobile device while the mobile device remains in the screen locked state; (f) computer readable program code rendering a first image on the display of the mobile device in the screen locked state when the mobile device is located within a first pre-determined radius, of a first GPS location but not in an overlap region between the first pre-determined radius of the first GPS location and a second pre-determined radius of a second GPS location, the first image providing the glimpse of the navigation application running in the background of the mobile device when the mobile device is at the first GPS location; (g) computer readable program code rendering a second image on the display of the mobile device in the screen locked state when the mobile device is located in the overlap region, the second image providing the glimpse of the navigation application running in the background of the mobile device when the mobile device is in the overlap region; (h) computer readable program code rendering a third image on the display of the mobile device in the screen locked state when the mobile device is located within the second-pre-determined radius of the second GPS location but not in the overlap region, the third image providing the glimpse of the navigation application running in the background of the mobile device when the mobile device is at the second GPS location; and wherein the first, second, and third images provide a continuous glimpse into the navigation application identified by the at least one preference stored in the profile even though the navigation application was not the last run application in the mobile device and even though the mobile device remains in the screen locked state.

In another embodiment, the present invention provides a mobile device comprising: a processor; a display; storage storing computer readable programmable code executable by a processor in a mobile device, the mobile device configured to run applications in either a foreground or a background, the storage comprising: (a) computer readable program code running a navigation application in the foreground while the mobile device is not in a screen locked state; (b) computer readable program code running another application in the foreground after placing the navigation application in the background while the mobile device is not in the screen locked state; (c) computer readable program code receiving an input to place the mobile device in the screen locked state and responsive to the input, running both the navigation application and the another application in the background, wherein the another application running in the background is a last run application in the mobile device and the navigation application running in the background is not the last run application in the mobile device; (d) computer readable program code accessing a profile storing at least one preference associated with the mobile device, the at least one preference in the profile identifying the navigation application running in the background for which a glimpse is to be provided when the mobile device is in the screen locked state even when the navigation application is not the last run application in the mobile device; (e) computer readable program code activating a display of the mobile device while the mobile device remains in the screen locked state; (f) computer readable program code rendering a first image on the display of the mobile device in the screen locked state when the mobile device is located within a first pre-determined radius, of a first GPS location but not in an overlap region between the first pre-determined radius of the first GPS location and a second pre-determined radius of a second GPS location, the first image providing the glimpse of the navigation application running in the background of the mobile device when the mobile device is at the first GPS location; (g) computer readable program code rendering a second image on the display of the mobile device in the screen locked state when the mobile device is located in the overlap region, the second image providing the glimpse of the navigation application running in the background of the mobile device when the mobile device is in the overlap region; (h) computer readable program code rendering a third image on the display of the mobile device in the screen locked state when the mobile device is located within the second-pre-determined radius of the second GPS location but not in the overlap region, the third image providing the glimpse of the navigation application running in the background of the mobile device when the mobile device is at the second GPS location; and wherein the first, second, and third images provide a continuous glimpse into the navigation application identified by the at least one preference stored in the profile even though the navigation application was not the last run application in the mobile device and even though the mobile device remains in the screen locked state.

BRIEF DESCRIPTION OF THE DRAWINGS

FIG. 3 depicts of a non-limiting example of what is rendered on the display of a mobile device when an application for taking electronic notes is active in the foreground of the mobile device.

FIG. 14 depicts another embodiment where the lock screen wallpaper of a mobile device is replaced with an application screen dump of a running application based on a profile, where the application screen dump is generated just prior to the mobile device being placed in a screen locked state.

FIG. 48 depicts another embodiment where at least a first and second image are used as lock screen wallpapers while a mobile device is within a first and second pre-determined radius of a first and second GPS location, respectively.

FIGS. 50A-B depict another embodiment where at least a first and second received images are used as lock screen wallpapers while a mobile device is within a first and second pre-determined radius of a given GPS location, where the second pre-determined radius is within the first pre-determined radius.

FIGS. 51A-B depict another embodiment where at least a first and second accessed images are used as lock screen wallpapers while a mobile device is within a first and second pre-determined radius of a given GPS location, where the second pre-determined radius is within the first pre-determined radius.

DESCRIPTION OF THE PREFERRED EMBODIMENTS

Figure 1:
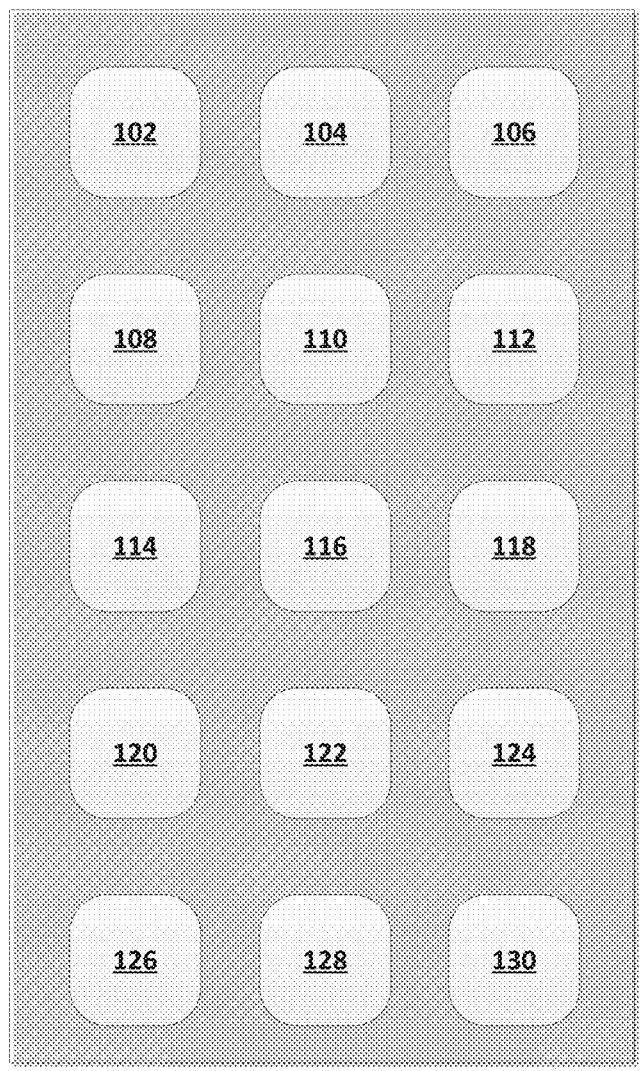
FIG. 1 depicts a non-limiting example of a display of a mobile device showing various application icons.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Current generation mobile devices (e.g., mobile phones, tablets, smart phones, etc.) have a home screen wallpaper and a lock screen wallpaper, where the lock screen wallpaper is rendered as the background of the mobile device that is in a screen locked state, should the display be activated by a user input, for example. The present invention makes the lock screen wallpaper dynamically replaceable so that various data of interest may be rendered as the lock screen wallpaper, where a user is able to review such data of interest without unlocking the mobile device. The lock screen wallpaper may be temporarily replaced so that the user of the mobile device in such a screen lock state can activate just the display and, without unlocking the mobile device, review information that has now been rendered as the lock screen wallpaper. This is a simple and efficient process, as the screen of the mobile device is temporarily leased, in a sense, to render the necessary information as the lock screen wallpaper image (without the need of another application that is to be run on top of the lock screen wallpaper to render such information), where after the expiration of a brief time-period (just a few seconds, for example), the default lock screen wallpaper may be reinstated (for example, in the instance where the user has picked a default lock screen wallpaper picked as part of his/her profile, the present invention may return the lock screen wallpaper image to this default).

In the prior art, when the display of a mobile device times out due to, for example, a lack of inputs from a user, the mobile device enters a screen locked state, whereby the user would have to unlock the screen of mobile device by, for example, sliding a unlock bar (and in some instances, may also have to enter a passcode or other authentication means prior to device being unlocked), in order to look at an application that is either the last run application (i.e., the last application that was running prior to the mobile device entering the screen lock state) or another application that is running in the background of the mobile device. In one aspect, the present invention aids the user by allowing him/her to glimpse at the application that was last running prior to entering the screen locked state or any application that is running in the background of a mobile device in the screen locked state by rendering a screen dump or screenshot of the application (or a portion of a screen dump or screenshot of the application) as the lock screen wallpaper.

Figure 2:
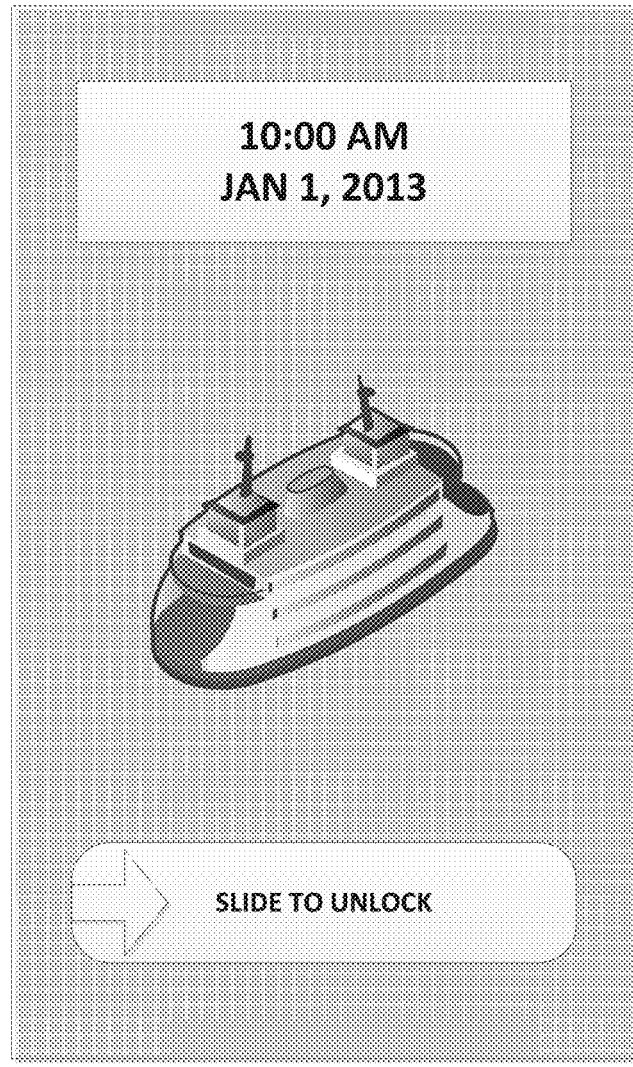
FIG. 2 depicts a non-limiting example of a screen locked phone.
Figure 3:
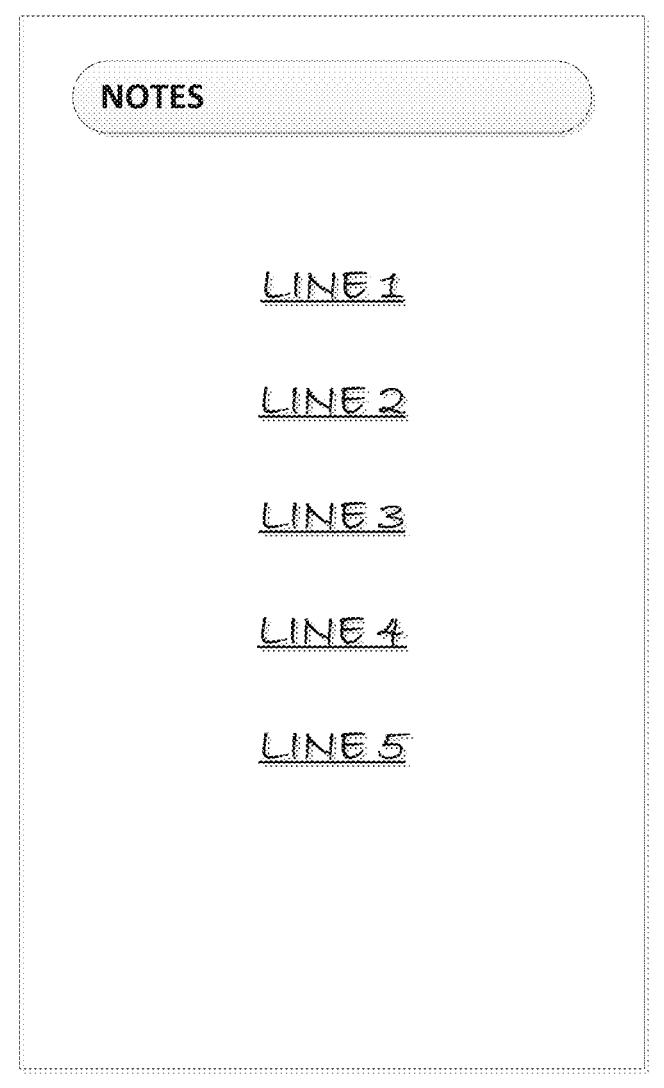
Figure 4:
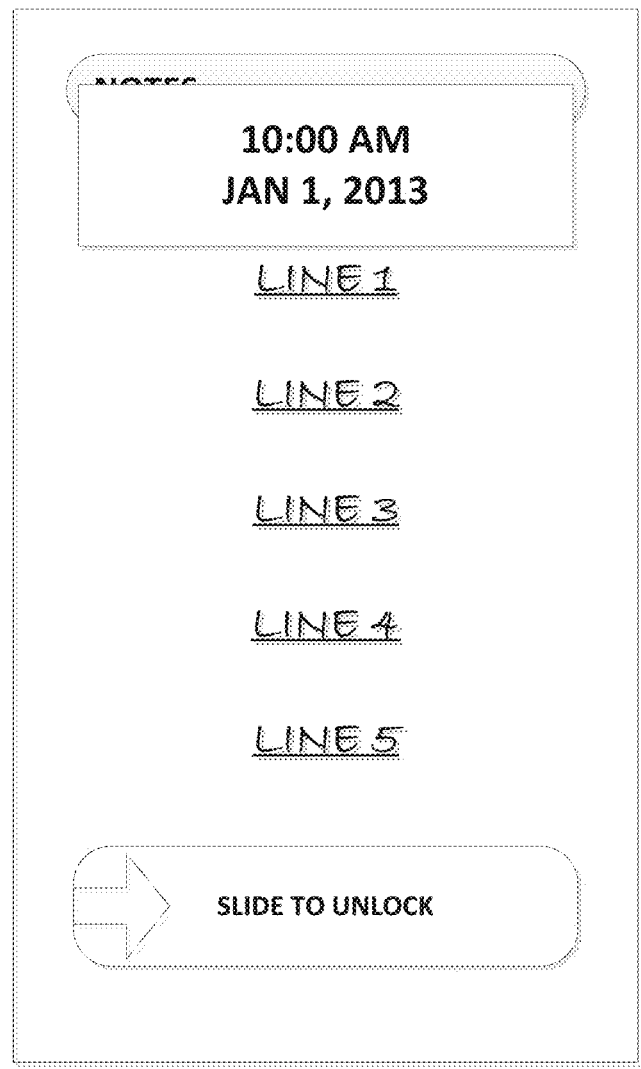
FIG. 4 shows one example implementation where the lock screen wallpaper is replaced with a screen dump or a screenshot of the notes application.
Figure 5:
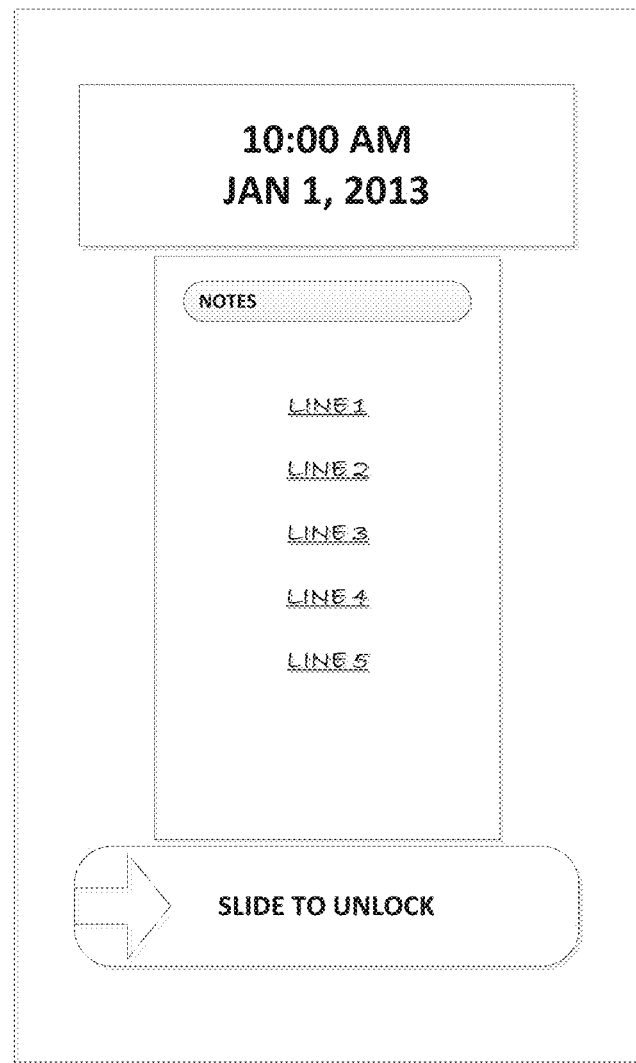
FIG. 5 illustrates another implementation with a scaled screen dump or screenshot of the notes application.

FIG. 1 depicts a non-limiting example of a display of a mobile device showing various application icons 102 through 130. FIG. 2 depicts a non-limiting example of a screen locked phone (screen locked, for example, after the expiration of a time period, within which no user input, such as touch input, was received). The display shown in FIG. 2 denotes a default lock screen wallpaper rendered as part of the lock screen, where the default lock screen was either previously set by the manufacturer of the mobile device or was previously set by the user of the mobile device. FIG. 3 depicts of a non-limiting example of what is rendered on the display of a mobile device when an application for taking electronic notes is active in the foreground of the mobile device. The user may write electronic notes or review electronic notes via such an application. While this application is active and in the foreground of the mobile device, but the mobile device does not receive a user input (e.g., when the user does not touch the display or when the mobile device detects that there is no indication of the user reading the screen, where the user may be distracted away from the mobile device) for a pre-determined time period which is usually a few seconds (but can be programmed to be any length of time), the mobile device enters a screen locked state. FIG. 4 shows one example implementation of the invention, where either upon entering the screen locked state or just prior to entering the screen locked state, a screen dump or a screenshot of the notes application is generated, with the lock screen wallpaper being temporarily replaced with the screen dump of the notes application. Now, when the user activates the display while in the screen locked stated, the display renders what is shown in FIG. 4 (i.e., instead of the default lock screen wallpaper as shown in FIG. 2, the screen dump or screen shot of the notes application is shown for a short time period (which is adjustable by the user), after which it may be replaced with the default lock screen wallpaper). While FIG. 4 shows the raw image being used as the lock screen wallpaper, there is an option to scale the screen dump or screenshot so that it is shown without obstruction by other graphical items (such as the clock/date information or the slider for unlocking) on the display. Such an example is shown in FIG. 5.

Figure 6:
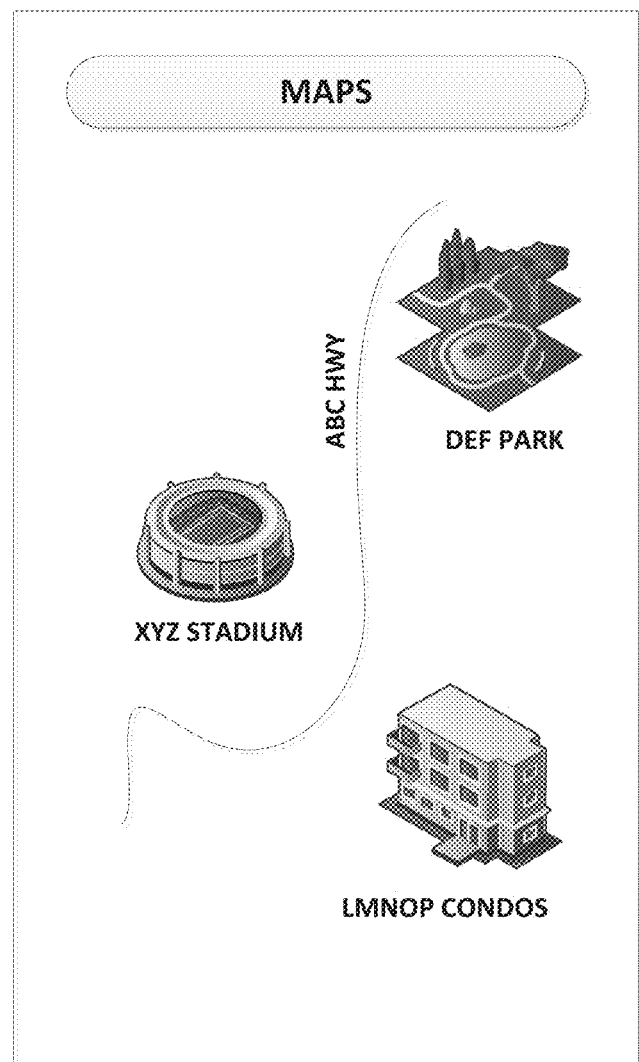
FIG. 6 depicts a non-limiting example of what is rendered on the display of a mobile device when a navigation application is active in the foreground of the mobile device.
Figure 7:
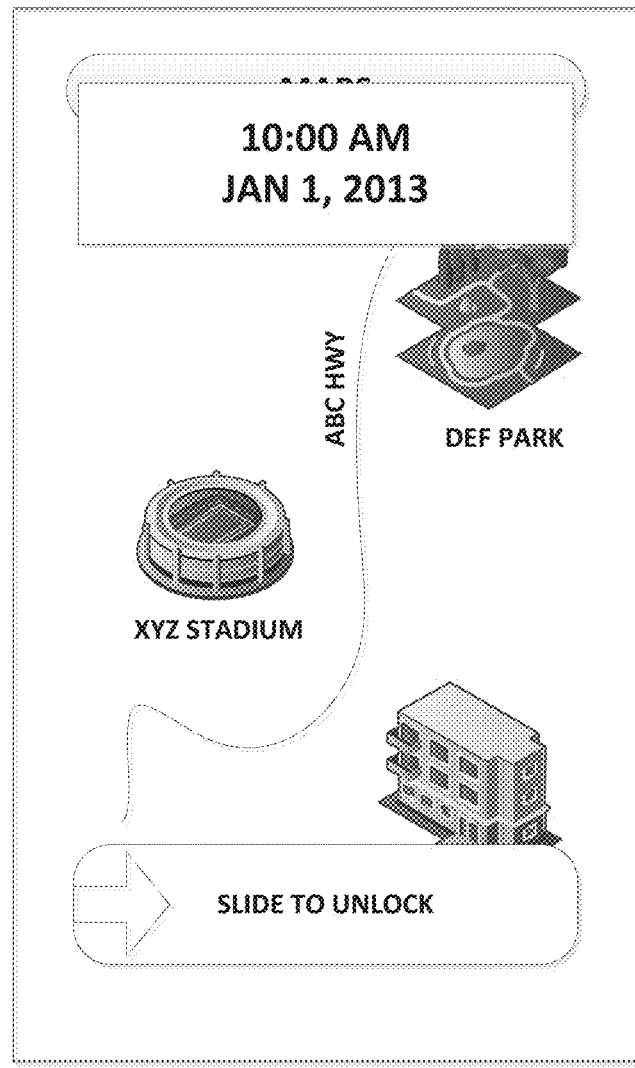
FIG. 7 shows another example implementation where the lock screen wallpaper is replaced with a screen dump or a screenshot of the navigation application.
Figure 8:
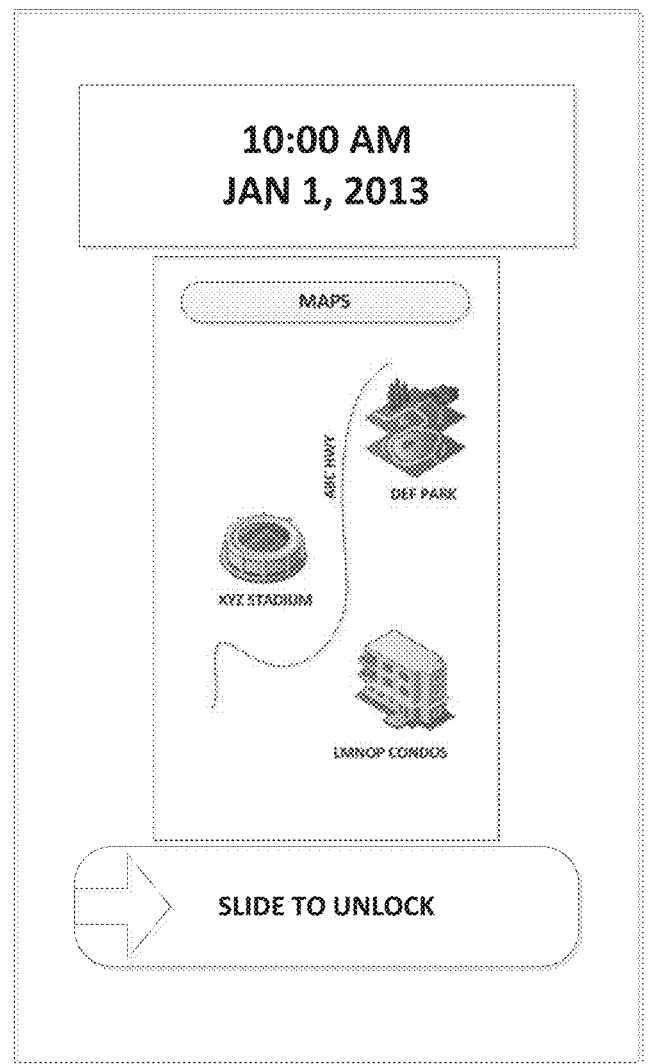
FIG. 8 illustrates another implementation with a scaled screen dump or screenshot of the navigation application.

FIG. 6 depicts another non-limiting example of what is rendered on the display of a mobile device when a navigation application is active in the foreground of the mobile device. The user may use such a navigation application to obtain directions to a destination while traveling. While this navigation application is active and in the foreground of the mobile device, and the mobile device does not receive a user input (e.g., when the user does not touch the display or when the mobile device detects that there is no indication of the user reading the screen, where the user may be distracted away from the mobile device) for a pre-determined time period, which is usually a few seconds (but can be set to be any length of time), the mobile device enters a screen locked state. FIG. 7 shows one example implementation of the invention where either upon entering the screen locked state or just prior to entering the screen locked state, a screen dump or a screenshot of the navigation application is generated, where the lock screen wallpaper is temporarily replaced with the screen dump of the navigation application, where when the user activates the display while in the screen locked stated, the display renders what is shown in FIG. 7 (i.e., instead of the default lock screen wallpaper as shown in FIG. 2, the screen dump or screen shot of the notes application is shown for a short time period (which is adjustable by the user), after which it may be replaced with the default lock screen wallpaper). While FIG. 7 shows the raw image being used as the lock screen wallpaper, there is an option to scale the screen dump or screenshot so that it is shown without obstruction by other objects on the display. Such an example is shown in FIG. 8.

Figure 9:
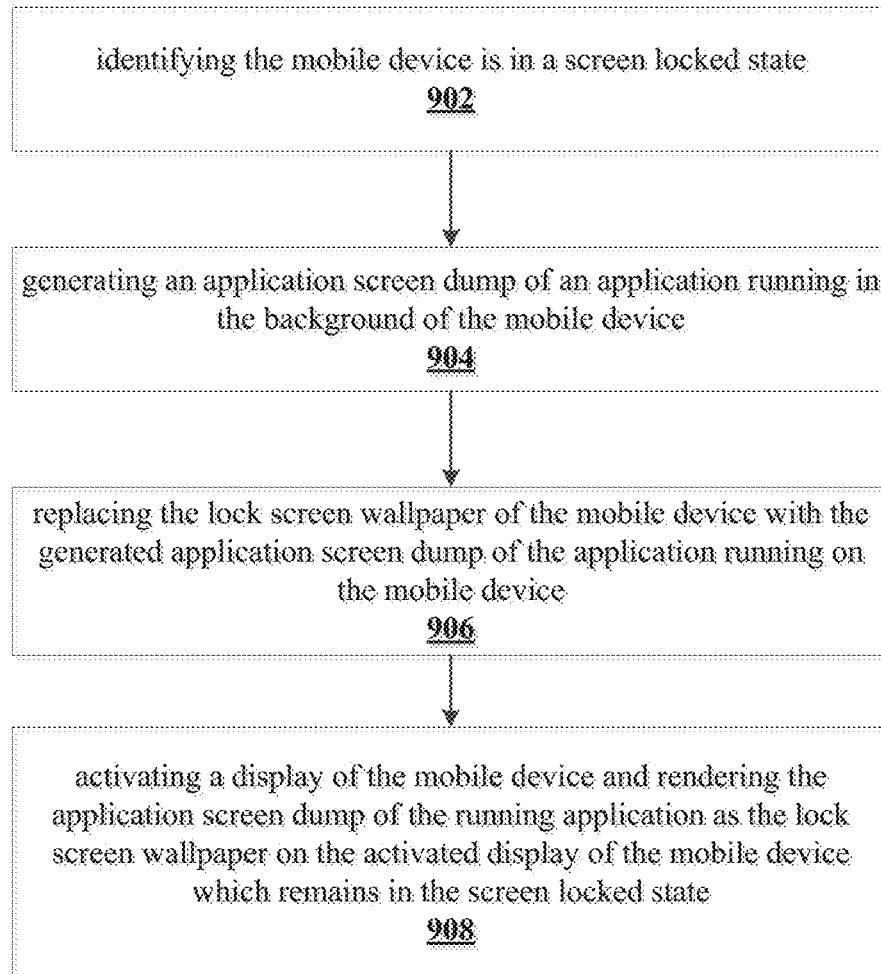
FIG. 9 depicts one embodiment where the lock screen wallpaper of a mobile device is replaced with an application screen dump of a running application.

In one embodiment, as shown in FIG. 9, the present invention discloses a method as implemented in a mobile device having a dynamically replaceable lock screen wallpaper, the method comprising: identifying the mobile device is in a screen locked state—step 902; generating an application screen dump of an application running in the background of the mobile device—step 904, where the screen dump represents a screenshot of the application (or a portion of the screenshot) as if it were running in foreground of the mobile device (even though it is not) and the application screen dump is generated automatically by the mobile device while it is in the screen locked state; replacing the lock screen wallpaper of the mobile device with the generated application screen dump of the application running on the mobile device—step 906; activating a display of the mobile device and rendering the application screen dump of the running application as the lock screen wallpaper on the activated display of the mobile device which remains in the screen locked state—step 908; and wherein the generated application screen dump used as the lock screen wallpaper of the mobile device providing a glimpse into the application running in the background of the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 9.

In an extended embodiment, the method further comprises receiving an input, the input triggering the activation of the display of the mobile device which remains in the screen locked state. For example, while the mobile device is in a screen locked state, the user may depress any of the external buttons disposed on the mobile device, whereby the display is activated while still remaining in the screen locked state.

In an extended embodiment, the method further comprises updating, after the expiration of a pre-determined time period and while the mobile device is still in the screen locked state, the lock screen wallpaper by replacing the application screen dump of the application running in the background of the mobile device with a most recent application screen dump of the application running on the mobile device, where the most recent application screen dump represents an updated screenshot of the application as if it were running in foreground of the mobile device (even though it is not). Since the setup simply replaces the lock screen wallpaper with another image, this helps in providing a more up-to-date screen dump of what the application would have rendered on a display, had the display been active with that application running actively in the foreground.

In an extended embodiment, the method further comprises identifying the application for which application screen dump is generated as the last run application in the mobile device prior to entering the screen locked state. This is useful in the instances that the user simply wants to look at a screenshot of the last run application prior to entering the screen locked state. For example, if a user was looking at a particular note in the electronic notes application and the screen timed out and entered a screen locked state, the user does not have to unlock the mobile device, as he/she would be able to look at the screen dump of what he/she was last looking at (i.e., the particular note) being rendered as the lock screen wallpaper.

In an extended embodiment, the method further comprises picking the application for which application screen dump is generated among a plurality of applications that are currently running on the mobile device based on accessing a profile identifying at least one application for which such an application screen dump is to be generated in order to provide a glimpse into the at least one application when it is running on the mobile device is in the screen locked state. Therefore, a user is able to maintain a profile on the mobile phone (or where the profile is retrievable over a network by the mobile device) where he/she can indicate what application may be used in such a screen dump or screenshot. For example, if the electronic notes application is indicated as the application which should be used for generating a screen dump or screenshot, the system may generate a screen dump or screen shot (as long as it is running in the background) even if it was not the last run application in the mobile device prior to entering a screen locked state.

In an extended embodiment, the method further comprises scaling the generated application screen dump to fit within a viewing area of the mobile device excluding at least an area occupied by a displayed unlocking tool. This is done so that the information to be displayed is not obstructed by the rendered sliding lock or clock/date information shown in, for example, FIGS. 4-5 and 7-8. This may simply be accomplished, in one non-limiting example, by scaling the screen dump or screenshot and centering it on another image (e.g., a flat color background image) that matches the pixel dimensions of the screen of the mobile device and generating a single image that fits the screen as shown in FIG. 5 and FIG. 8, where the information depicted is not obstructed by the slider or the clock/date information.

In an extended embodiment, the method further comprises unlocking the mobile device while the generated application screen dump is rendered as the lock screen wallpaper and opening the mobile device's display with the running application even when the running application was not the last run application on the mobile device. For example, the user may be able to simply tap or double tap the image corresponding to the notes application that is rendered as the lock screen wallpaper as shown in FIG. 4 or FIG. 5 to open the display to the notes application, regardless of whether it was the last running application on the mobile device. Similarly, the user may be able to simply tap or double tab the image corresponding to the navigation application that is rendered as the lock screen wallpaper to open the display to the navigation application, regardless of whether it was the last running application on the mobile device. Also, it could be made such that when the user slides the unlock bar to unlock the mobile device, it may open directly into the application whose screen dump or screenshot was rendered as the lock screen wallpaper. "Tap" and "double taps" are just used as examples, as other inputs are within the scope of the invention. The type of input used should not be used to limit the scope of the present invention. Also, it could be made such that when the user slides the unlock bar to unlock the mobile device, it may open directly into the application whose screen dump or screenshot was rendered as the lock screen wallpaper.

In one embodiment, the application (running in the background) for which a screen dump is generated may be the last run application on the mobile device, prior to the mobile device being placed in a screen locked state. For example, if the user was viewing a browser application on a mobile phone prior to the mobile phone entering a screen locked state (due to a lack of input from the user for a pre-determined amount of time, such as, but not limited to, 10 or 15 seconds), a screen dump is generated of the browser application as if it was running in the foreground of the mobile device (i.e., the screen dump in this case represents an image of what would have been rendered on the mobile device's display, had the display been active with the browser application in the foreground). In one extended embodiment, the application (running in the background) for which a screen dump is generated is not the last run application on the mobile device prior to the mobile device being placed in a screen locked state. Rather, it could be any application that is running in the background, where the application for which the screen dump is to be generated is picked from a profile maintained by the user.

Non-limiting examples of the application include any of the following: a notes application, a social media application, a calendar application, a browser application, a navigation application, a video application, a calculator application, a digital book reader application, a gaming application, an email application, a stock market application, or a weather application.

Non-limiting examples of the mobile device include any of the following: a mobile phone, a smartphone, a cellular phone, a portable media player, a tablet, a handheld gaming console, or a personal navigational device.

Figure 10:
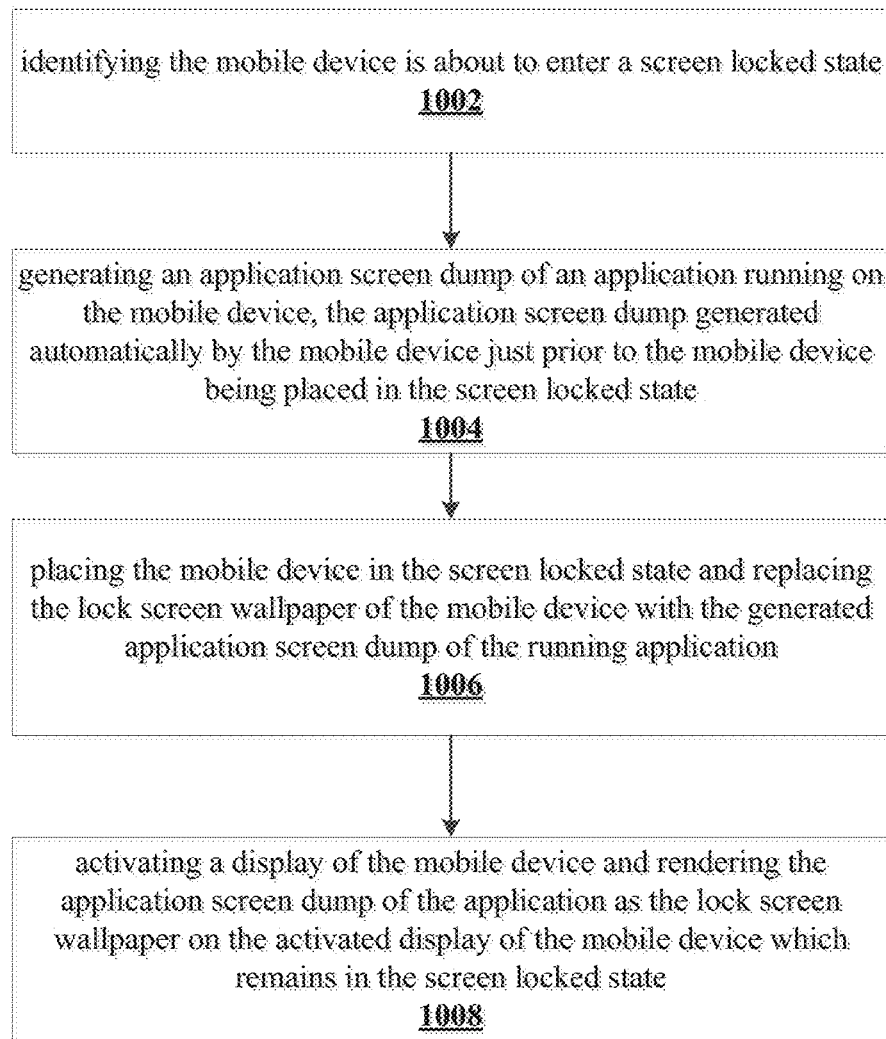
FIG. 10 depicts another embodiment where an application screen dump is generated just prior to the mobile device being placed in a screen locked state.

In one embodiment, as shown in FIG. 10, the present invention discloses a method as implemented in a mobile device having a dynamically replaceable lock screen wallpaper, the method comprising: identifying the mobile device is about to enter a screen locked state—step 1002; generating an application screen dump of an application running on the mobile device, the application screen dump generated automatically by the mobile device just prior to the mobile device being placed in the screen locked state—step 1004; placing the mobile device in the screen locked state and replacing the lock screen wallpaper of the mobile device with the generated application screen dump of the running application (or replacing it with a portion of the generated application screen dump)—step 1006; activating a display of the mobile device and rendering the application screen dump of the application as the lock screen wallpaper on the activated display of the mobile device which remains in the screen locked state—step 1008; and wherein the application screen dump used as the lock screen wallpaper provides a glimpse into the application running on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 10.

In an extended embodiment, the method further comprises receiving an input, the input triggering the activation of the display of the mobile device which remains in the screen locked state. For example, while the mobile device is in a screen locked state, the user may depress any of the external buttons disposed on the phone, whereby the display is activated while still remaining in the screen locked state.

In an extended embodiment, the method further comprises updating, after the expiration of a pre-determined time period and while the mobile device is still in the screen locked state, the lock screen wallpaper by replacing the application screen dump of the application running on the mobile device with a most recent application screen dump of the application running on the mobile device, the most recent application screen dump representing an updated screenshot of the application as if it were running in foreground of the mobile device.

In an extended embodiment, the method further comprises identifying the application for which the screen dump is generated as the last run application in the mobile device prior to entering the screen locked state. This is useful in the instances that the user simply wants to look at a screenshot of the last run application prior to entering the screen locked state. For example, if a user was looking at a particular note in the electronic notes application and the screen timed out and entered a screen locked state, the user does not have to unlock the mobile device, as he/she would be able to look at the screen dump of what he/she was last looking at (i.e., the particular note) being rendered as the lock screen wallpaper.

In an extended embodiment, the method further comprises picking the application for which application screen dump is generated among a plurality of applications that are currently running on the mobile device based on a profile identifying at least one application for which such an application screen dump is to be generated in order to provide a glimpse into the at least one application when it is running on the mobile device that is in the screen locked state. Therefore, a user is able to maintain a profile on the mobile phone (or where the profile is retrievable over a network by the mobile device) where he/she can indicate what application may be used in such a screen dump or screenshot. For example, if the electronic notes application is indicated as the application which should be used for generating a screen dump or screenshot, the system may generate a screen dump or screen shot (as long as it is running in the background) even if it was not the last run application in the mobile device prior to entering a screen locked state.

In an extended embodiment, the method further comprises scaling the generated application screen dump of application to fit within a viewing area of the mobile device excluding at least an area occupied by a displayed unlocking tool. This is done so that the information to be displayed is not obstructed by the rendered sliding lock or clock/date blocks shown in, for example, FIGS. 4-5 and 7-8. This may simply be accomplished, in one non-limiting example, by scaling the screen dump or screenshot and centering it on another image (e.g., a flat color image) that matches the pixel dimensions of the screen of the mobile device and generating a single image that fits the screen as shown in FIG. 5 and FIG. 8, where the information depicted is not obstructed by the slider or the clock/date blocks.

In an extended embodiment, the method further comprises unlocking the mobile device while the generated application screen dump is rendered as the lock screen wallpaper and opening the mobile device's display with the running application even if the running application was not the last run application. For example, the user may be able to simply tap or double tap the image corresponding to the notes application that is rendered as the lock screen wallpaper as shown in FIG. 4 or FIG. 5 to open the display to the notes application, regardless of whether it was the last running application on the mobile device. Similarly, the user may be able to simply tap or double tab the image corresponding to the navigation application that is rendered as the lock screen wallpaper to open the display to the navigation application, regardless of whether it was the last running application on the mobile device. "Tap" and "double taps" are just used as examples, as other inputs are within the scope of the invention. The type of input used should not be used to limit the scope of the present invention. Also, it could be made such that when the user slides the unlock bar to unlock the mobile device, it may open directly into the application whose screen dump or screenshot was rendered as the lock screen wallpaper.

Non-limiting examples of the application include any of the following: a notes application, a social media application, a calendar application, a browser application, a navigation application, a video application, a calculator application, a digital book reader application, a gaming application, an email application, a stock market application, or a weather application.

Non-limiting examples of the mobile device include any of the following: a mobile phone, a smartphone, a cellular phone, a portable media player, a tablet, a handheld gaming console, or a personal navigational device.

Figure 11:
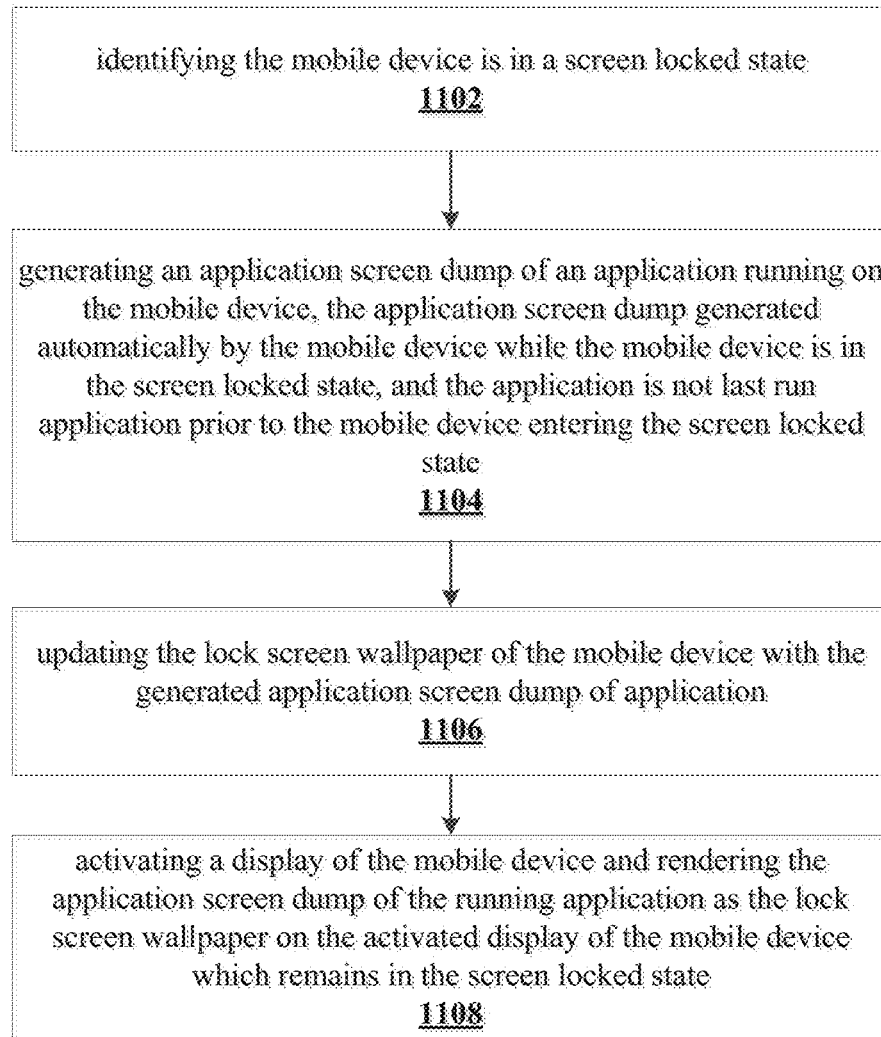
FIG. 11 depicts another embodiment where generated application screen dump is of an application that is not the last run application.

In one embodiment, as depicted in FIG. 11, the present invention discloses a method as implemented in a mobile device having a dynamically replaceable lock screen wallpaper, the method comprising: identifying the mobile device is in a screen locked state—step 1102; generating an application screen dump of an application running on the mobile device, the application screen dump generated automatically by the mobile device while the mobile device is in the screen locked state, and the application is not the last run application prior to the mobile device entering the screen locked state—step 1104; updating the lock screen wallpaper of the mobile device with the generated application screen dump of application—step 1106; activating a display of the mobile device and rendering the application screen dump of the running application as the lock screen wallpaper on the activated display of the mobile device which remains in the screen locked state—step 1108; and wherein the generated application screen dump used as the lock screen wallpaper of the mobile device providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 11.

Figure 12:
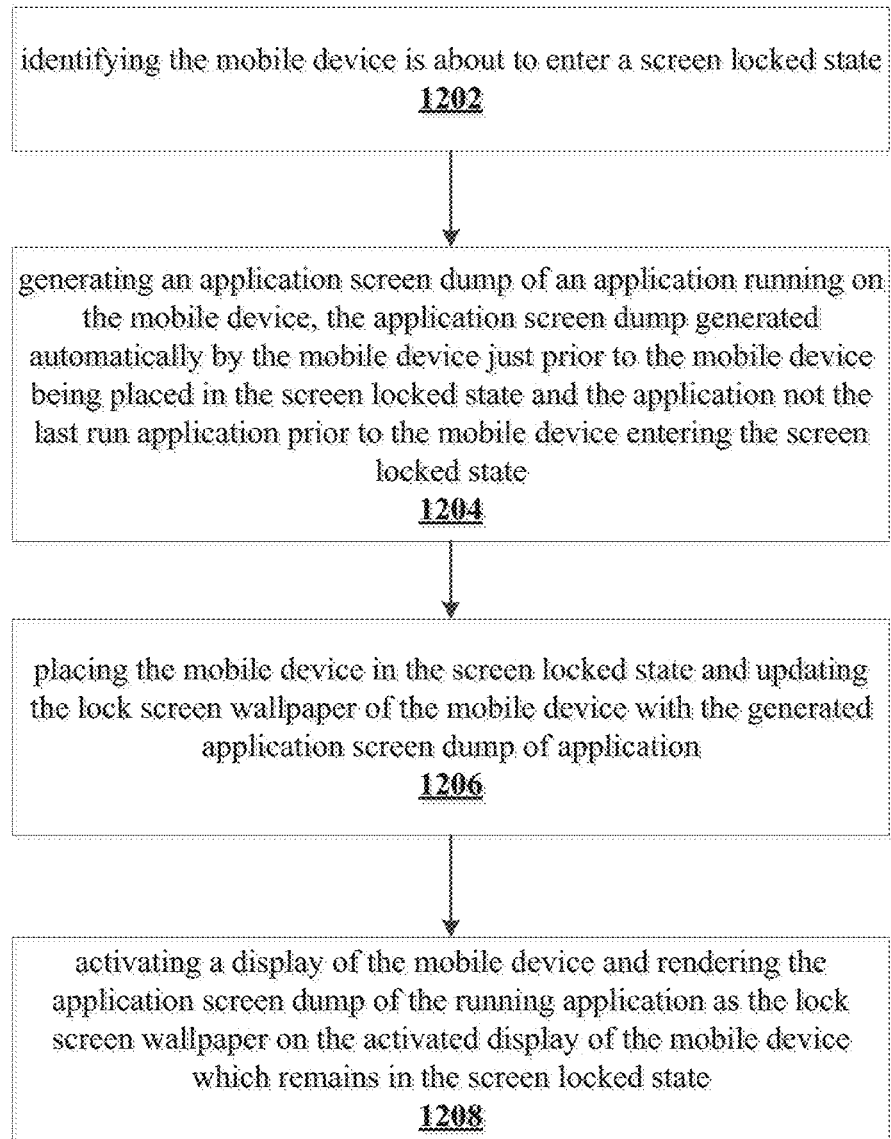
FIG. 12 depicts another embodiment where an application screen dump is generated just prior to the mobile device being placed in a screen locked state where the application is not the last run application.

In one embodiment, as depicted in FIG. 12, the present invention discloses a method as implemented in a mobile device having a dynamically replaceable lock screen wallpaper, the method comprising: identifying the mobile device is about to enter a screen locked state—step 1202; generating an application screen dump of an application running on the mobile device, the application screen dump generated automatically by the mobile device just prior to the mobile device being placed in the screen locked state and the application not the last run application prior to the mobile device entering the screen locked state—step 1204; placing the mobile device in the screen locked state and updating the lock screen wallpaper of the mobile device with the generated application screen dump of application—step 1206; activating a display of the mobile device and rendering the application screen dump of the running application as the lock screen wallpaper on the activated display of the mobile device which remains in the screen locked state—step 1208; and wherein the generated application screen dump used as lock screen wallpaper of the mobile device providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 12.

Figure 13:
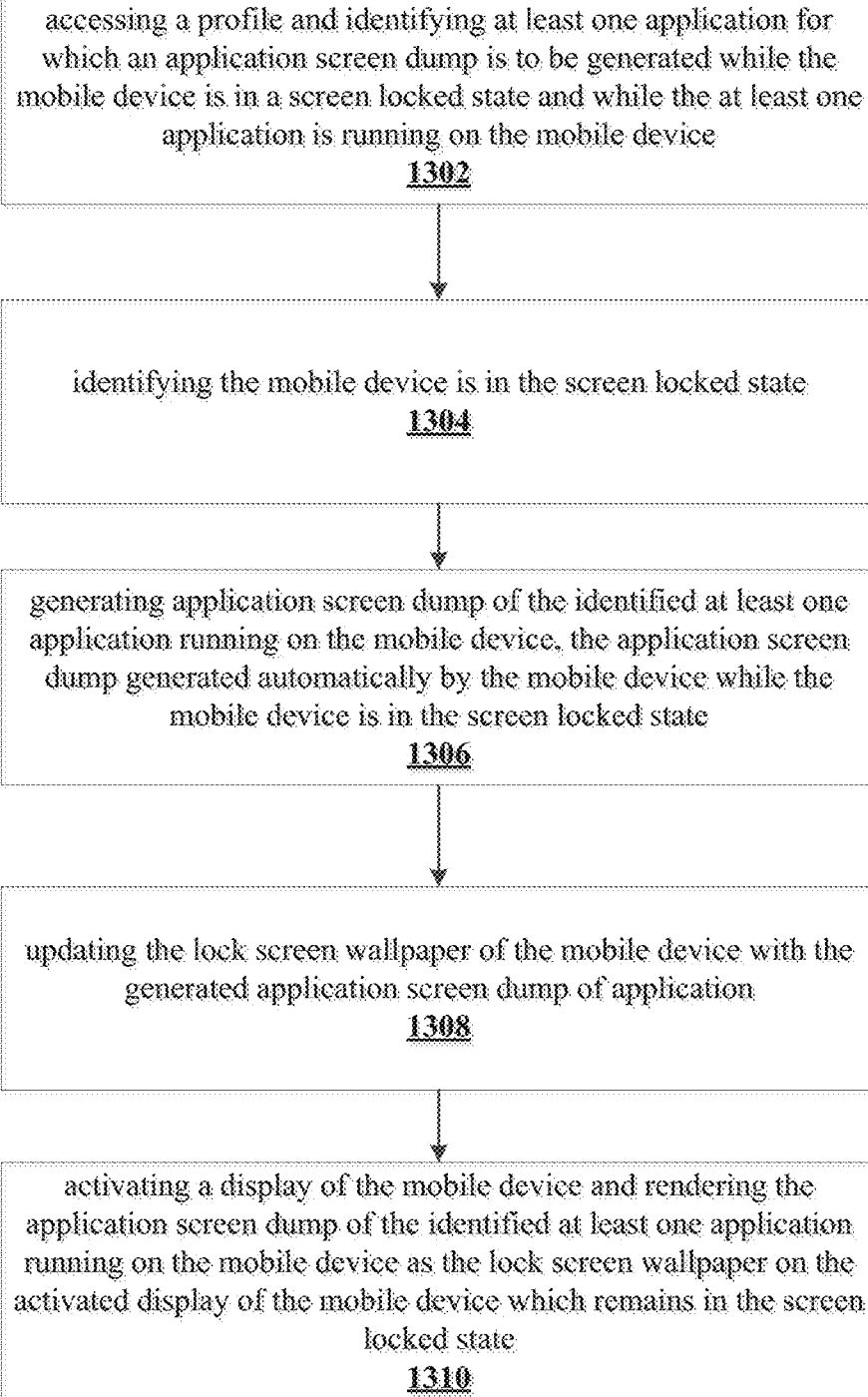
FIG. 13 depicts another embodiment where the lock screen wallpaper of a mobile device is replaced with an application screen dump of a running application based on a profile.

In one embodiment, as depicted in FIG. 13, the present invention discloses a method as implemented in a mobile device having a dynamically replaceable lock screen wallpaper, the method comprising: accessing a profile and identifying at least one application for which an application screen dump is to be generated while the mobile device is in a screen locked state and while the at least one application is running on the mobile device—step 1302; identifying the mobile device is in the screen locked state—step 1304; generating application screen dump of the identified at least one application running on the mobile device, the application screen dump generated automatically by the mobile device while the mobile device is in the screen locked state—step 1306; updating the lock screen wallpaper of the mobile device with the generated application screen dump of application—step 1308; activating a display of the mobile device and rendering the application screen dump of the identified at least one application running on the mobile device as the lock screen wallpaper on the activated display of the mobile device which remains in the screen locked state—step 1310; and wherein the generated application screen dump used as the lock screen wallpaper providing a glimpse into the at least one application identified in the profile and running on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 13.

In one embodiment, as depicted in FIG. 14, the present invention discloses a method as implemented in a mobile device having a dynamically replaceable lock screen wallpaper, the method comprising: accessing a profile and identifying at least one application for which an application screen dump is to be generated while the mobile device is in a screen locked state and while the at least one application is running on the mobile device—step 1402; identifying the mobile device is about to enter the screen locked state—step 1404; generating an application screen dump of the identified at least one application running on the mobile device, the application screen dump generated automatically by the mobile device just prior to the mobile device being placed in the screen locked state—step 1406; placing the mobile device in the screen locked state and updating the lock screen wallpaper of the mobile device with the generated application screen dump of the identified at least one application—step 1408; activating a display of the mobile device and rendering the application screen dump of the identified at least one application running on the mobile device as the lock screen wallpaper on the activated display of the mobile device which remains in the screen locked state—step 1410; and wherein the generated application screen dump used as lock screen wallpaper providing a glimpse into the at least one application identified in the profile and running on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 14.

Figure 15:
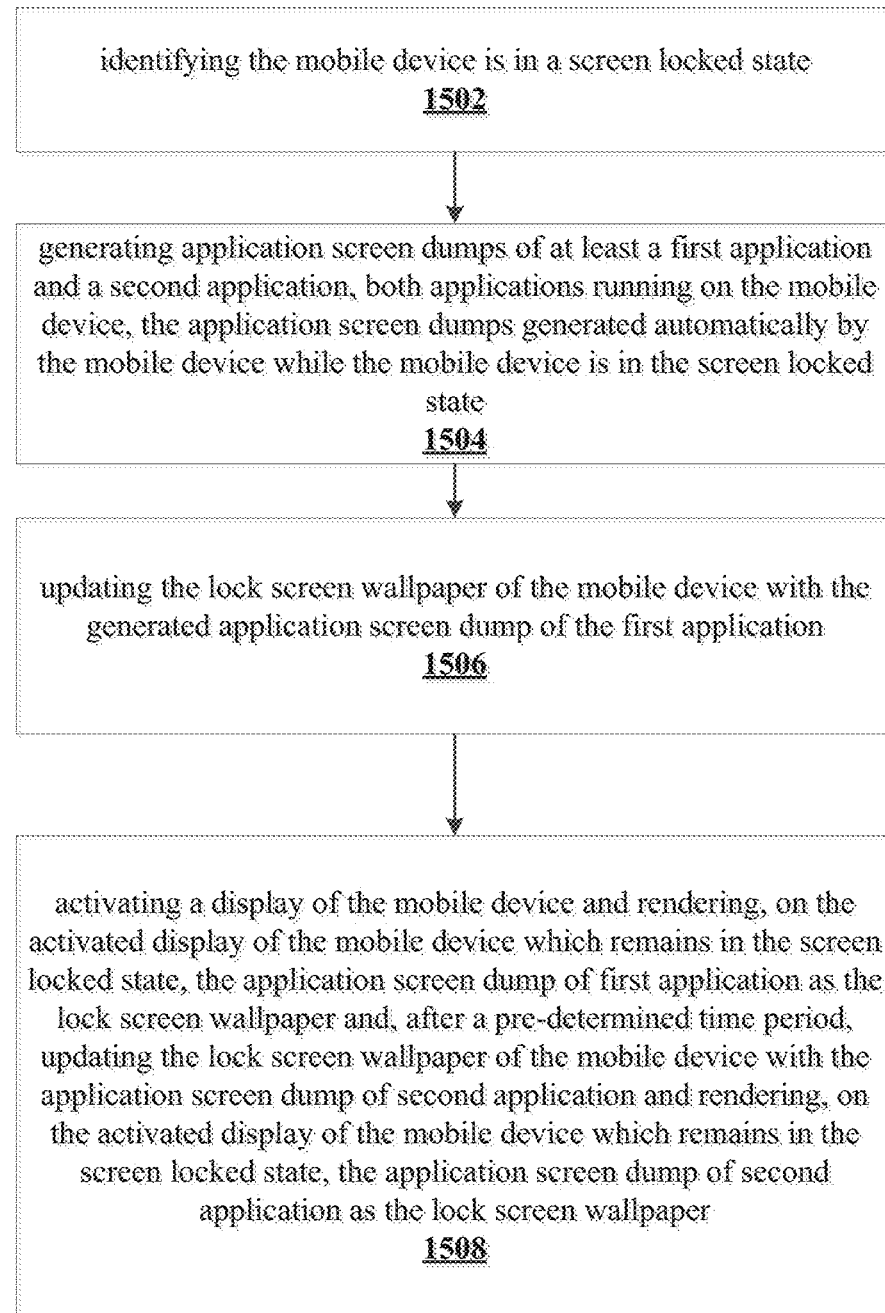
FIG. 15 depicts another embodiment where application screen dumps of at least two applications are used to update the lock screen wallpaper.

In one embodiment, as depicted in FIG. 15, the present invention discloses a method as implemented in a mobile device having a dynamically replaceable lock screen wallpaper, the method comprising: identifying the mobile device is in a screen locked state—step 1502; generating application screen dumps of at least a first application and a second application, both applications running on the mobile device, the application screen dumps generated automatically by the mobile device while the mobile device is in the screen locked state—step 1504; updating the lock screen wallpaper of the mobile device with the generated application screen dump of the first application—step 1506; activating a display of the mobile device and rendering, on the activated display of the mobile device which remains in the screen locked state, the application screen dump of first application as the lock screen wallpaper and, after a pre-determined time period, updating the lock screen wallpaper of the mobile device with the application screen dump of second application and rendering, on the activated display of the mobile device which remains in the screen locked state, the application screen dump of second application as the lock screen wallpaper—step 1508; and wherein the rendered application screen dumps used as lock screen wallpaper providing successive glimpses into the running first and second application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 15. This embodiment allows a user to review a plurality of application screen dumps or screenshots, one after another, in a successive manner, without having to unlock the mobile device. Provisions may also be provided where the user may click on one of the buttons disposed on the phone to update the lock screen wallpaper to that of the application screen dump of the second application prior to the expiration of the pre-determined time period.

Figure 16:
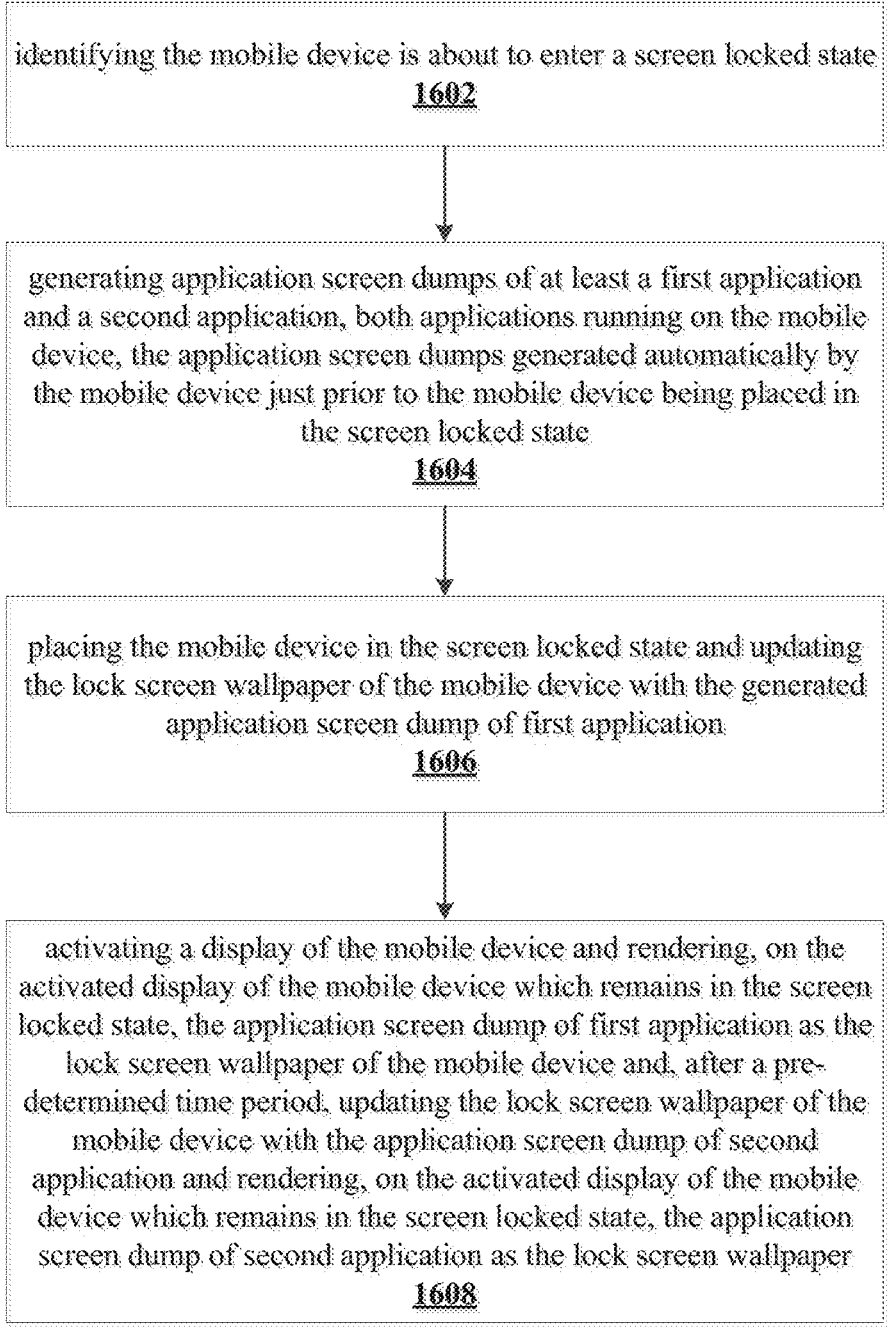
FIG. 16 depicts another embodiment where application screen dumps of at least two applications are used to update the lock screen wallpaper where the application screen dumps are generated just prior to the mobile device being placed in a screen locked state.

In one embodiment, as depicted in FIG. 16, the present invention discloses a method as implemented in a mobile device having a dynamically replaceable lock screen wallpaper, the method comprising: identifying the mobile device is about to enter a screen locked state—step 1602; generating application screen dumps of at least a first application and a second application, both applications running on the mobile device, the application screen dumps generated automatically by the mobile device just prior to the mobile device being placed in the screen locked state—step 1604; placing the mobile device in the screen locked state and updating the lock screen wallpaper of the mobile device with the generated application screen dump of the first application—step 1606; activating a display of the mobile device and rendering, on the activated display of the mobile device which remains in the screen locked state, the application screen dump of the first application as the lock screen wallpaper of the mobile device and, after a pre-determined time period, updating the lock screen wallpaper of the mobile device with the application screen dump of second application and rendering, on the activated display of the mobile device which remains in the screen locked state, the application screen dump of the second application as the lock screen wallpaper—step 1608; and wherein the rendered application screen dumps used as lock screen wallpaper providing successive glimpses into the running first and second applications on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 16. Provisions may also be provided where the user may click on one of the buttons disposed on the phone to update the lock screen wallpaper to that of the application screen dump of the second application prior to the expiration of the pre-determined time period.

Figure 17:
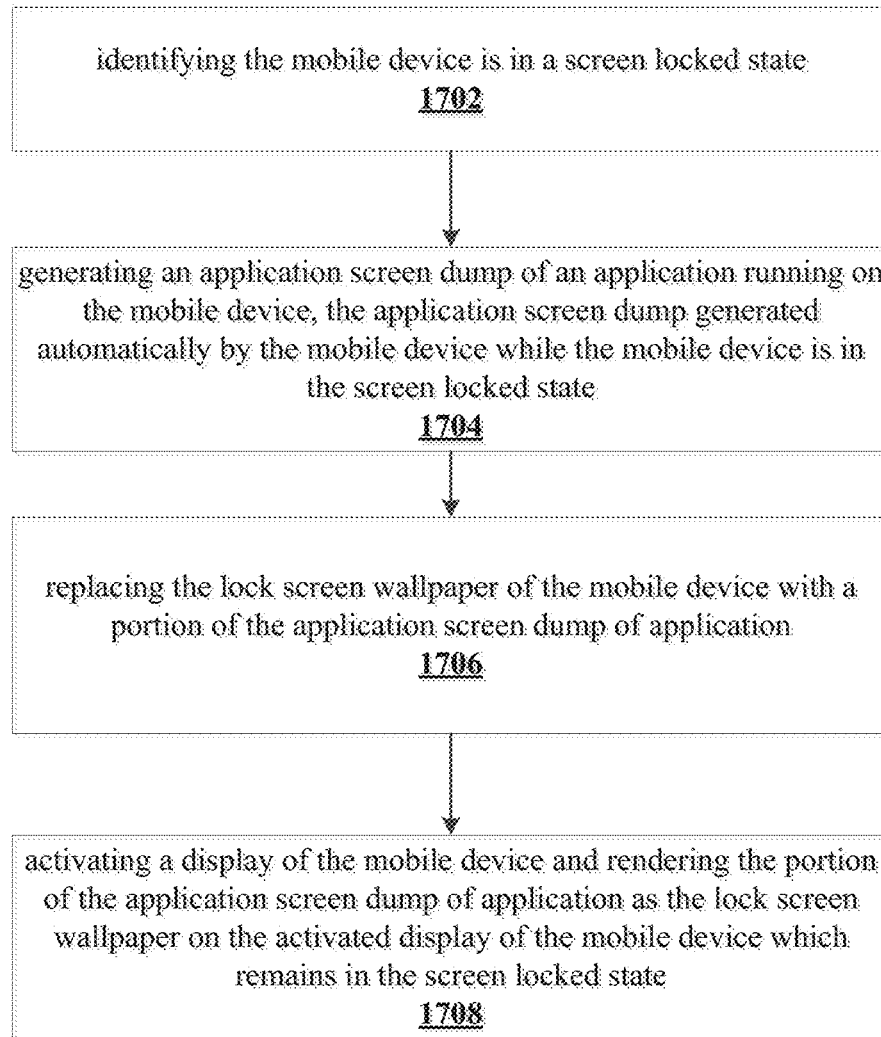
FIG. 17 depicts another embodiment where a portion of an application screen dump is used to replace the lock screen wallpaper of the mobile device.

In one embodiment, as depicted in FIG. 17, the present invention discloses a method as implemented in a mobile device having a dynamically replaceable lock screen wallpaper, the method comprising: identifying the mobile device is in a screen locked state—step 1702; generating an application screen dump of an application running on the mobile device, the application screen dump generated automatically by the mobile device while the mobile device is in the screen locked state—step 1704; replacing the lock screen wallpaper of the mobile device with a portion of the application screen dump of application—step 1706 (this is useful in instances where only a portion of the screenshot is of interest to the user, so the user may, in advance, indicate the region of interest within a rendered application (or a profile may be consulted where an entry is provided indicating the region of interest for each of a plurality of applications), where only the region of interest within the screen dump is used as a replacement of the lock screen wallpaper); activating a display of the mobile device and rendering the portion of the application screen dump of application as the lock screen wallpaper on the activated display of the mobile device which remains in the screen locked state—step 1708; wherein the portion of the application screen dump of application used as lock screen wallpaper providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 17.

Figure 18:
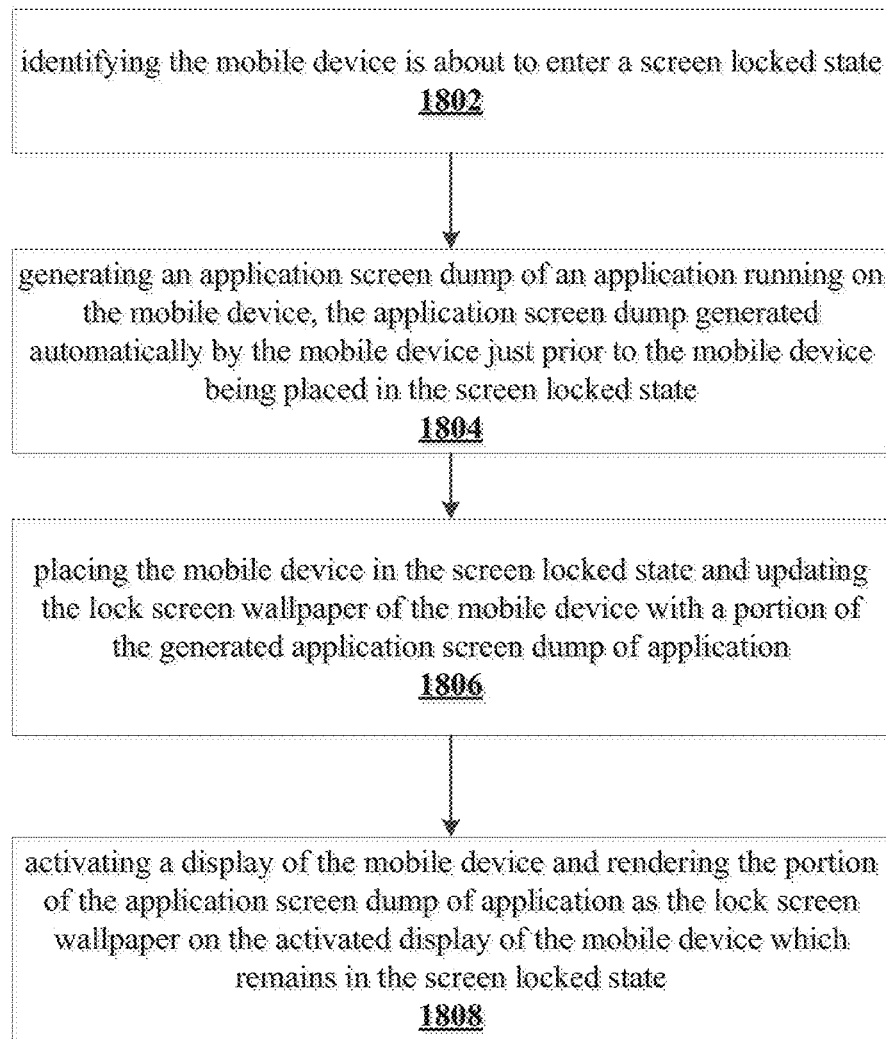
FIG. 18 depicts another embodiment where a portion of an application screen dump is used to replace the lock screen wallpaper of the mobile device where the application screen dump is generated just prior to the mobile device being placed in a screen locked state.

In one embodiment, as depicted in FIG. 18, the present invention discloses a method as implemented in a mobile device having a dynamically replaceable lock screen wallpaper, the method comprising: identifying the mobile device is about to enter a screen locked state—step 1802; generating an application screen dump of an application running on the mobile device, the application screen dump generated automatically by the mobile device just prior to the mobile device being placed in the screen locked state—step 1804; placing the mobile device in the screen locked state and updating the lock screen wallpaper of the mobile device with a portion of the generated application screen dump of application—step 1806 (this, as above, is useful in instances where only a portion of the screenshot is of interest to the user, so the user may, in advance, indicate the region of interest within a rendered application (or a profile may be consulted where an entry is provided indicating the region of interest for each of a plurality of applications), where only the region of interest within the screen dump is used as a replacement of the lock screen wallpaper); activating a display of the mobile device and rendering the portion of the application screen dump of the application as the lock screen wallpaper on the activated display of the mobile device which remains in the screen locked state—step 1808; and wherein the portion of the application screen dump of the application used as lock screen wallpaper providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 18.

Figure 19:
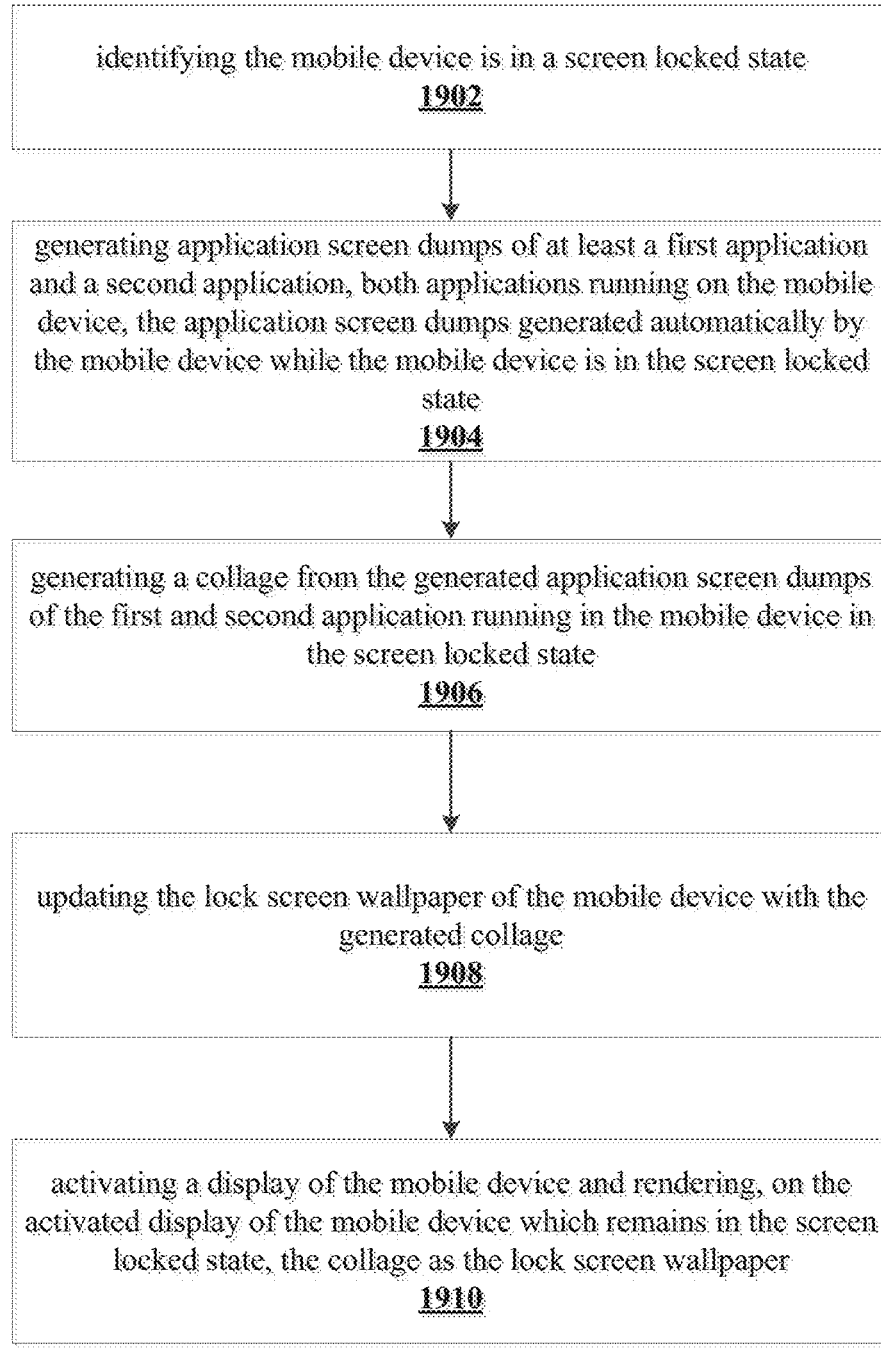
FIG. 19 depicts another embodiment where a collage is used to update the lock screen wallpaper of a mobile device.

In one embodiment, as depicted in FIG. 19, the present invention discloses a method as implemented in a mobile device having a dynamically replaceable lock screen wallpaper, the method comprising: identifying the mobile device is in a screen locked state—step 1902; generating application screen dumps of at least a first application and a second application, both applications running on the mobile device, the application screen dumps generated automatically by the mobile device while the mobile device is in the screen locked state—step 1904; generating a collage (i.e., an image made by joining or combining the two screen dump images) from the generated application screen dumps of the first and second applications running in the mobile device in the screen locked state—step 1906; updating the lock screen wallpaper of the mobile device with the generated collage—step 1908; activating a display of the mobile device and rendering, on the activated display of the mobile device which remains in the screen locked state, the collage as the lock screen wallpaper—step 1910; and wherein the rendered collage used as the lock screen wallpaper providing glimpses into the running first and second application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 19.

Figure 20:
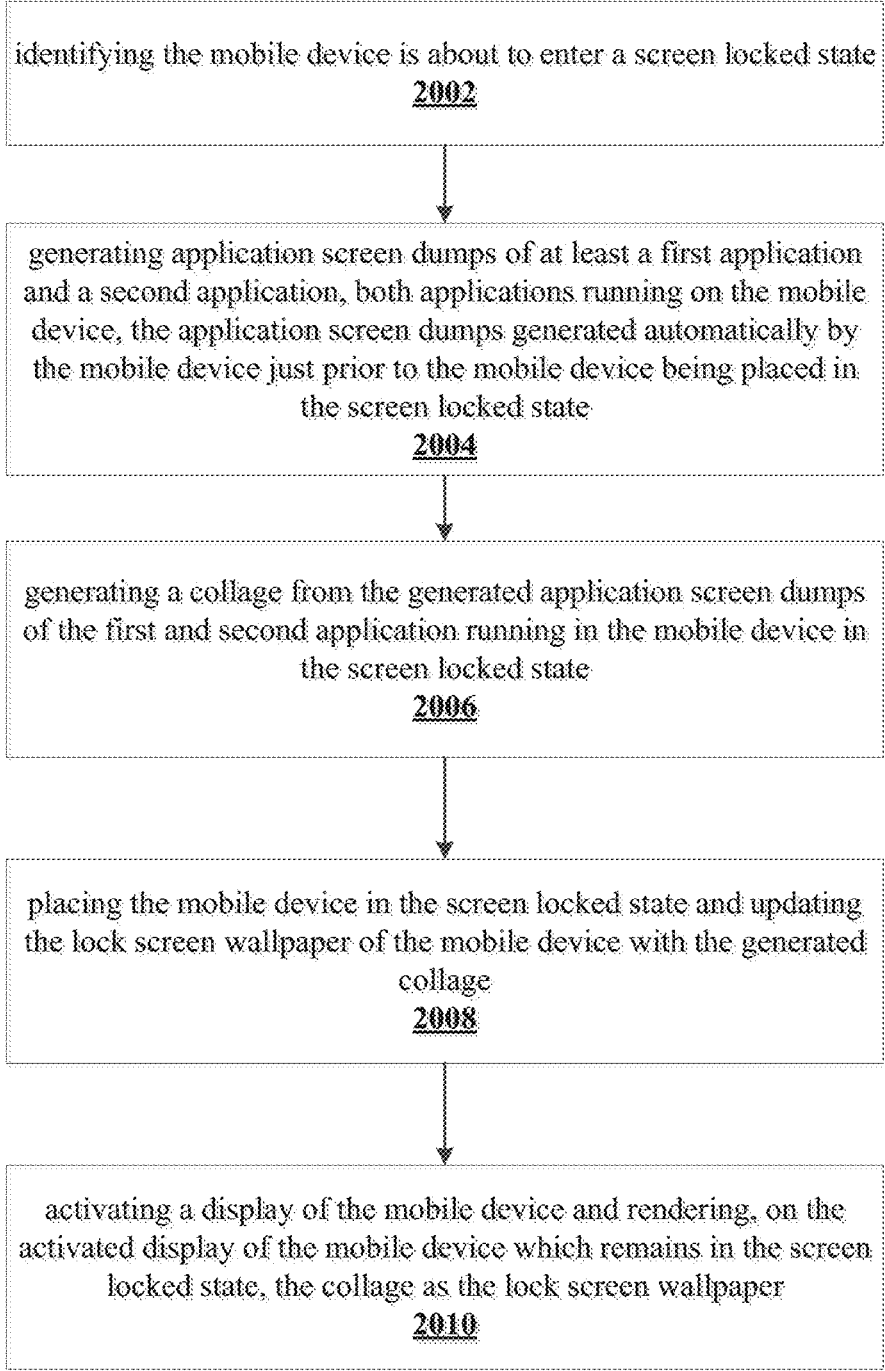
FIG. 20 depicts another embodiment where a collage is used to update the lock screen wallpaper of a mobile device and where the application screen dumps used in generating the collage are generated just prior to the mobile device being placed in a screen locked state.

In one embodiment, as depicted in FIG. 20, the present invention discloses a method as implemented in a mobile device having a dynamically replaceable lock screen wallpaper, the method comprising: identifying the mobile device is about to enter a screen locked state—step 2002; generating application screen dumps of at least a first application and a second application, both applications running on the mobile device, the application screen dumps generated automatically by the mobile device just prior to the mobile device being placed in the screen locked state—step 2004; generating a collage (i.e., an image made by joining or combining the two screen dump images) from the generated application screen dumps of the first and second applications running in the mobile device in the screen locked state—step 2006; placing the mobile device in the screen locked state and updating the lock screen wallpaper of the mobile device with the generated collage—step 2008; activating a display of the mobile device and rendering, on the activated display of the mobile device which remains in the screen locked state, the collage as the lock screen wallpaper—step 2010; and wherein the rendered collage used as lock screen wallpaper providing glimpses into the running first and second application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 20.

Figure 21:
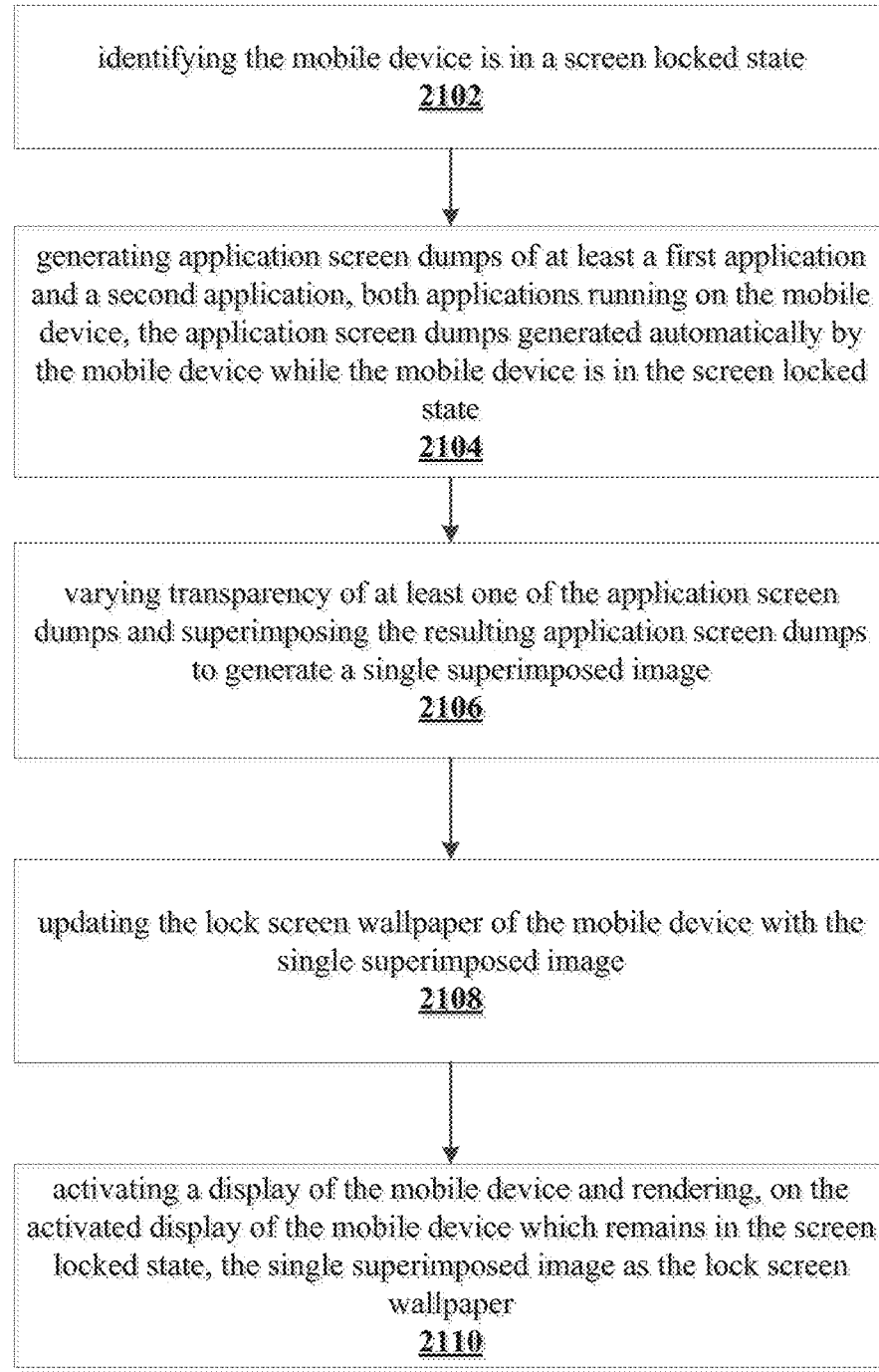
FIG. 21 depicts another embodiment where a single superimposed image is used to update the lock screen wallpaper.

In one embodiment, as depicted in FIG. 21, the present invention discloses a method as implemented in a mobile device having a dynamically replaceable lock screen wallpaper, the method comprising: identifying the mobile device is in a screen locked state—step 2102; generating application screen dumps of at least a first application and a second application, both applications running on the mobile device, the application screen dumps generated automatically by the mobile device while the mobile device is in the screen locked state—step 2104; varying transparency of at least one of the application screen dumps and superimposing the resulting application screen dumps to generate a single superimposed image—step 2106; updating the lock screen wallpaper of the mobile device with the single superimposed image—step 2108; activating a display of the mobile device and rendering, on the activated display of the mobile device which remains in the screen locked state, the single superimposed image as the lock screen wallpaper—step 2110; and wherein the rendered single superimposed image used as lock screen wallpaper providing simultaneous glimpses into both the running first and second application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 21.

Figure 55A:
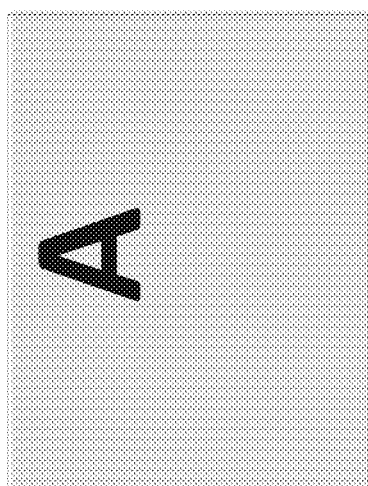
FIGS. 55A-C depict how transparency may be manipulated in the present invention.
Figure 55B:
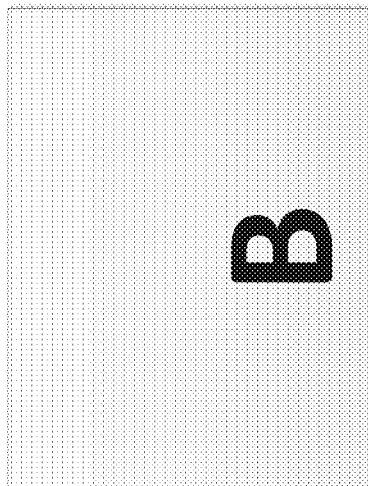
Figure 55C:
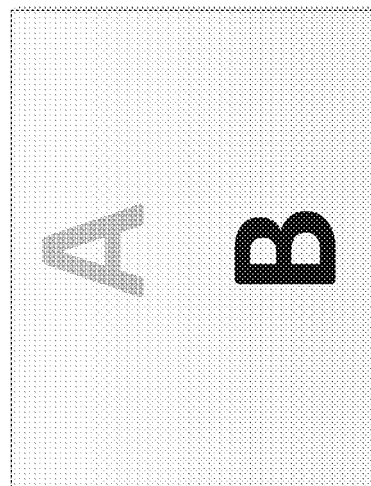

As described herein, transparency of the screen dumps may be varied, prior to superimposing, should the details of one of the screen dumps need to be emphasized more than the other. For example, if information in the screen dump of the second application needs to be emphasized more than the information in the screen dump of the first application (e.g., when a stored profile may indicate the preference of a user, where the user had previously identified that the details in the screen dump of the second application take precedence over the details in the screen dump of the first application, so the user may want the preferred details shown more clearly in a superposition scenario), the transparency with the second screen dump image may be controlled (e.g., by varying the transparency associated with the background of such an image) where the details of the second screen dump image are more opaque and less transparent with respect to its background, while the transparency associated with the first screen dump image may be adjusted such that its details are less opaque and more transparent with respect to its background, so when the images are superimposed, the details of the second image is seen more clearly as it is rendered against a less transparent and more opaque background. Similarly, more than two images may be used as well, where the transparency of at least one of the images may be controlled for preferential viewing of the details of the at least one image. FIGS. 55A-C depict a non-limiting example of how transparency settings may be manipulated while combining images. FIG. 55A depicts image A which is rendered more transparent (set to 100% transparency in this example) by manipulating the image with respect to its background and FIG. 55B depicts image B which is rendered less transparent (set to 25% transparent in this example) by similarly manipulating the image with respect to its background. Such transparency percentages may be preset by default, for example to about 25% for less transparency and at about 100% for more transparency. However, optimal transparency may be set during run-time using image processing algorithms that are outside the scope of the present invention. FIG. 55C depicts the image formed by superimposing images A and B, which shows how image B is more dominant than A, as image B is less transparent than image A. So, a user preferring to see image B over A would have succeeded via this rendering. It is also envisioned in the various embodiments described with regards to the transparency aspect, a user may be able to depress a button on the mobile device to reverse the transparencies of the two images such that A is now dominant over B (reverse of what is shown in FIG. 55C).

Figure 22:
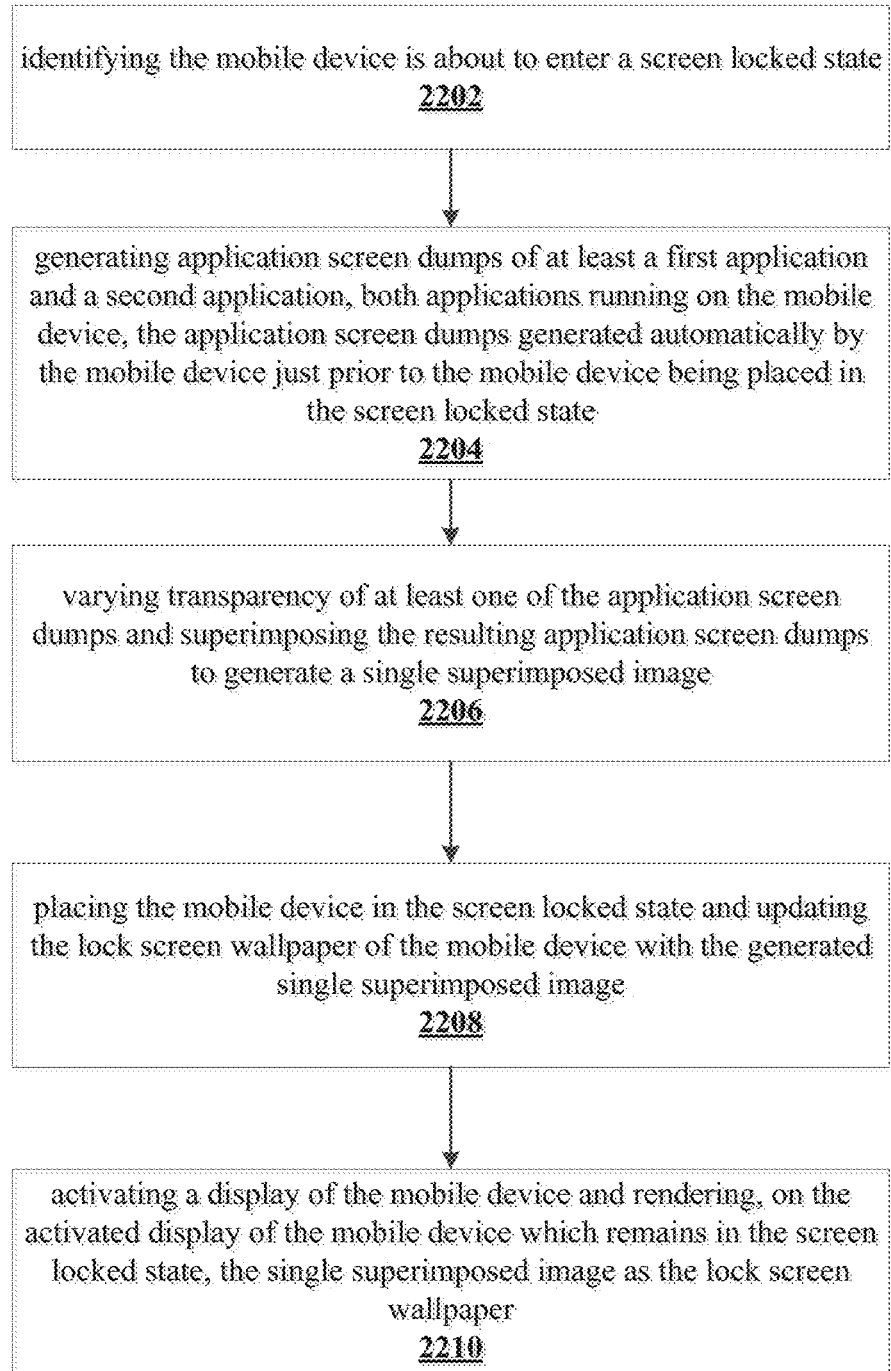
FIG. 22 depicts another embodiment where a single superimposed image is used to update the lock screen wallpaper and where the application screen dumps used in generating the superimposed image are generated just prior to the mobile device being placed in a screen locked state.

In one embodiment, as depicted in FIG. 22, the present invention discloses a method as implemented in a mobile device having a dynamically replaceable lock screen wallpaper, the method comprising: identifying the mobile device is about to enter a screen locked state—step 2202; generating application screen dumps of at least a first application and a second application, both applications running on the mobile device, the application screen dumps generated automatically by the mobile device just prior to the mobile device being placed in the screen locked state—step 2204; varying transparency of at least one of the application screen dumps and superimposing the resulting application screen dumps to generate a single superimposed image (see for Example FIGS. 55A-C)— step 2206; placing the mobile device in the screen locked state and updating the lock screen wallpaper of the mobile device with the generated single superimposed image—step 2208; activating a display of the mobile device and rendering, on the activated display of the mobile device which remains in the screen locked state, the single superimposed image as the lock screen wallpaper—step 2210; and wherein the rendered single superimposed image used as lock screen wallpaper providing simultaneous glimpses into both the running first and second application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 22.

Figure 23:
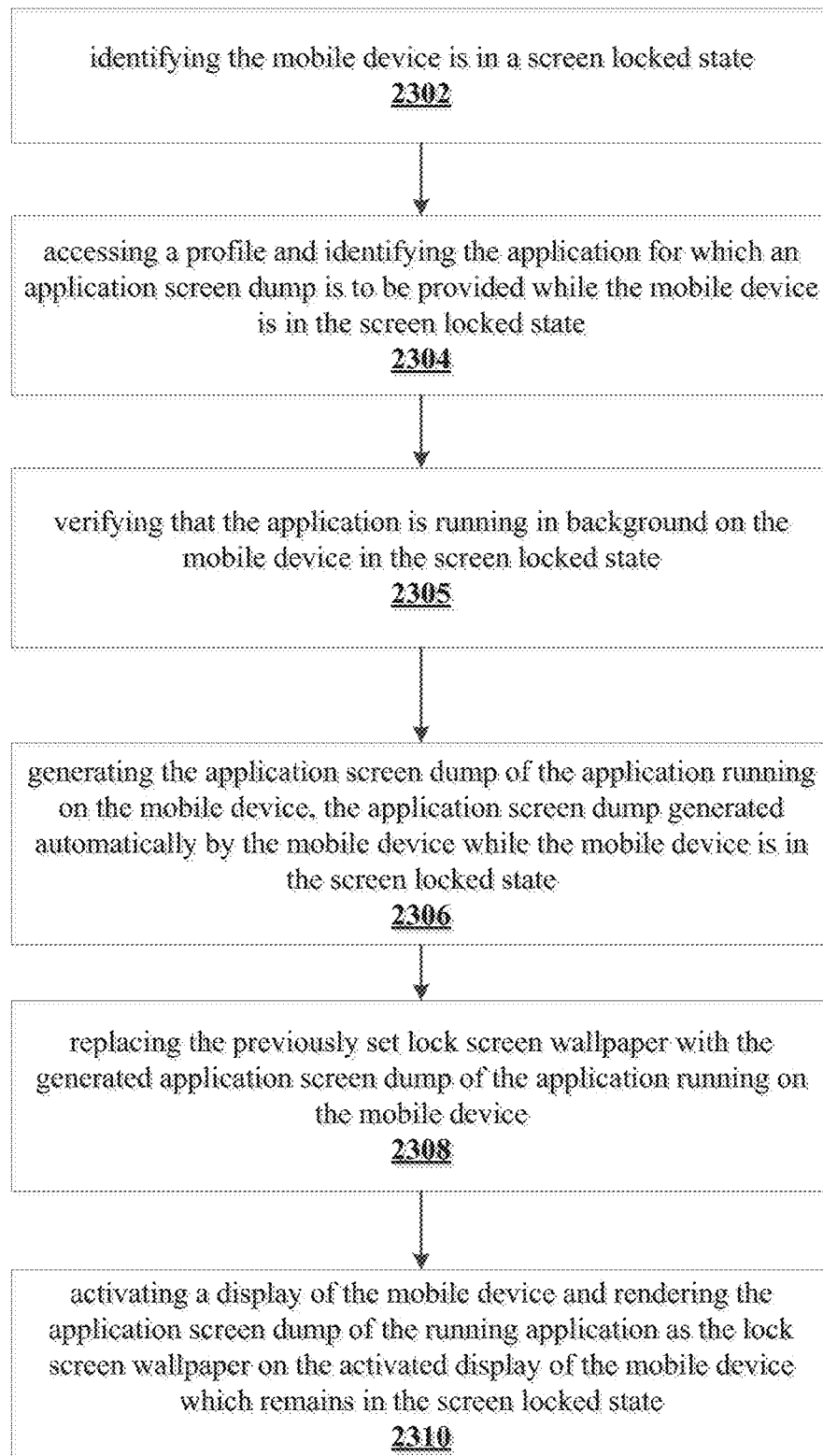
FIG. 23 depicts another embodiment where a profile used to generate an application screen dump and where a verification is made as to whether the application identified in the profile is running in the background on a mobile device.

In one embodiment, as depicted in FIG. 23, the present invention discloses a method as implemented in a mobile device having a dynamically replaceable lock screen wallpaper, the method comprising: identifying the mobile device is in a screen locked state—step 2302; accessing a profile (which may be stored locally in the mobile device or may be stored in a network that is accessible by the mobile device) and identifying the application for which an application screen dump is to be provided while the mobile device is in the screen locked state—step 2304; verifying that the application is running in background on the mobile device in the screen locked state—step 2305; generating the application screen dump of the application miming on the mobile device, the application screen dump generated automatically by the mobile device while the mobile device is in the screen locked state—step 2306; replacing the previously set lock screen wallpaper with the generated application screen dump of the application running on the mobile device—step 2308; activating a display of the mobile device and rendering the application screen dump of the running application as the lock screen wallpaper on the activated display of the mobile device which remains in the screen locked state—step 2310; and wherein the generated application screen dump used as lock screen wallpaper providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 23.

Figure 24:
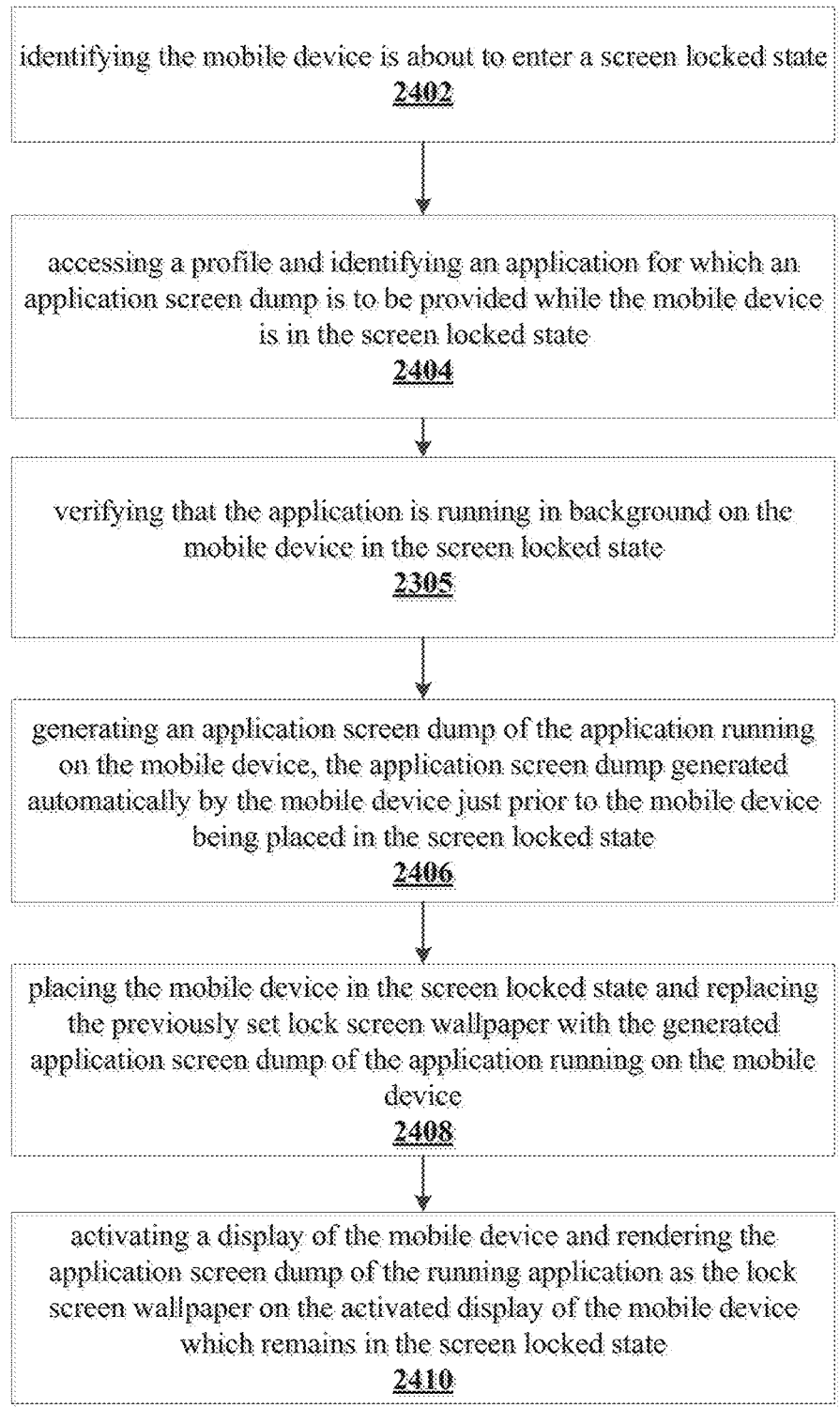
FIG. 24 depicts another embodiment where a profile used to generate an application screen dump and where a verification is made as to whether the application identified in the profile is running in the background on a mobile device, with the application screen dump generated just prior to the mobile device is placed in a screen locked state.

In one embodiment, as depicted in FIG. 24, the present invention discloses a method as implemented in a mobile device having a previously set lock screen wallpaper, the method comprising: identifying the mobile device is about to enter a screen locked state—step 2402; accessing a profile (which may be stored locally in the mobile device or may be stored in a network that is accessible by the mobile device) and identifying an application for which an application screen dump is to be provided while the mobile device is in the screen locked state—step 2404; verifying that the application is running in background on the mobile device in the screen locked state—step 2305; generating an application screen dump of the application running on the mobile device, the application screen dump generated automatically by the mobile device just prior to the mobile device being placed in the screen locked state—step 2406; placing the mobile device in the screen locked state and replacing the previously set lock screen wallpaper with the generated application screen dump of the application running on the mobile device—step 2408; activating a display of the mobile device and rendering the application screen dump of the running application as the lock screen wallpaper on the activated display of the mobile device which remains in the screen locked state—step 2410; and wherein the generated application screen dump used as lock screen wallpaper providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 24.

Figure 25:
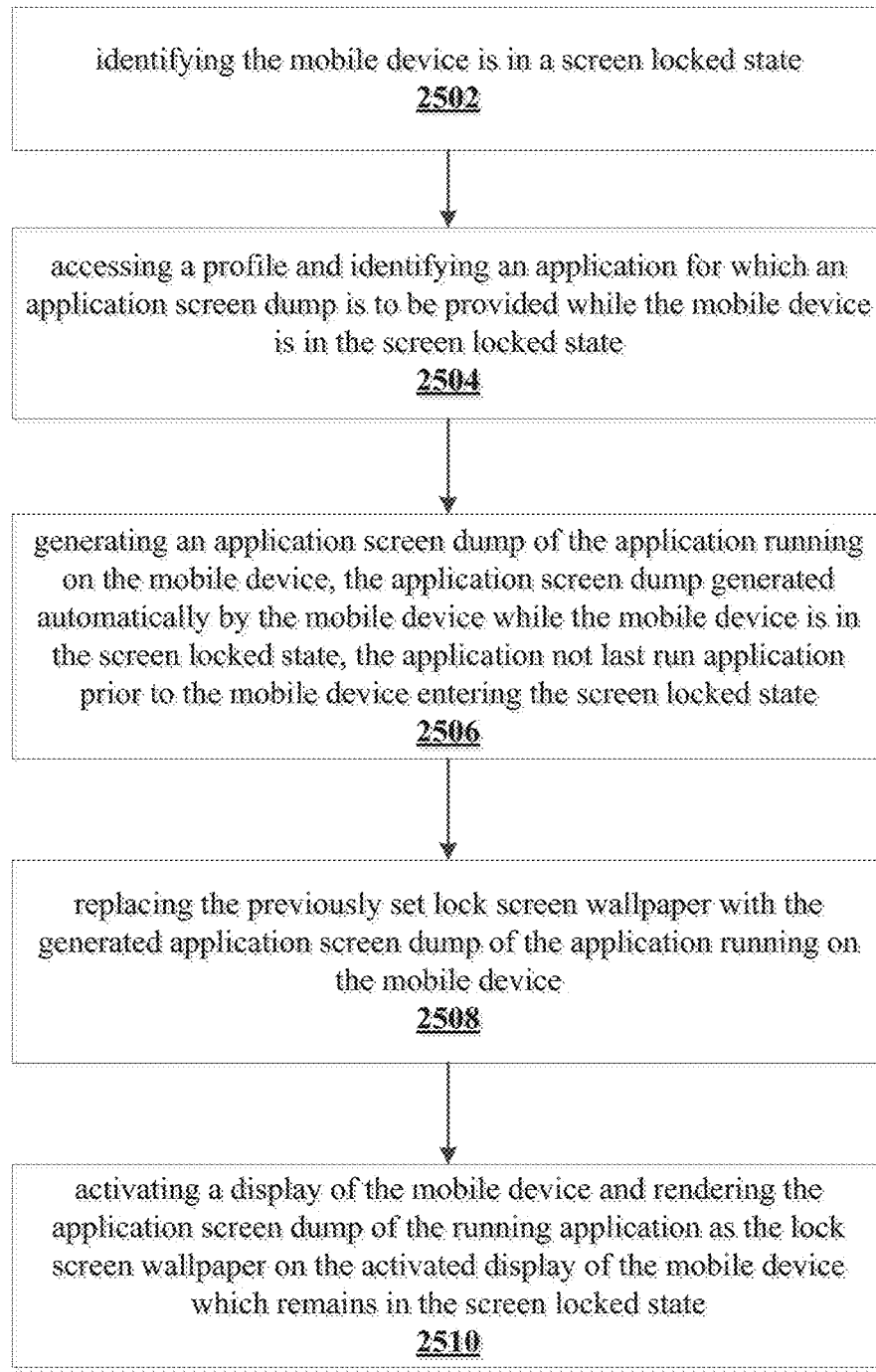
FIG. 25 depicts another embodiment where a profile used to generate an application screen dump where the application is not the last run application.

In one embodiment, as depicted in FIG. 25, the present invention discloses a method as implemented in a mobile device having a previously set lock screen wallpaper, the method comprising: identifying the mobile device is in a screen locked state—step 2502; accessing a profile (which may be stored locally in the mobile device or may be stored in a network that is accessible by the mobile device) and identifying an application for which an application screen dump is to be provided while the mobile device is in the screen locked state—step 2504; generating an application screen dump of the application running on the mobile device, the application screen dump generated automatically by the mobile device while the mobile device is in the screen locked state, the application not last run application prior to the mobile device entering the screen locked state—step 2506; replacing the previously set lock screen wallpaper with the generated application screen dump of the application running on the mobile device—step 2508; activating a display of the mobile device and rendering the application screen dump of the running application as the lock screen wallpaper on the activated display of the mobile device which remains in the screen locked state—step 2510; and wherein the generated application screen dump used as lock screen wallpaper providing a glimpse into the miming application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 25.

Figure 26:
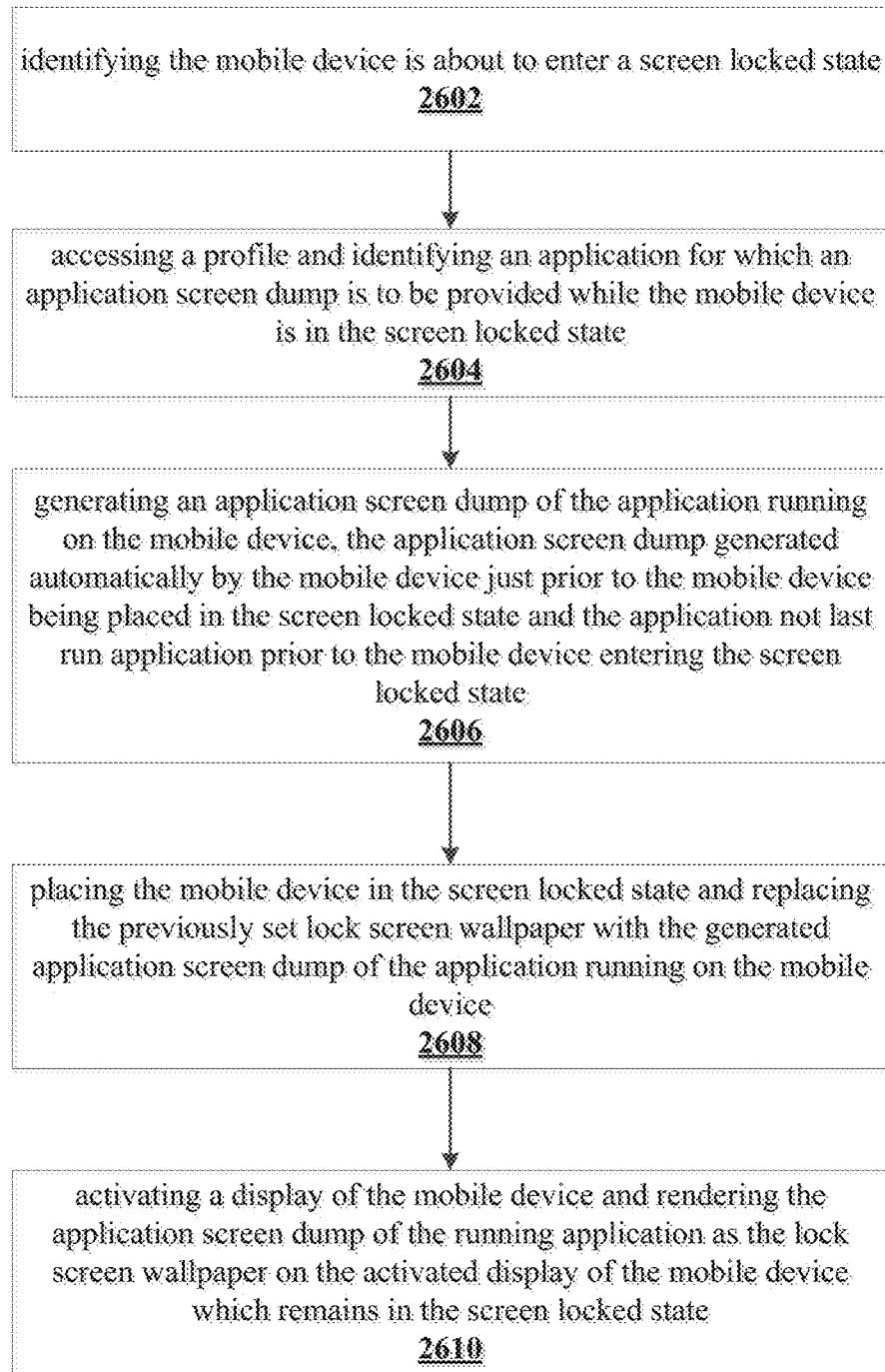
FIG. 26 depicts another embodiment where a profile used to generate an application screen dump where the application is not the last run application and the application screen dump is generated just prior to the mobile device being placed in a screen locked state.

In one embodiment, as depicted in FIG. 26, the present invention discloses a method as implemented in a mobile device having a previously set lock screen wallpaper, the method comprising: identifying the mobile device is about to enter a screen locked state—step 2602; accessing a profile (which may be stored locally in the mobile device or may be stored in a network that is accessible by the mobile device) and identifying an application for which an application screen dump is to be provided while the mobile device is in the screen locked state—step 2604; generating an application screen dump of the application running on the mobile device, the application screen dump generated automatically by the mobile device just prior to the mobile device being placed in the screen locked state and the application not last run application prior to the mobile device entering the screen locked state—step 2606; placing the mobile device in the screen locked state and replacing the previously set lock screen wallpaper with the generated application screen dump of the application running on the mobile device—step 2608; activating a display of the mobile device and rendering the application screen dump of the running application as the lock screen wallpaper on the activated display of the mobile device which remains in the screen locked state—step 2610; and wherein the generated application screen dump used as lock screen wallpaper providing a glimpse into the running application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 26.

Now, a few more application-specific embodiments are described.

Electronic Notes Application

Figure 27:
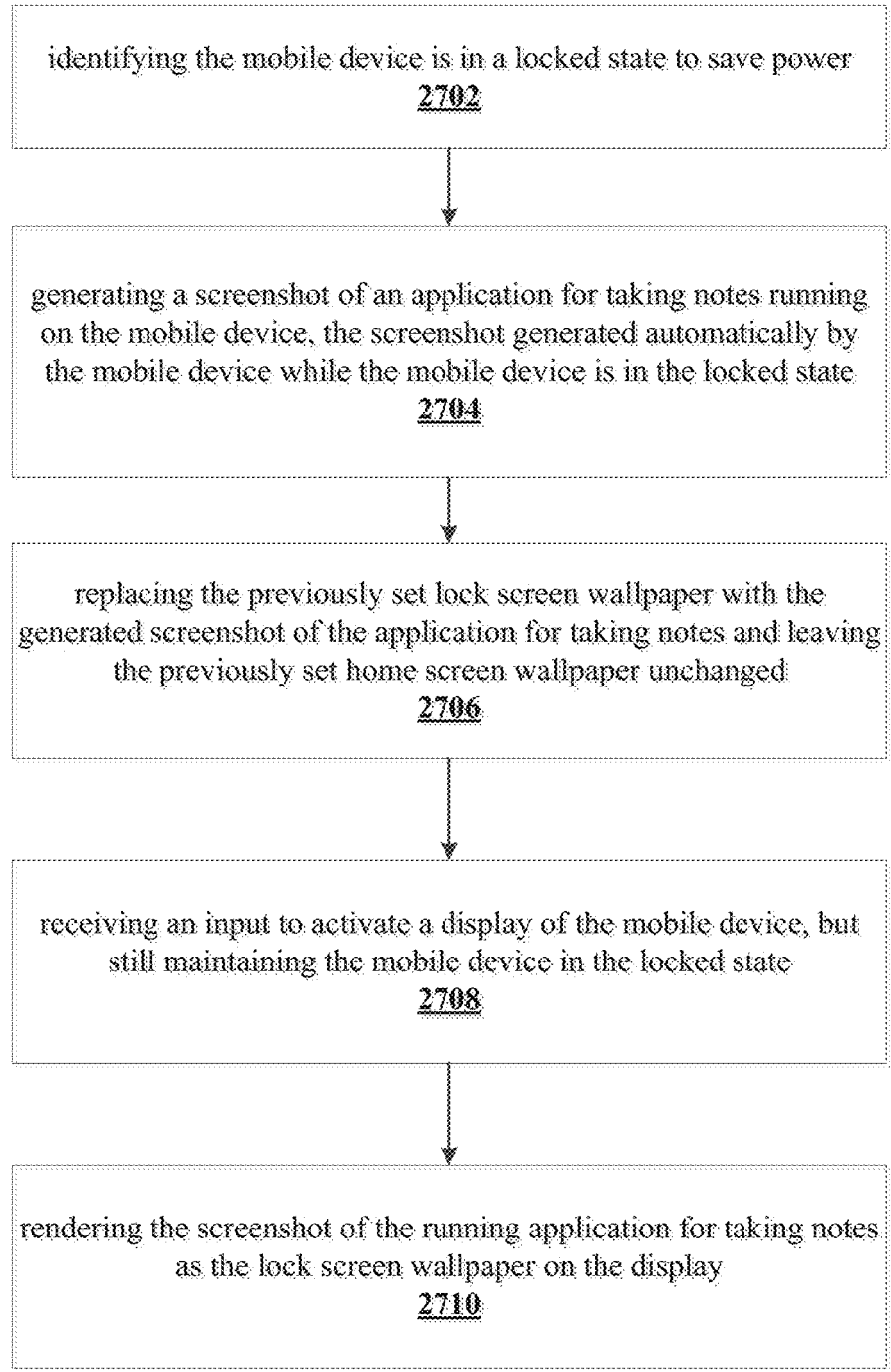
FIG. 27 depicts another embodiment where a screenshot of a notes application is used to replace the lock screen wallpaper of a mobile device.

In one embodiment, as depicted in FIG. 27, the present invention discloses a method as implemented in a mobile device having a previously set lock screen wallpaper, the method comprising: identifying the mobile device is in a locked state to save power—step 2702; generating a screenshot of an application for taking notes running on the mobile device, the screenshot generated automatically by the mobile device while the mobile device is in the locked state—step 2604; replacing the previously set lock screen wallpaper with the generated screenshot of the application for taking notes and leaving the previously set home screen wallpaper unchanged—step 2706; receiving an input to activate a display of the mobile device, but still maintaining the mobile device in the locked state—step 2608; rendering the screenshot of the running application for taking notes as the lock screen wallpaper on the display—step 2710; and wherein the generated screenshot used as lock screen wallpaper providing a glimpse into the running application for taking notes on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 27.

Figure 28:
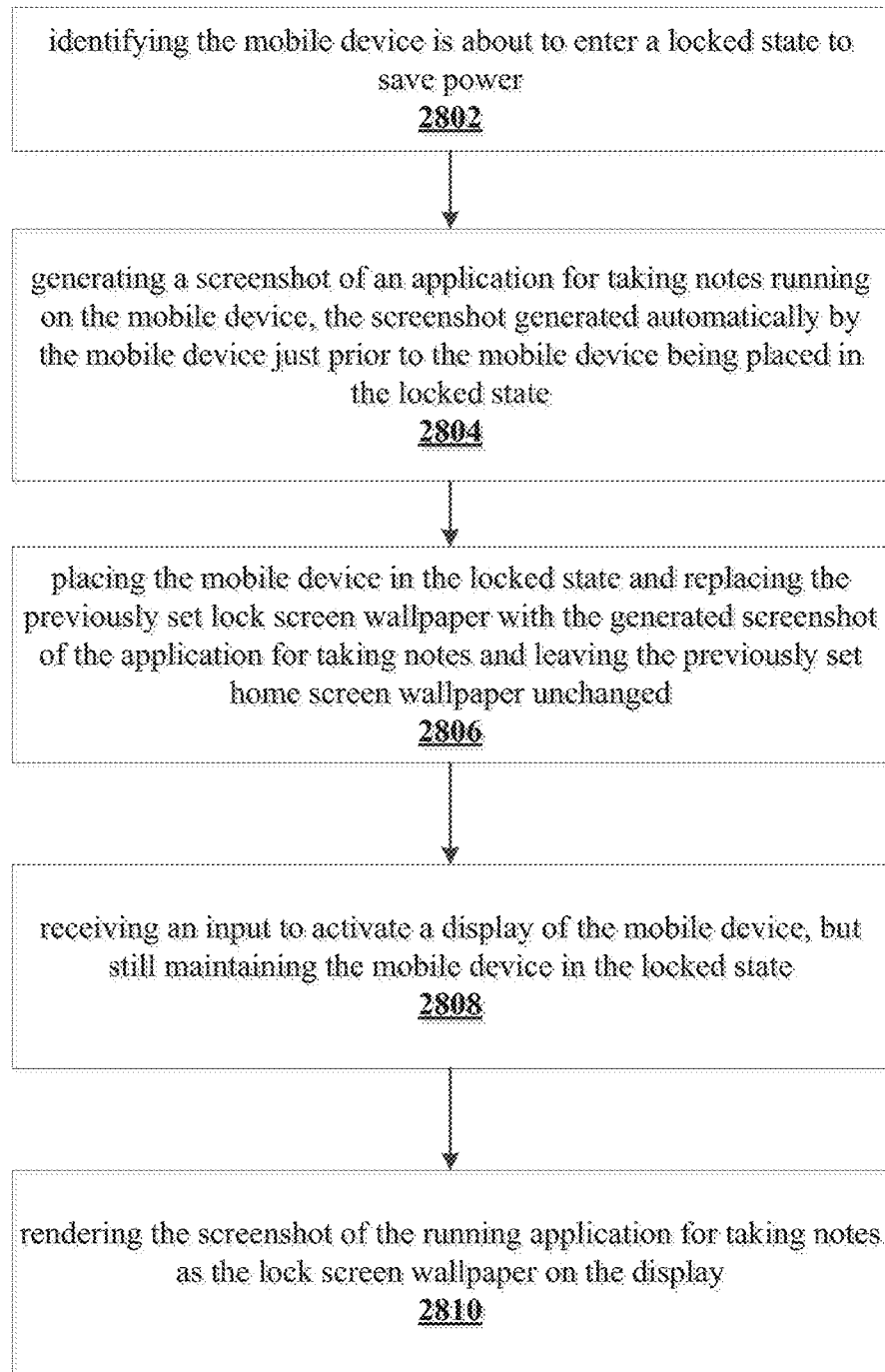
FIG. 28 depicts another embodiment where a screenshot of a notes application is used to replace the lock screen wallpaper of a mobile device and where the screenshot is generated just prior to the mobile device being placed in a locked state.

In one embodiment, as depicted in FIG. 28, the present invention discloses a method as implemented in a mobile device having a previously set lock screen wallpaper, the method comprising: identifying the mobile device is about to enter a locked state to save power—step 2802; generating a screenshot of an application for taking notes running on the mobile device, the screenshot generated automatically by the mobile device just prior to the mobile device being placed in the locked state—step 2804; placing the mobile device in the locked state and replacing the previously set lock screen wallpaper with the generated screenshot of the application for taking notes and leaving the previously set home screen wallpaper unchanged—step 2806; receiving an input to activate a display of the mobile device, but still maintaining the mobile device in the locked state—step 2808; rendering the screenshot of the running application for taking notes as the lock screen wallpaper on the display—step 2810; and wherein the generated screenshot used as lock screen wallpaper providing a glimpse into the running application for taking notes on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 28.

Email Application

Figure 29:
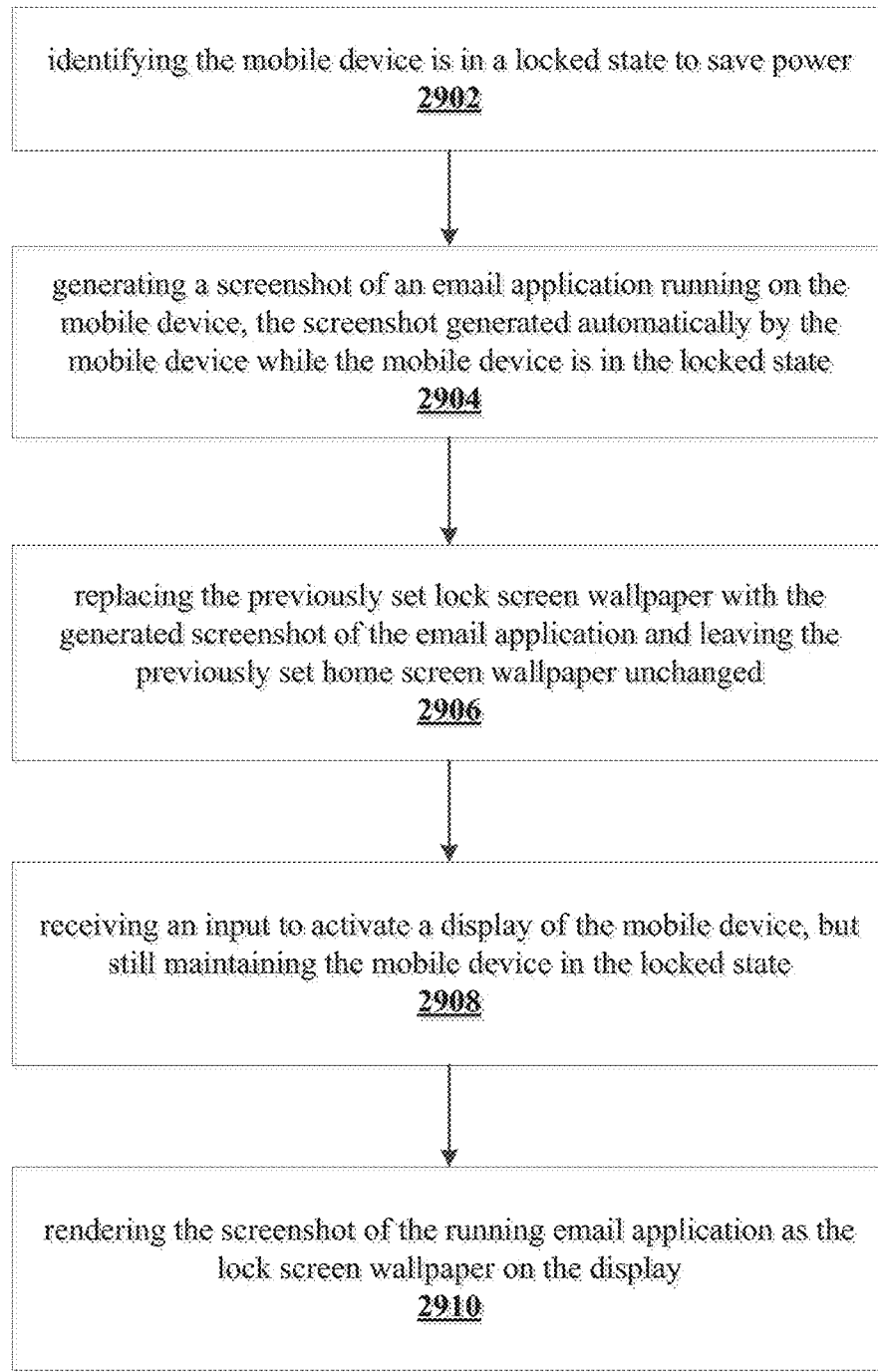
FIG. 29 depicts another embodiment where a screenshot of an email application is used to replace the lock screen wallpaper of a mobile device.

In one embodiment, as depicted in FIG. 29, the present invention discloses a method as implemented in a mobile device having a previously set lock screen wallpaper and a previously set home screen wallpaper, the method comprising: identifying the mobile device is in a locked state to save power—step 2902; generating a screenshot of an email application running on the mobile device, the screenshot generated automatically by the mobile device while the mobile device is in the locked state—step 2904; replacing the previously set lock screen wallpaper with the generated screenshot of the email application and leaving the previously set home screen wallpaper unchanged—step 2906; receiving an input to activate a display of the mobile device, but still maintaining the mobile device in the locked state—step 2908; rendering the screenshot of the running email application as the lock screen wallpaper on the display—step 2910; and wherein the generated screenshot used as lock screen wallpaper providing a glimpse into the running email application on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 29.

Figure 30:
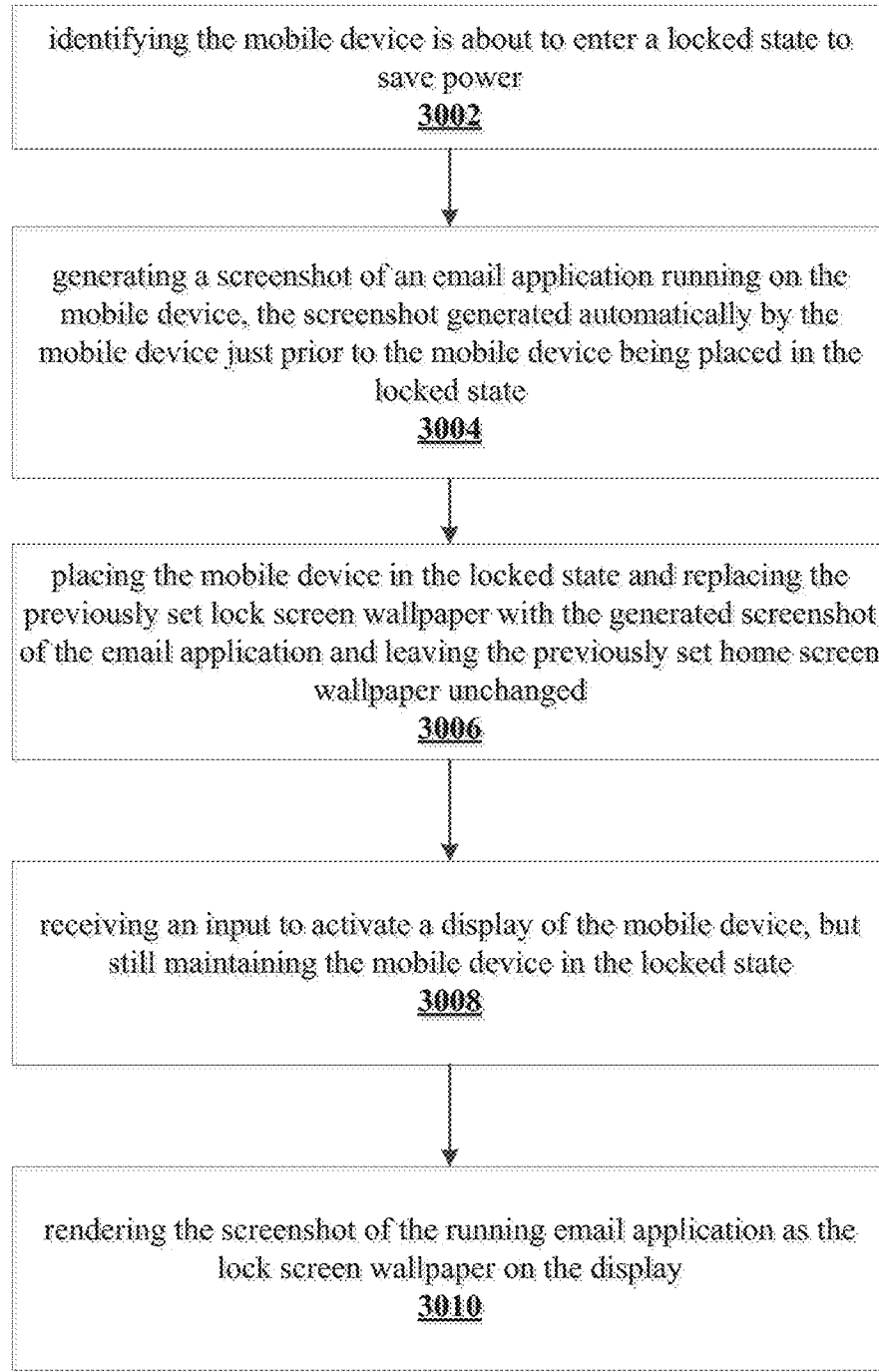
FIG. 30 depicts another embodiment where a screenshot of an email application is used to replace the lock screen wallpaper of a mobile device and where the screenshot is generated just prior to the mobile device being placed in a locked state.

In one embodiment, as depicted in FIG. 30, the present invention discloses a method as implemented in a mobile device having a previously set lock screen wallpaper and a previously set home screen wallpaper, the method comprising: identifying the mobile device is about to enter a locked state to save power—step 3002; generating a screenshot of an email application running on the mobile device, the screenshot generated automatically by the mobile device just prior to the mobile device being placed in the locked state—step 3004; placing the mobile device in the locked state and replacing the previously set lock screen wallpaper with the generated screenshot of the email application and leaving the previously set home screen wallpaper unchanged—step 3006; receiving an input to activate a display of the mobile device, but still maintaining the mobile device in the locked state—step 3008; rendering the screenshot of the running email application as the lock screen wallpaper on the display—step 3010; and wherein the generated screenshot used as lock screen wallpaper providing a glimpse into the running email application on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 30.

Figure 31:
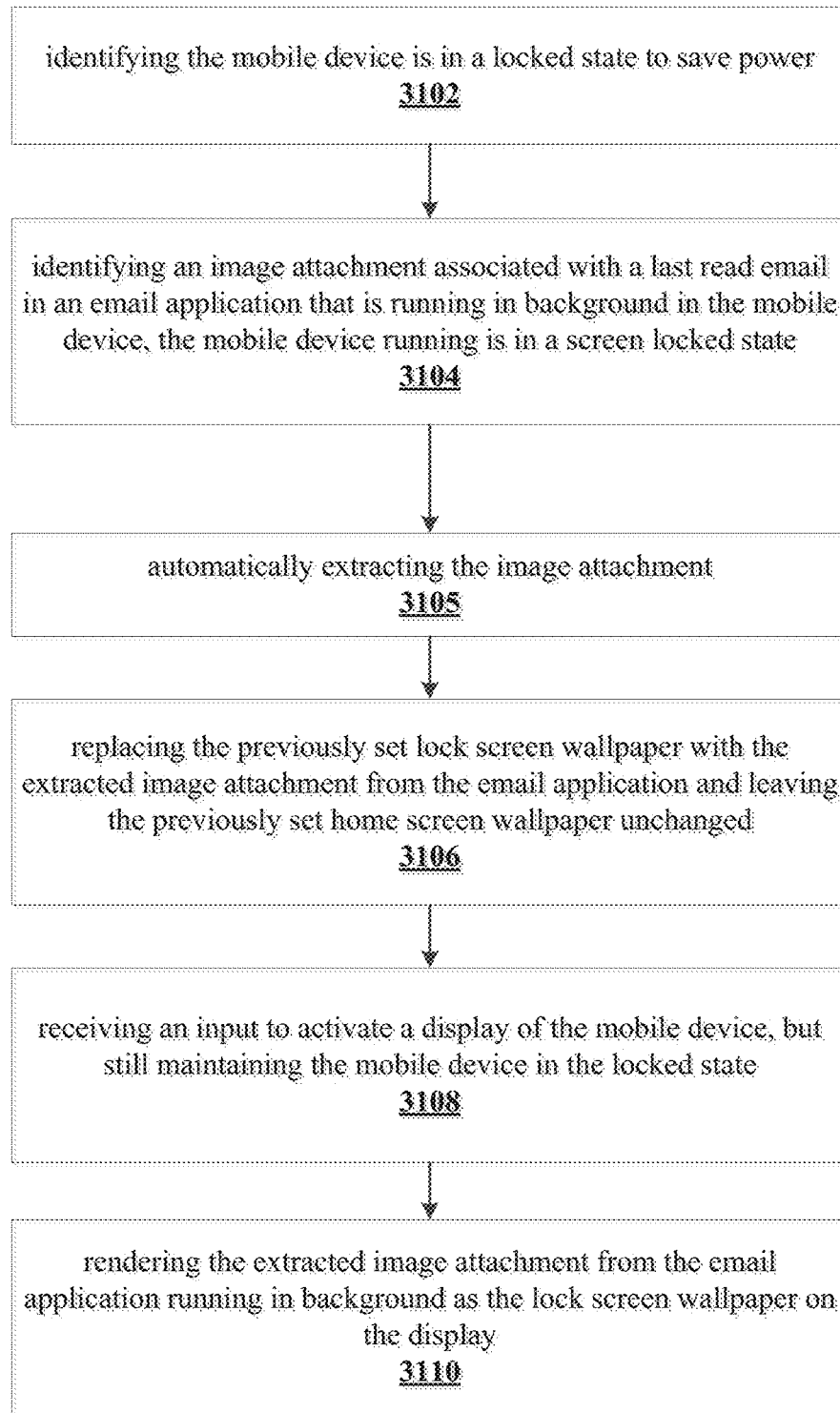
FIG. 31 depicts another embodiment where an image attachment of the last read email is used to replace the lock screen wallpaper of a mobile device.

In one embodiment, as depicted in FIG. 31, the present invention discloses a method as implemented in a mobile device having a previously set lock screen wallpaper and a previously set home screen wallpaper, the method comprising: identifying the mobile device is in a locked state to save power—step 3102; identifying an image attachment associated with a last read email in an email application that is running in background in the mobile device, the mobile device running is in a screen locked state—step 3104; automatically extracting the image attachment—step 3105; replacing the previously set lock screen wallpaper with the extracted image attachment from the email application and leaving the previously set home screen wallpaper unchanged—step 3106; receiving an input to activate a display of the mobile device, but still maintaining the mobile device in the locked state—step 3108; rendering the extracted image attachment from the email application running in background as the lock screen wallpaper on the display—step 3110; and wherein the extracted image attachment used as lock screen wallpaper providing a glimpse into the attachment of the last read email, without having to unlock the mobile device. In another embodiment, the present invention discloses an article of manufacture having non-transitory computer readable storage medium comprising computer readable program code executable by a processor in a mobile device to implement the method depicted in FIG. 31.

Figure 32:
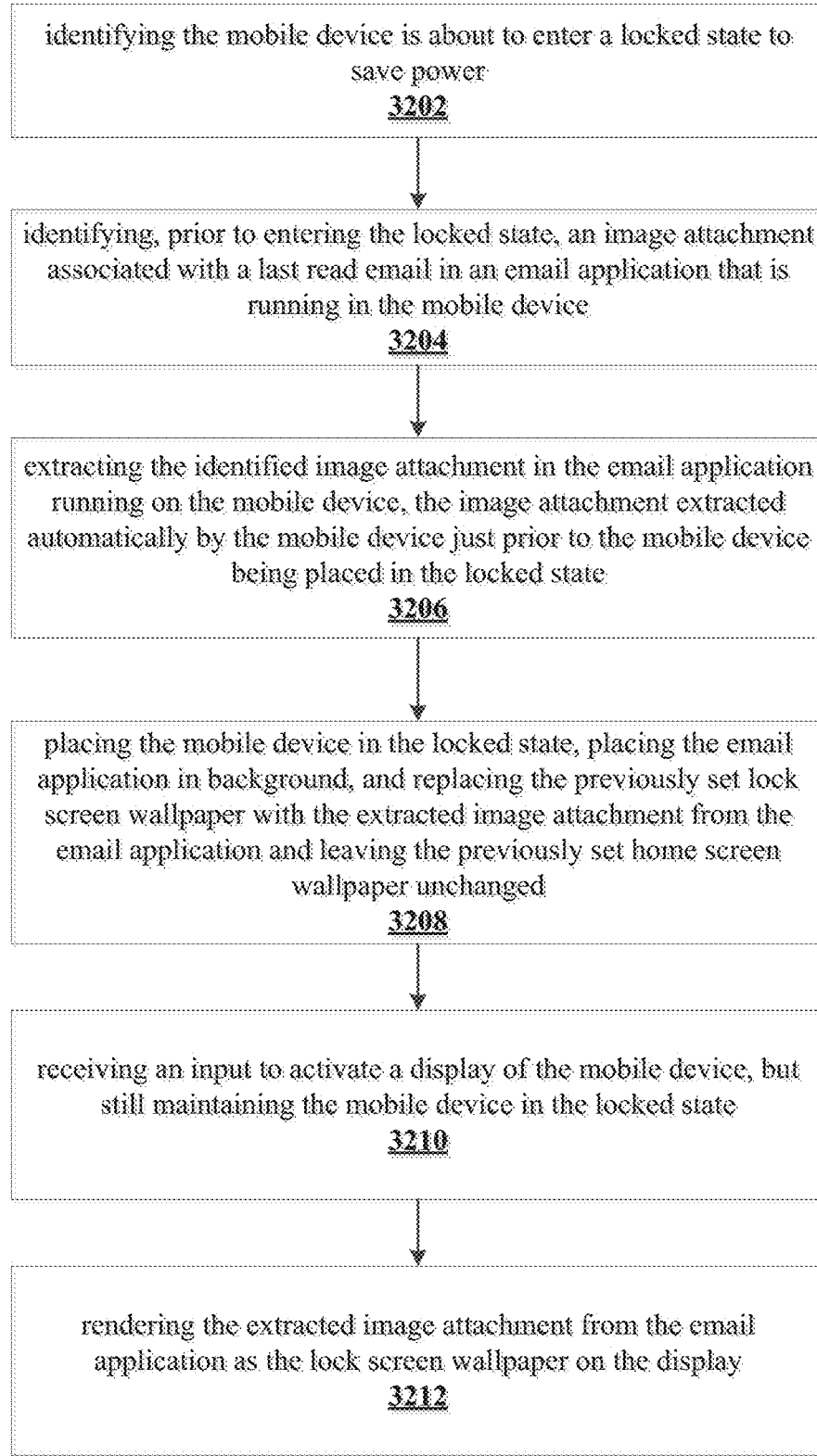
FIG. 32 depicts another embodiment where an image attachment of the last read email is identified prior to entering a locked state, with the image attachment used to replace the lock screen wallpaper.

In one embodiment, as depicted in FIG. 32, the present invention discloses a method as implemented in a mobile device having a previously set lock screen wallpaper and a previously set home screen wallpaper, the method comprising: identifying the mobile device is about to enter a locked state to save power—step 3202; identifying, prior to entering the locked state, an image attachment associated with a last read email in an email application that is running in the mobile device—step 3204; extracting the identified image attachment in the email application running on the mobile device, the image attachment extracted automatically by the mobile device just prior to the mobile device being placed in the locked state—step 3206; placing the mobile device in the locked state, placing the email application in background, and replacing the previously set lock screen wallpaper with the extracted image attachment from the email application and leaving the previously set home screen wallpaper unchanged—step 3208; receiving an input to activate a display of the mobile device, but still maintaining the mobile device in the locked state—step 3210; rendering the extracted image attachment from the email application as the lock screen wallpaper on the display—step 3212; and wherein the extracted image attachment used as lock screen wallpaper providing a glimpse into the attachment of the last read email, without having to unlock the mobile device. In another embodiment, the present invention discloses an article of manufacture having non-transitory computer readable storage medium comprising computer readable program code executable by a processor in a mobile device to implement the method depicted in FIG. 32.

While this example is used to illustrate a single image attachment, the present invention may be used similarly when there are a plurality of image attachments, where each of the plurality of attachments may be rendered as the lock screen wallpaper in a successive fashion similar to what was described previously in FIG. 15 and FIG. 16. Similarly, a plurality of image attachments may also be rendered using collage or transparency techniques as described previously with regards to FIG. 19 and FIG. 20 and as shown in FIGS. 55A-C. Also, the user may, as part of his/her profile, identify one or more names, one or more email addresses, and/or one or more mail domains, whose emails should be used in such rendering of email attachments, where all other emails are not used in such rendering of email attachments.

Social Media Application

Figure 33:
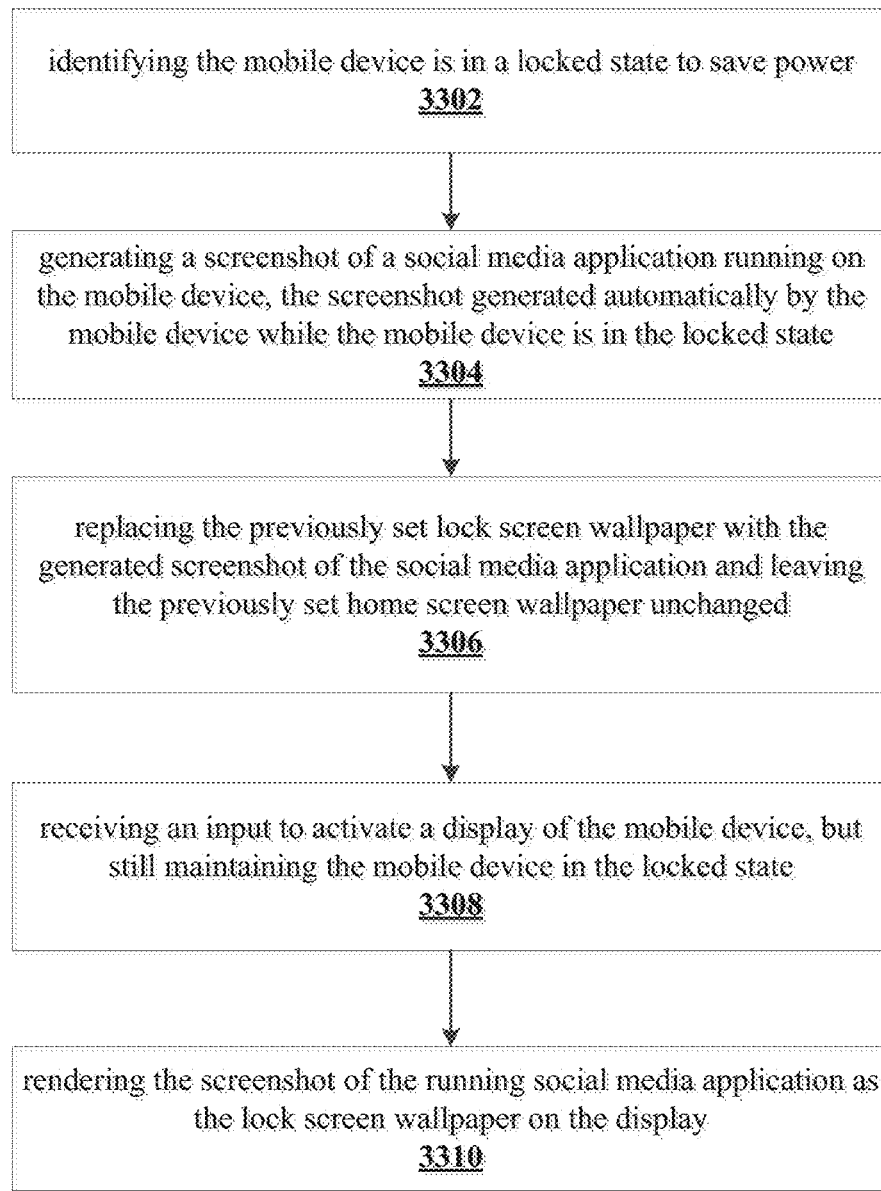
FIG. 33 depicts another embodiment where a screenshot of a social media application is used to replace the lock screen wallpaper of a mobile device.

In one embodiment, as depicted in FIG. 33, the present invention discloses a method as implemented in a mobile device having a previously set lock screen wallpaper and a previously set home screen wallpaper, the method comprising: identifying the mobile device is in a locked state to save power—step 3302; generating a screenshot of a social media application running on the mobile device, the screenshot generated automatically by the mobile device while the mobile device is in the locked state—step 3304; replacing the previously set lock screen wallpaper with the generated screenshot of the social media application and leaving the previously set home screen wallpaper unchanged—step 3306; receiving an input to activate a display of the mobile device, but still maintaining the mobile device in the locked state—step 3308; rendering the screenshot of the running social media application as the lock screen wallpaper on the display—step 3310; and wherein the generated screenshot used as lock screen wallpaper providing a glimpse into the running social media application on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 33.

Figure 34:
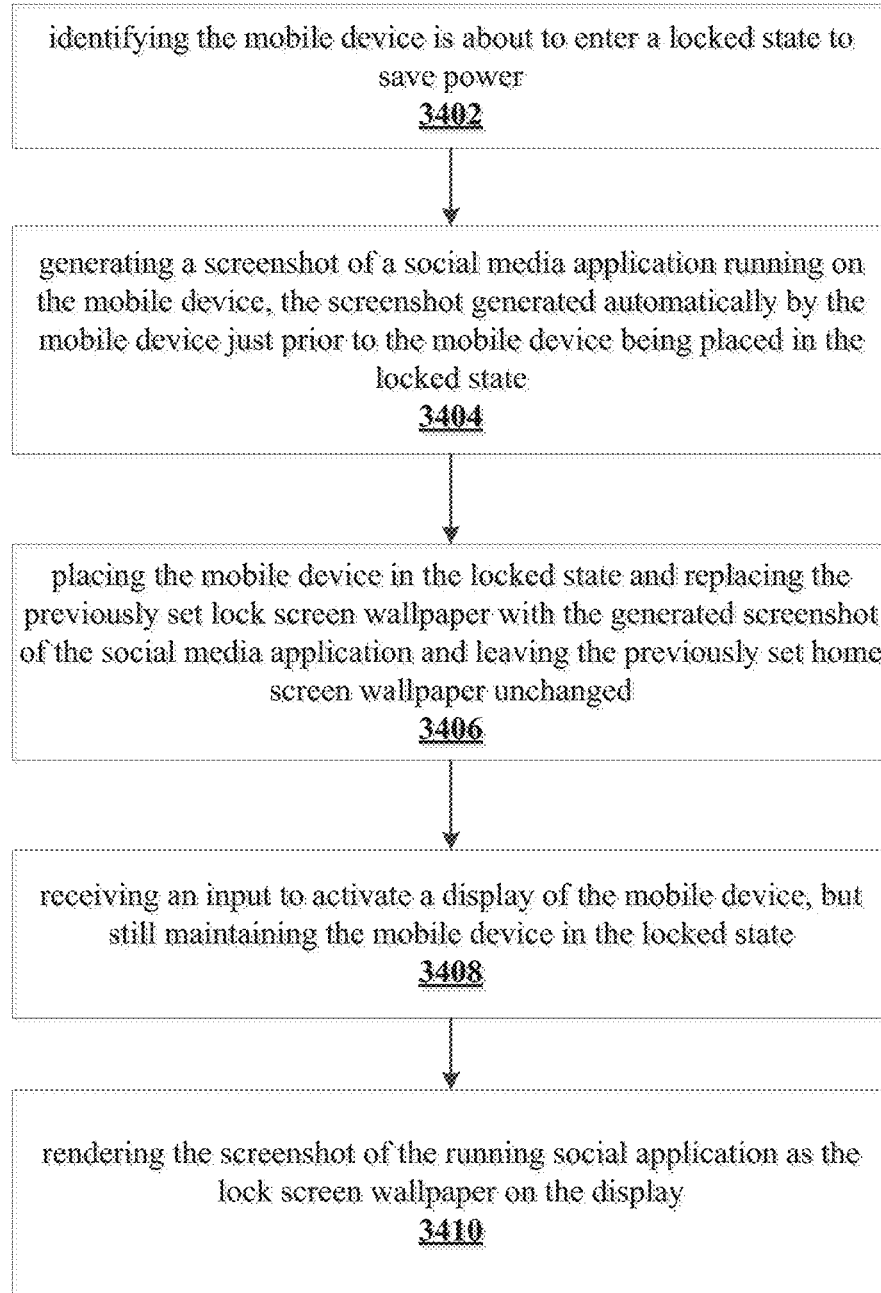
FIG. 34 depicts another embodiment where a screenshot of a social media application is used to replace the lock screen wallpaper of a mobile device and where the screenshot is generated just prior to the mobile device being placed in a locked state.

In one embodiment, as depicted in FIG. 34, the present invention discloses a method as implemented in a mobile device having a previously set lock screen wallpaper and a previously set home screen wallpaper, the method comprising: identifying the mobile device is about to enter a locked state to save power—step 3402; generating a screenshot of a social media application running on the mobile device, the screenshot generated automatically by the mobile device just prior to the mobile device being placed in the locked state—step 3404; placing the mobile device in the locked state and replacing the previously set lock screen wallpaper with the generated screenshot of the social media application and leaving the previously set home screen wallpaper unchanged—step 3406; receiving an input to activate a display of the mobile device, but still maintaining the mobile device in the locked state—step 3408; rendering the screenshot of the running social application as the lock screen wallpaper on the display—step 3410; and wherein the generated screenshot used as lock screen wallpaper providing a glimpse into the running social media application on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 34.

Figure 35:
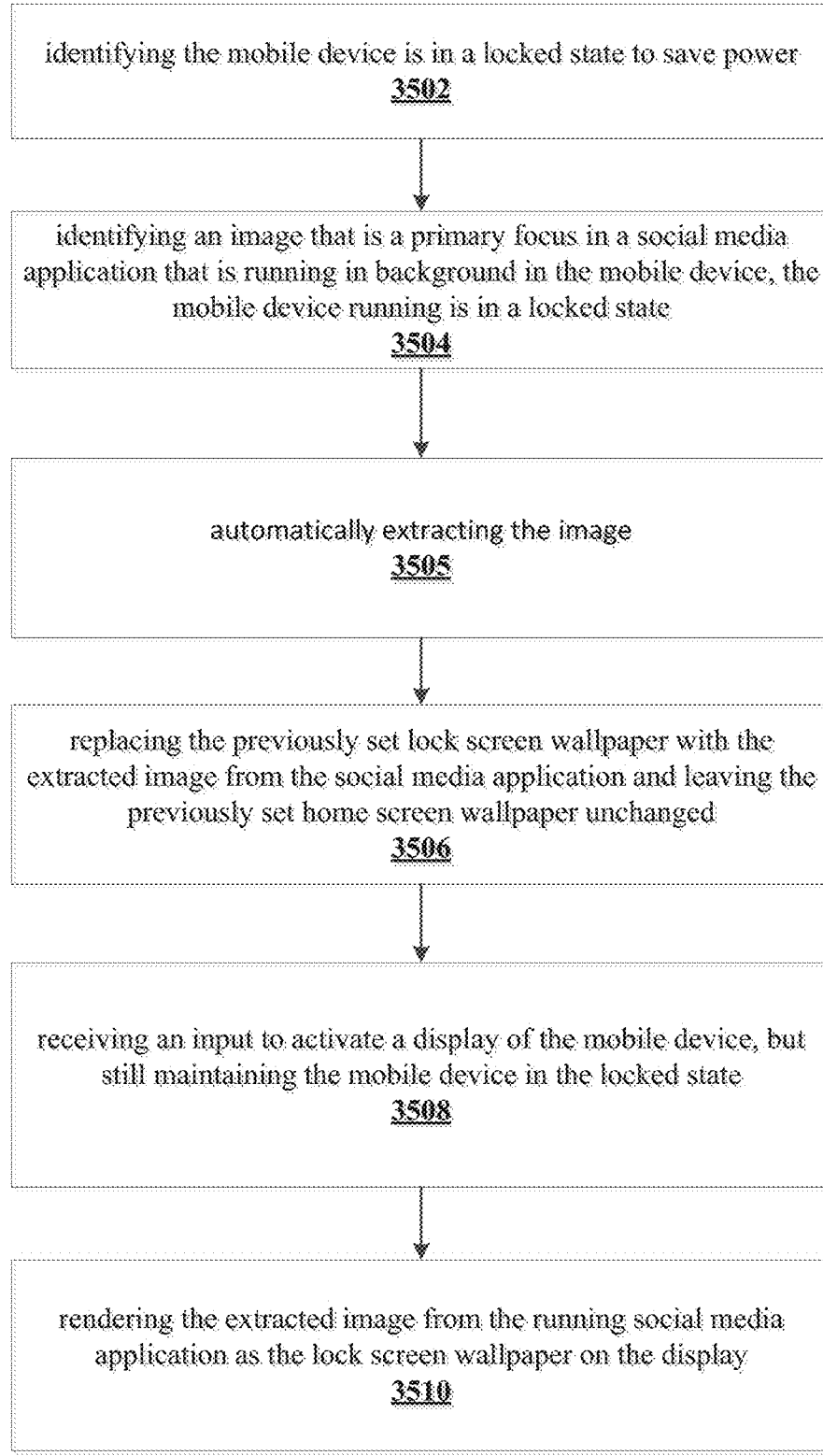
FIG. 35 depicts another embodiment where an image that is a primary focus in a social media application is used to replace a lock screen wallpaper of a mobile device.

In one embodiment, as depicted in FIG. 35, the present invention discloses a method as implemented in a mobile device having a previously set lock screen wallpaper and a previously set home screen wallpaper, the method comprising: identifying the mobile device is in a locked state to save power—step 3502; identifying an image that is a primary focus in a social media application that is running in background in the mobile device (primary focus as used herein simply refers to the image in a social feed that the user was viewing on the screen of the mobile device), the mobile device running is in a locked state (low power state)—step 3504; automatically extracting the image—step 3505; replacing the previously set lock screen wallpaper with the extracted image from the social media application and leaving the previously set home screen wallpaper unchanged—step 3506; receiving an input to activate a display of the mobile device, but still maintaining the mobile device in the locked state—step 3508; rendering the extracted image from the running social media application as the lock screen wallpaper on the display—step 3510; and wherein the extracted image used as lock screen wallpaper providing a glimpse into the image that is a primary focus in the social media application running in background, without having to unlock the mobile device. In another embodiment, the present invention discloses an article of manufacture having non-transitory computer readable storage medium comprising computer readable program code executable by a processor in a mobile device to implement the method depicted in FIG. 35.

Figure 36:
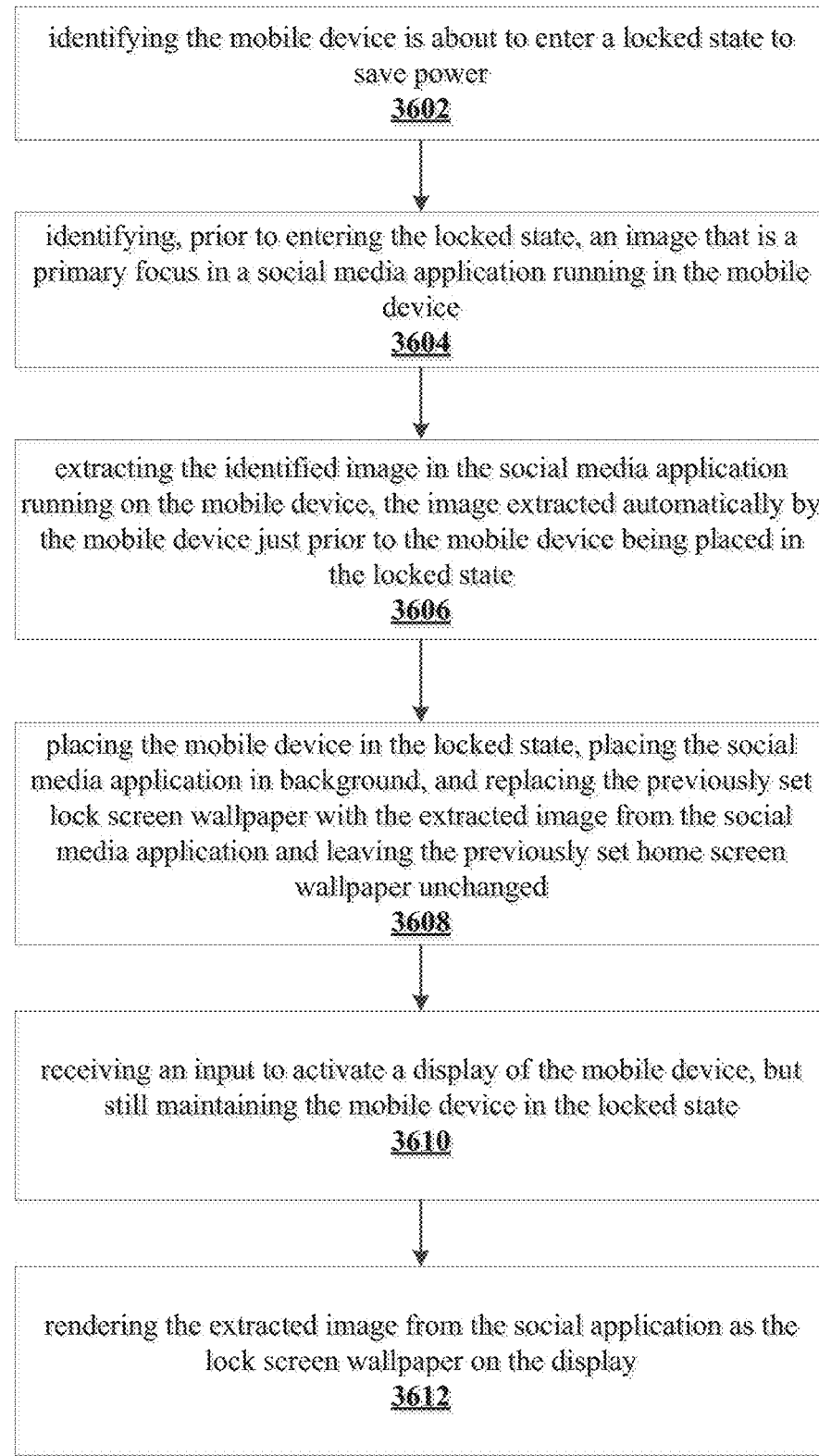
FIG. 36 depicts another embodiment where an image that is a primary focus in a social media application is identified, prior to a mobile device entering a locked state, and is used to replace a lock screen wallpaper of a mobile device.

In one embodiment, as depicted in FIG. 36, the present invention discloses a method as implemented in a mobile device having a previously set lock screen wallpaper and a previously set home screen wallpaper, the method comprising: identifying the mobile device is about to enter a locked state to save power—step 3602; identifying, prior to entering the locked state, an image that is a primary focus in a social media application running in the mobile device—step 3604; extracting the identified image in the social media application running on the mobile device, the image extracted automatically by the mobile device just prior to the mobile device being placed in the locked state—step 3606; placing the mobile device in the locked state, placing the social media application in background, and replacing the previously set lock screen wallpaper with the extracted image from the social media application and leaving the previously set home screen wallpaper unchanged—step 3608; receiving an input to activate a display of the mobile device, but still maintaining the mobile device in the locked state—step 3610; rendering the extracted image from the social application as the lock screen wallpaper on the display—step 3612; and wherein the extracted image used as lock screen wallpaper providing a glimpse into the image that is a primary focus in the social media application running in background, without having to unlock the mobile device. In another embodiment, the present invention discloses an article of manufacture having non-transitory computer readable storage medium comprising computer readable program code executable by a processor in a mobile device to implement the method depicted in FIG. 36.

While this example is used to illustrate a single image that is the primary focus, the present invention may be used similarly when there are a plurality of images (e.g., when the social media application has more than one image that was being viewed by the user prior to the mobile device entering the screen locked state or prior to social media application being pushed to run in the background), where each of the plurality of images may be rendered as the lock screen wallpaper in a successive fashion similar to what was described previously in FIG. 15 and FIG. 16. Similarly, a plurality of images may also be rendered using collage or transparency techniques as described previously with regards to FIG. 19 and FIG. 20 and as shown in FIGS. 55A-C.

Also, the user may, as part of his/her profile, identify one or more names or one or more social media handles/usernames, whose images should be used when rendering such images as a lock screen wallpaper (where all other images are ignored and cannot be used as lock screen wallpapers). For example, a user may only want to use his/her child's social feed images as the lock screen wallpaper, whereby all other images are ignored. In this example, if the user was looking at an image from his/her child's social media feed on a social media application on the mobile device prior to the mobile device entering a screen locked state, such an image can be used as the lock screen wallpaper. The user may also define, as part of his/her profile, a minimum number of likes an image should have received prior to being used as the lock screen wallpaper. In this example, if the user was looking at an image in his/her social media feed on a social media application on the mobile device prior to the mobile device entering a screen locked state, such an image can be used as the lock screen wallpaper only if that image has, for example, more than ten likes. Similarly, the user may also define, as part of his/her profile, that only an image within a given time period, e.g., the last hour, should be used as a lock screen wallpaper image. Similarly, the user may also define, as part of his/her profile, that only an image that was approved/liked/retweeted/favorite by another specific user should be used as a lock screen wallpaper image.

Various combinations of these examples may also be implemented. For example, a user may indicate in his/her profile that only when an image has more than 20 favorites/likes/retweets, AND when the image was posted in a social media feed of a particular user noted in the profile (e.g., his/her son, his/her daughter, his/her mother, his/her, AND when the image was posted within the last 24 hours, is such an image to be used as the lock screen wallpaper. In this example, only when the image in the primary focus (i.e., the image the user was looking at prior to the mobile device enters the screen lock mode) AND when the image in the primary focus satisfies the specific condition in the profile (i.e., image being from the particular user's AND image having more than 20 likes/favorites/retweets AND the image posted within the last 24 hours) is it allowed to be used as an image to replace the lock screen wallpaper image.

In another embodiment, the profile could be set up where a social status of a particular user may be monitored (in the background) at pre-determined intervals for a social status update and an image representing a screen capture of a social status update associated with that particular user may be used as the lock screen wallpaper. For example, a user may set up his profile such that every time one of his children has a new social status update, an image is generated showing this social status update (e.g., an image depicting this social status) and this image may be temporarily used as the lock screen wallpaper, where the user can activate the display of the mobile device and look at this social status without having to unlock the mobile device. As above, various rules may also be implemented in the profile. For example, the profile may be setup where only when the social status update has more than 20 likes/favorites/retweets AND only when the social status update was posted within the last 24 hours is it allowed to be used as an image to replace the lock screen wallpaper image.

In another embodiment, the profile could be set up where a social status of a particular user may be monitored (in the background) at pre-determined intervals for an image posted as part of a social status update where the image may be used as the lock screen wallpaper. For example, a user may set up his profile such that every time one of his children has a new image as part of their social status update, this image may be extracted and temporarily used as the lock screen wallpaper, where the user can activate the display of the mobile device and look at this image (that was posted as part of a social status update by his/her children) without having to unlock the mobile device. As above, various rules may also be implemented in the profile. For example, the profile may be setup where only when the image associated with the social status update has more than 20 likes/favorites/retweets AND only when the social status update was posted within the last 24 hours is it allowed to be used as an image to replace the lock screen wallpaper image.

While these examples are used to illustrate single images that are used as the lock screen wallpaper, the present invention may be used similarly when there are a plurality of images, where each of the plurality of images may be rendered as the lock screen wallpaper in a successive fashion similar to what was described previously in FIG. 15 and FIG. 16. Similarly, a plurality of images may also be rendered using collage or transparency techniques as described previously with regards to FIG. 19 and FIG. 20 and as shown in FIGS. 55A-C.

Television Application

Another example of how the teachings of the present invention may be utilized involves television. For example, while watching a TV show in real time, the user may only want to view an important tweet on Twitter® that relates to a TV show. In this example, a tweet (with just text or with text and/or image) with the most number of retweets, favorites, or comments is extracted from a hashtag associated with that TV show (e.g., the most retweeted tweet from

GameofThrones feed) or from within a currently trending topic that is related to that TV show is identified. This identified tweet is then rendered as the lock screen wallpaper within the duration of the show. This process could be dynamically updated at regular intervals, such that the most up-to-date tweet with the most number of retweets, favorites, or comments may be rendered as the lock screen wallpaper. As noted above in the social feed example, textual tweets may be converted to an image, which may then be rendered as the lock screen wallpaper. In the instance the most retweeted/favorite/commented on item in the social media is an image, that image is rendered as the lock screen wallpaper. In a Facebook® scenario, an image or a status that was most liked or commented on by other users with regards to the TV show may be used as the lock screen wallpaper. If the user is not viewing the TV program in real-time (e.g., when the user is watching it via a DVR after the show is over), there is no need for such dynamic updating and the trending topics are not reviewed (as the show is not viewed in real time). Also, profiles may be used as described with regards to the social feed example to limit the tweet or social status regarding the TV show to only his/her friends and/or family (and not any one from the general public). For example, a user may define in the profile that only tweets from a subset of friends in his social circle are to be used to generate the image used to replace the lock screen wallpaper. Further, the user may indicate in a profile the name of the TV show he/she is interested in, which is then used to look up (using, for example, the Internet) when new episodes are broadcast, so that the mobile device knows when these tweets or social statuses related to the TV show may be shown as the lock screen wallpaper. Alternatively, the mobile device may passively monitor audio output of the TV (which could be either automatically activated or may be activated by user input) to identify the TV show (via, for example, audio fingerprinting), extract social statuses/images of interest to the user, and serve these extracted social statuses/images of interest as the lock screen wallpaper during the broadcast of the TV show.

Browser Application

Figure 37:
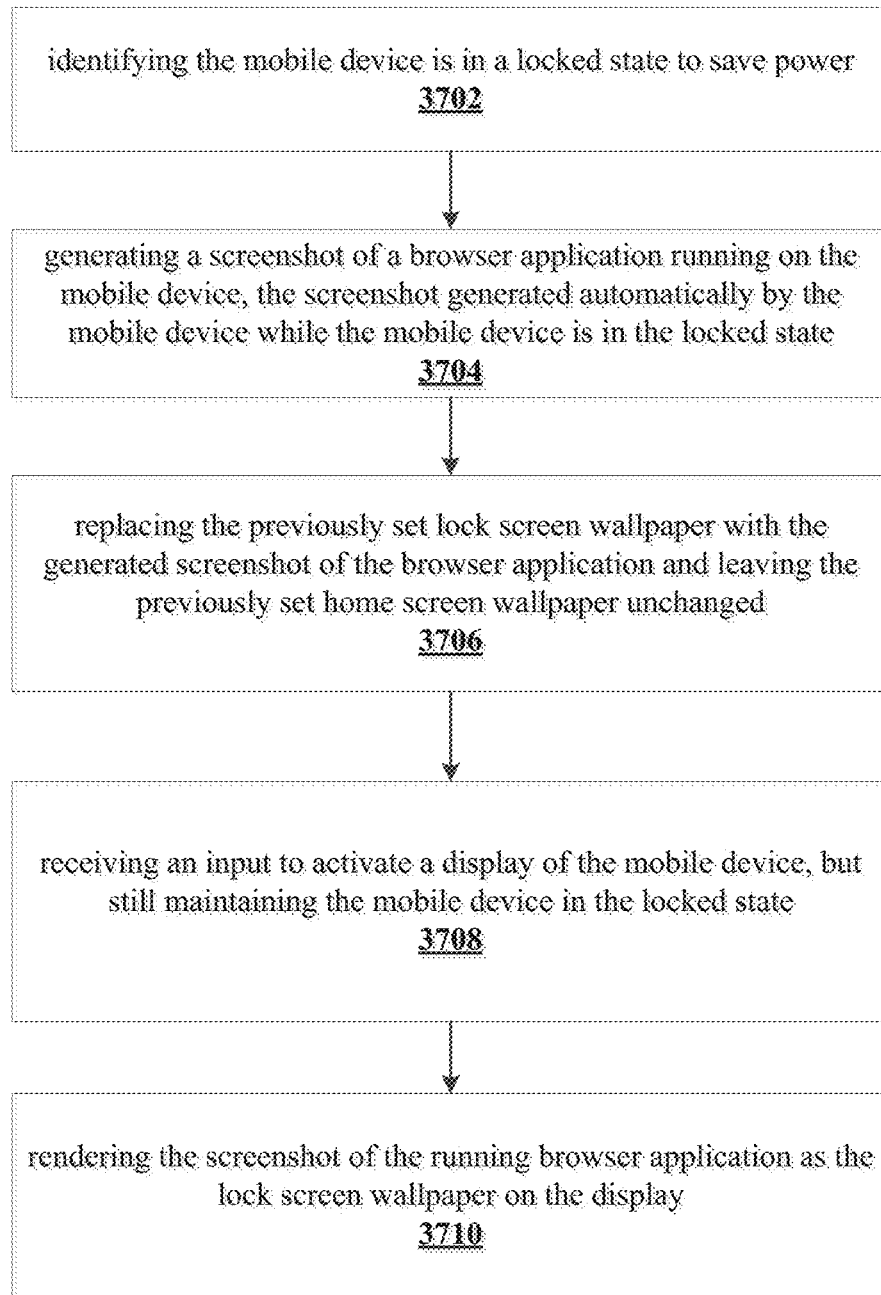
FIG. 37 depicts another embodiment where a screenshot of a browser application is used to replace the lock screen wallpaper of a mobile device.

In one embodiment, as depicted in FIG. 37, the present invention discloses a method as implemented in a mobile device having a previously set lock screen wallpaper and a previously set home screen wallpaper, the method comprising: identifying the mobile device is in a locked state to save power—step 3702; generating a screenshot of a browser application running on the mobile device, the screenshot generated automatically by the mobile device while the mobile device is in the locked state—step 3704; replacing the previously set lock screen wallpaper with the generated screenshot of the browser application and leaving the previously set home screen wallpaper unchanged—step 3706; receiving an input to activate a display of the mobile device, but still maintaining the mobile device in the locked state—step 3708; rendering the screenshot of the running browser application as the lock screen wallpaper on the display—step 3710; and wherein the generated screenshot used as lock screen wallpaper providing a glimpse into the running browser application on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 37.

Figure 38:
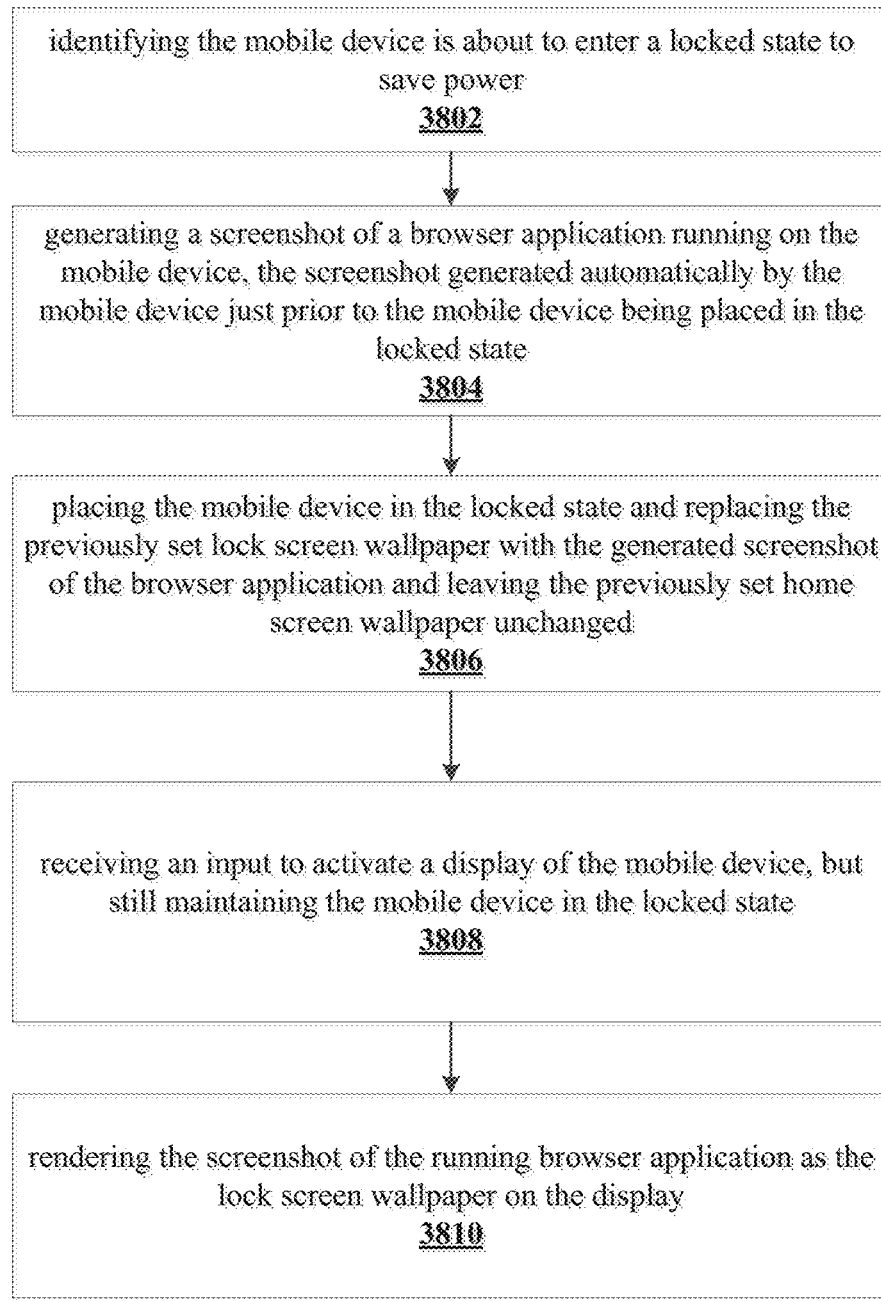
FIG. 38 depicts another embodiment where a screenshot of a browser application is used to replace the lock screen wallpaper of a mobile device and where the screenshot is generated just prior to the mobile device being placed in a locked state.

In one embodiment, as depicted in FIG. 38, the present invention discloses a method as implemented in a mobile device having a previously set lock screen wallpaper and a previously set home screen wallpaper, the method comprising: identifying the mobile device is about to enter a locked state to save power—step 3802; generating a screenshot of a browser application running on the mobile device, the screenshot generated automatically by the mobile device just prior to the mobile device being placed in the locked state—step 3804; placing the mobile device in the locked state and replacing the previously set lock screen wallpaper with the generated screenshot of the browser application and leaving the previously set home screen wallpaper unchanged—step 3806; receiving an input to activate a display of the mobile device, but still maintaining the mobile device in the locked state—step 3808; rendering the screenshot of the running browser application as the lock screen wallpaper on the display—step 3810; and wherein the generated screenshot used as lock screen wallpaper providing a glimpse into the running browser application on the mobile device in the locked state, without having to unlock the mobile device. In another embodiment, the present invention discloses an article of manufacture having non-transitory computer readable storage medium comprising computer readable program code executable by a processor in a mobile device to implement the method depicted in FIG. 38.

Figure 39:
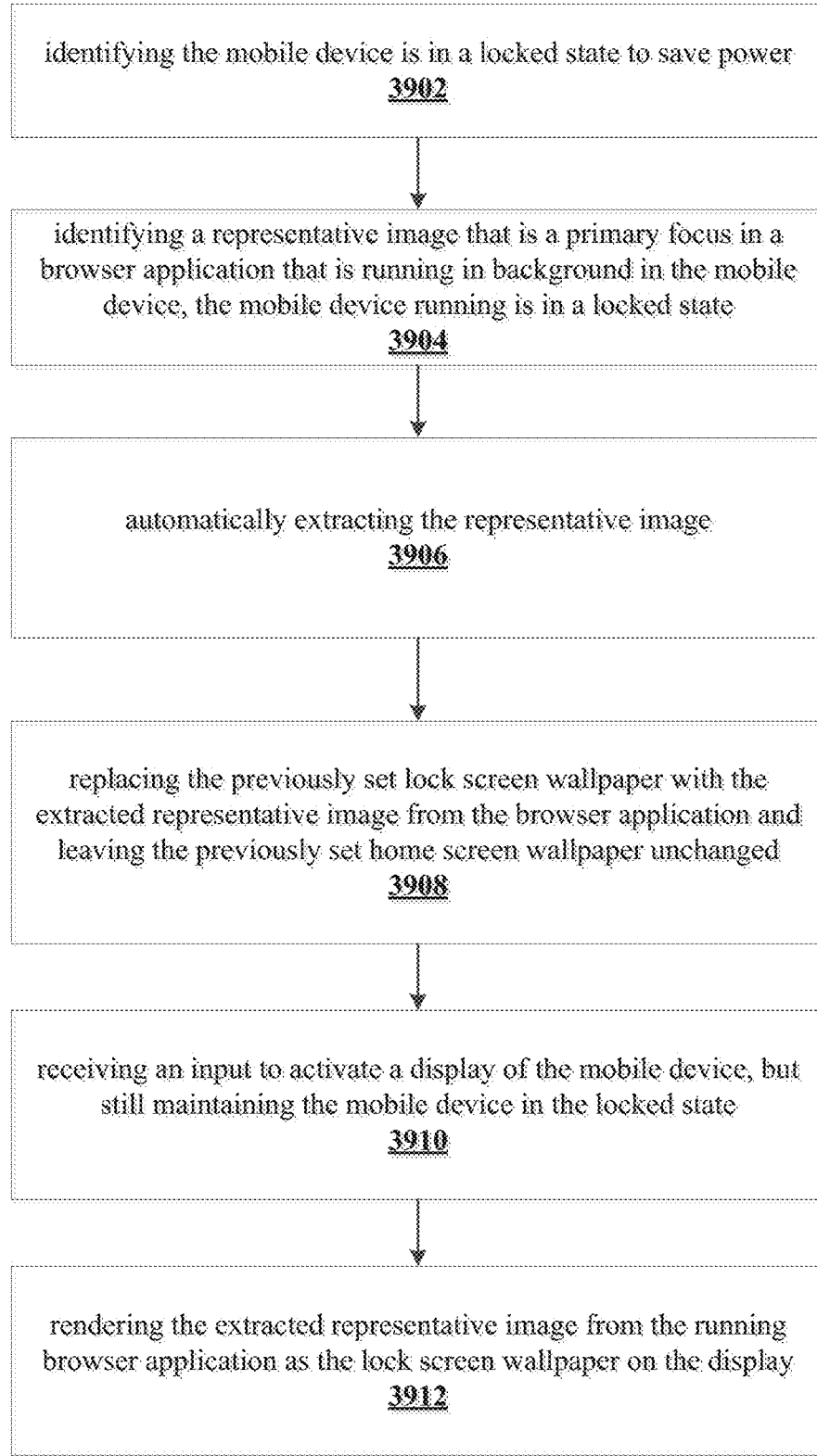
FIG. 39 depicts another embodiment where an image that is a primary focus in a browser application is used to replace a lock screen wallpaper of a mobile device.

In one embodiment, as depicted in FIG. 39, the present invention discloses a method as implemented in a mobile device having a previously set lock screen wallpaper and a previously set home screen wallpaper, the method comprising: identifying the mobile device is in a locked state to save power—step 3802; identifying a representative image that is a primary focus in a browser application that is running in background in the mobile device, the mobile device running is in a locked state (low power state)—step 3904; automatically extracting the representative image—step 3806; replacing the previously set lock screen wallpaper with the extracted representative image from the browser application and leaving the previously set home screen wallpaper unchanged—step 3908; receiving an input to activate a display of the mobile device, but still maintaining the mobile device in the locked state—step 3910; rendering the extracted representative image from the running browser application as the lock screen wallpaper on the display—step 3912; and wherein the extracted representative image used as lock screen wallpaper providing a glimpse into the browser application running in background, without having to unlock the mobile device. In another embodiment, the present invention discloses an article of manufacture having non-transitory computer readable storage medium comprising computer readable program code executable by a processor in a mobile device to implement the method depicted in FIG. 39.

Figure 40:
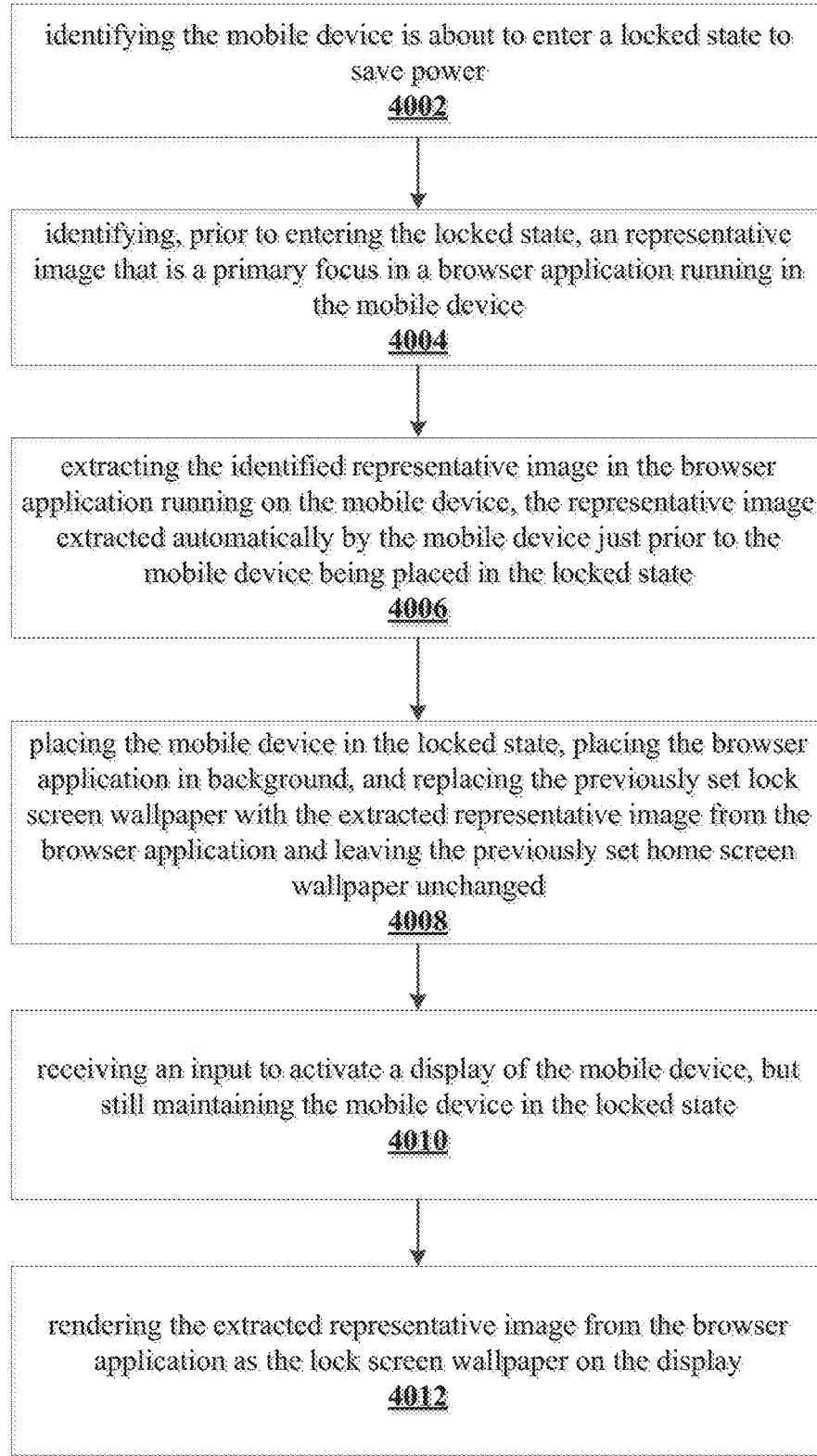
FIG. 40 depicts another embodiment where an image that is a primary focus in a browser application is identified, prior to a mobile device entering a locked state, and is used to replace a lock screen wallpaper of a mobile device.

In one embodiment, as depicted in FIG. 40, the present invention discloses a method as implemented in a mobile device having a previously set lock screen wallpaper and a previously set home screen wallpaper, the method comprising: identifying the mobile device is about to enter a locked state to save power—step 4002; identifying, prior to entering the locked state, a representative image that is a primary focus in a browser application running in the mobile device—step 4004; extracting the identified representative image in the browser application running on the mobile device, the representative image extracted automatically by the mobile device just prior to the mobile device being placed in the locked state—step 4006; placing the mobile device in the locked state, placing the browser application in background, and replacing the previously set lock screen wallpaper with the extracted representative image from the browser application and leaving the previously set home screen wallpaper unchanged—step 4008; receiving an input to activate a display of the mobile device, but still maintaining the mobile device in the locked state—step 4010; rendering the extracted representative image from the browser application as the lock screen wallpaper on the display—step 4012; and wherein the extracted representative image used as lock screen wallpaper providing a glimpse into the browser application running in background, without having to unlock the mobile device. In another embodiment, the present invention discloses an article of manufacture having non-transitory computer readable storage medium comprising computer readable program code executable by a processor in a mobile device to implement the method depicted in FIG. 40.

The users may store in a profile a list of URLs for which images may be extracted for rendering as a lock screen wallpaper (where only images from these URLS are allowed to be extracted).

Also, while this example is used to illustrate a single image that is the primary focus, the present invention may be used similarly when there are a plurality of images (e.g., when the browser application has more than one image that was being viewed by the user prior to the mobile device entering the screen locked state or prior to the browser application being pushed to run in the background), where each of the plurality of images may be rendered as the lock screen wallpaper in a successive fashion similar to what was described previously in FIG. 15 and FIG. 16. Similarly, a plurality of images that are in the primary focus may also be rendered using collage or transparency techniques as described previously with regards to FIG. 19 and FIG. 20 and as shown in FIGS. 55A-C.

Navigation Application

Figure 41:
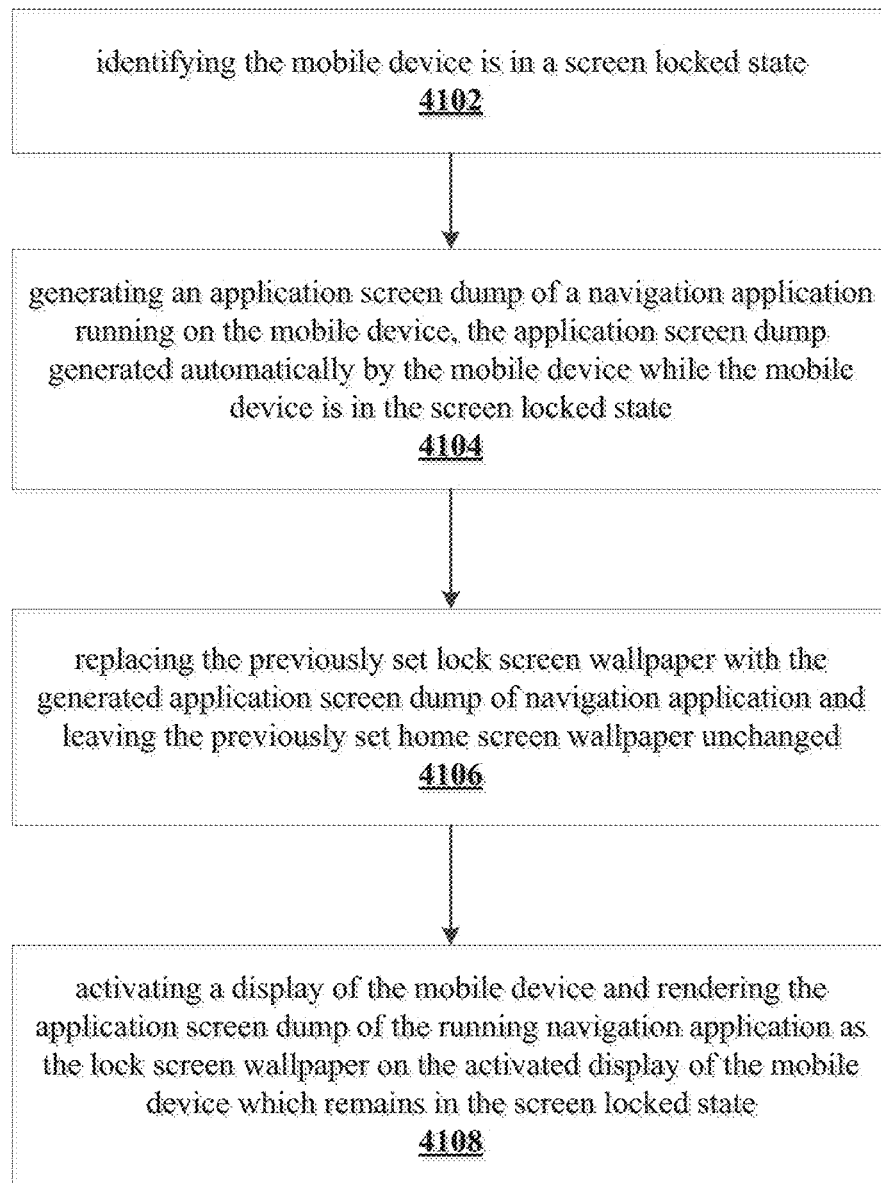
FIG. 41 depicts another embodiment where a screenshot of a navigation application is used to replace the lock screen wallpaper of a mobile device.

In one embodiment, as depicted in FIG. 41, the present invention discloses a method as implemented in a mobile device having a previously set lock screen wallpaper and a previously set home screen wallpaper, the method comprising: identifying the mobile device is in a screen locked state—step 4102; generating an application screen dump of a navigation application running on the mobile device, the application screen dump generated automatically by the mobile device while the mobile device is in the screen locked state—step 4104; replacing the previously set lock screen wallpaper with the generated application screen dump of navigation application and leaving the previously set home screen wallpaper unchanged—step 4106; activating a display of the mobile device and rendering the application screen dump of the running navigation application as the lock screen wallpaper on the activated display of the mobile device which remains in the screen locked state—step 4108; and wherein the generated application screen dump used as lock screen wallpaper providing a glimpse into the running navigation application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 41.

Figure 42:
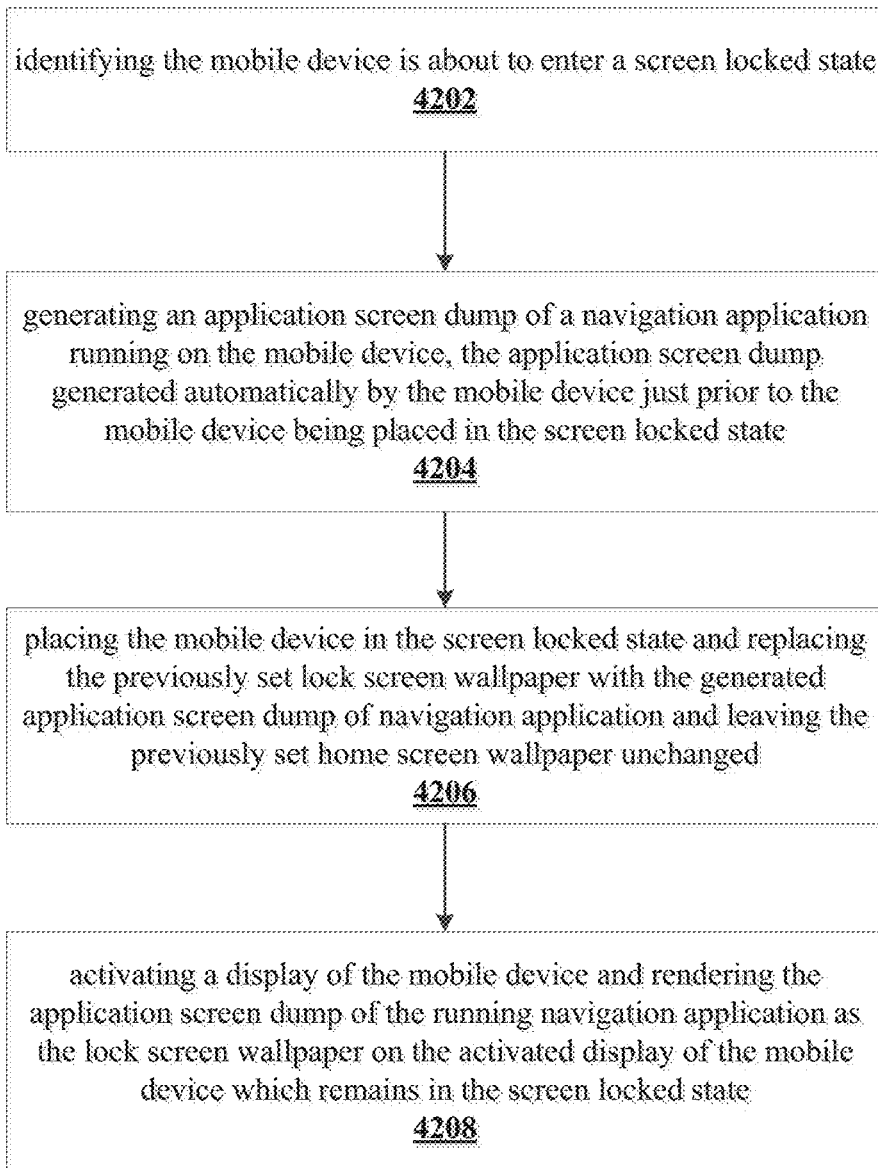
FIG. 42 depicts another embodiment where a screenshot of a navigation application is used to replace the lock screen wallpaper of a mobile device and where the screenshot is generated just prior to the mobile device being placed in a locked state.

In one embodiment, as depicted in FIG. 42, the present invention discloses a method as implemented in a mobile device having a previously set lock screen wallpaper and a previously set home screen wallpaper, the method comprising: identifying the mobile device is about to enter a screen locked state— step 4202; generating an application screen dump of a navigation application running on the mobile device, the application screen dump generated automatically by the mobile device just prior to the mobile device being placed in the screen locked state—step 4204; placing the mobile device in the screen locked state and replacing the previously set lock screen wallpaper with the generated application screen dump of navigation application and leaving the previously set home screen wallpaper unchanged—step 4206; activating a display of the mobile device and rendering the application screen dump of the running navigation application as the lock screen wallpaper on the activated display of the mobile device which remains in the screen locked state—step 4208; and wherein the generated application screen dump used as lock screen wallpaper providing a glimpse into the running navigation application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 42.

Figure 43:
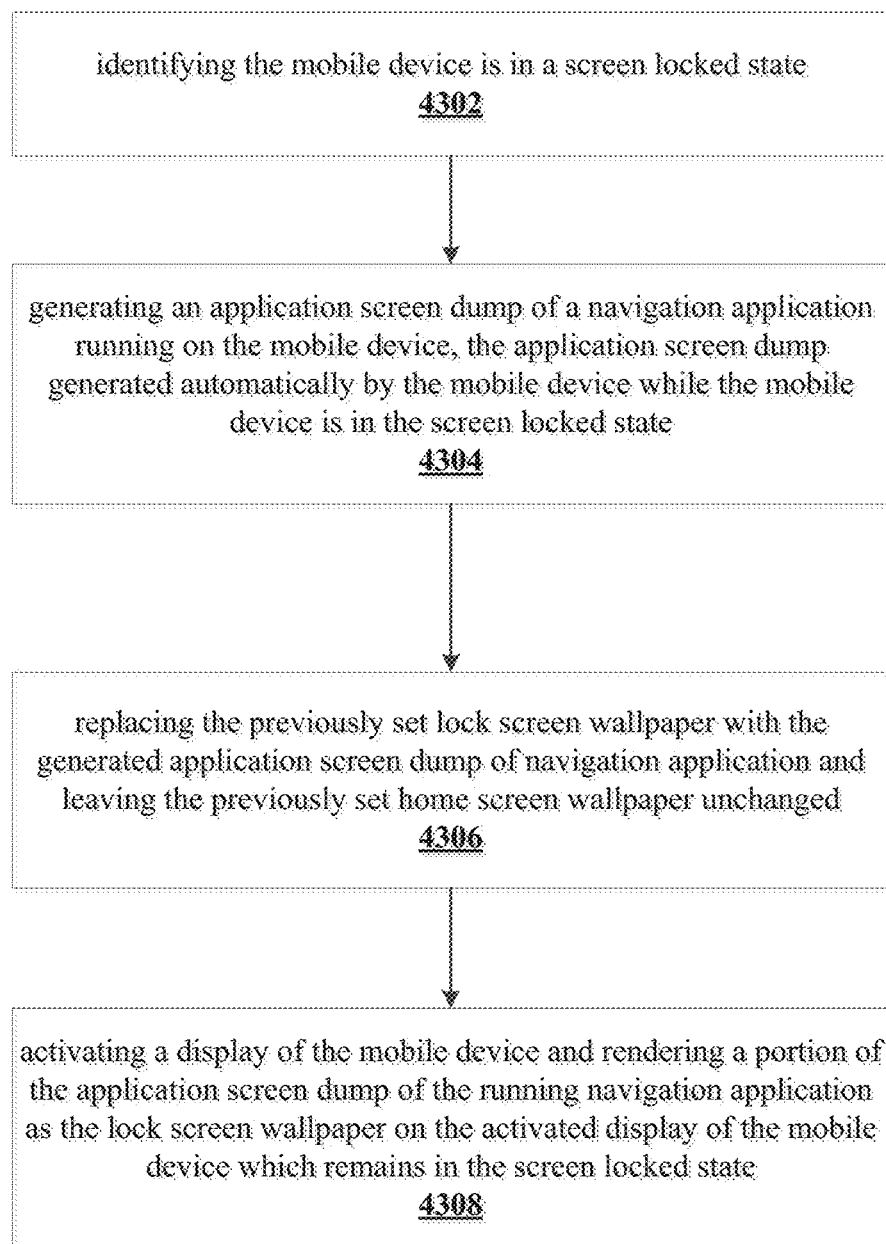
FIG. 43 depicts another embodiment where a portion of an application screen dump of a navigation application is used to replace the lock screen wallpaper of a mobile device.

In one embodiment, as depicted in FIG. 43, the present invention discloses a method as implemented in a mobile device having a previously set lock screen wallpaper and a previously set home screen wallpaper, the method comprising: identifying the mobile device is in a screen locked state—step 4302; generating an application screen dump of a navigation application running on the mobile device, the application screen dump generated automatically by the mobile device while the mobile device is in the screen locked state—step 4304; replacing the previously set lock screen wallpaper with the generated application screen dump of navigation application and leaving the previously set home screen wallpaper unchanged—step 4306; activating a display of the mobile device and rendering a portion of the application screen dump of the running navigation application as the lock screen wallpaper on the activated display of the mobile device which remains in the screen locked state—step 4308; and wherein the portion of the application screen dump used as lock screen wallpaper providing a glimpse into the running navigation application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 43.

Figure 44:
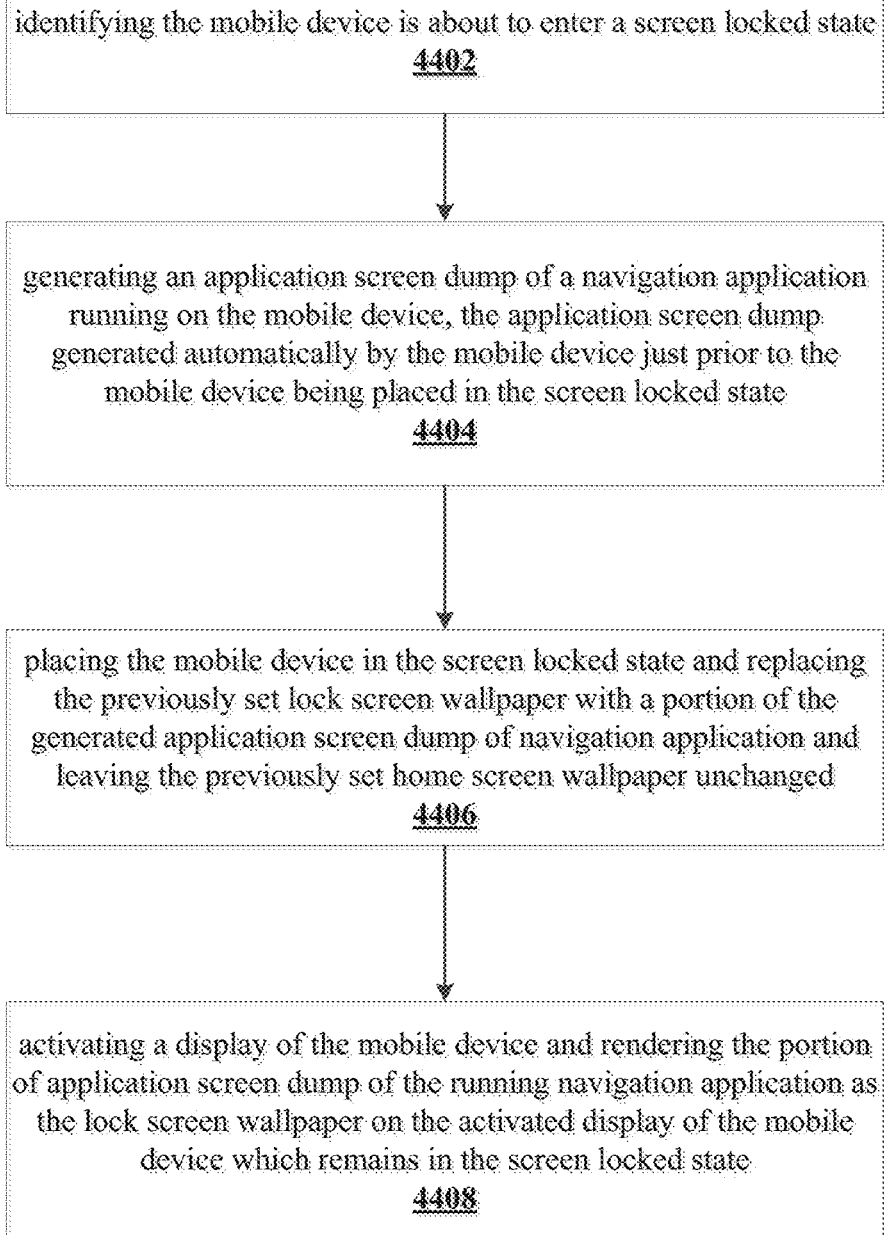
FIG. 44 depicts another embodiment where a portion of an application screen dump of a navigation application is used to replace the lock screen wallpaper of a mobile device and where the application screen dump is generated just prior to the mobile device being placed in a locked state.

In one embodiment, as depicted in FIG. 44, the present invention discloses a method as implemented in a mobile device having a previously set lock screen wallpaper and a previously set home screen wallpaper, the method comprising: identifying the mobile device is about to enter a screen locked state—step 4402; generating an application screen dump of a navigation application running on the mobile device, the application screen dump generated automatically by the mobile device just prior to the mobile device being placed in the screen locked state—step 4404; placing the mobile device in the screen locked state and replacing the previously set lock screen wallpaper with a portion of the generated application screen dump of navigation application and leaving the previously set home screen wallpaper unchanged—step 4406; activating a display of the mobile device and rendering the portion of application screen dump of the running navigation application as the lock screen wallpaper on the activated display of the mobile device which remains in the screen locked state—step 4408; and wherein the portion of application screen dump used as lock screen wallpaper providing a glimpse into the running navigation application on the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 44.

Figure 45:
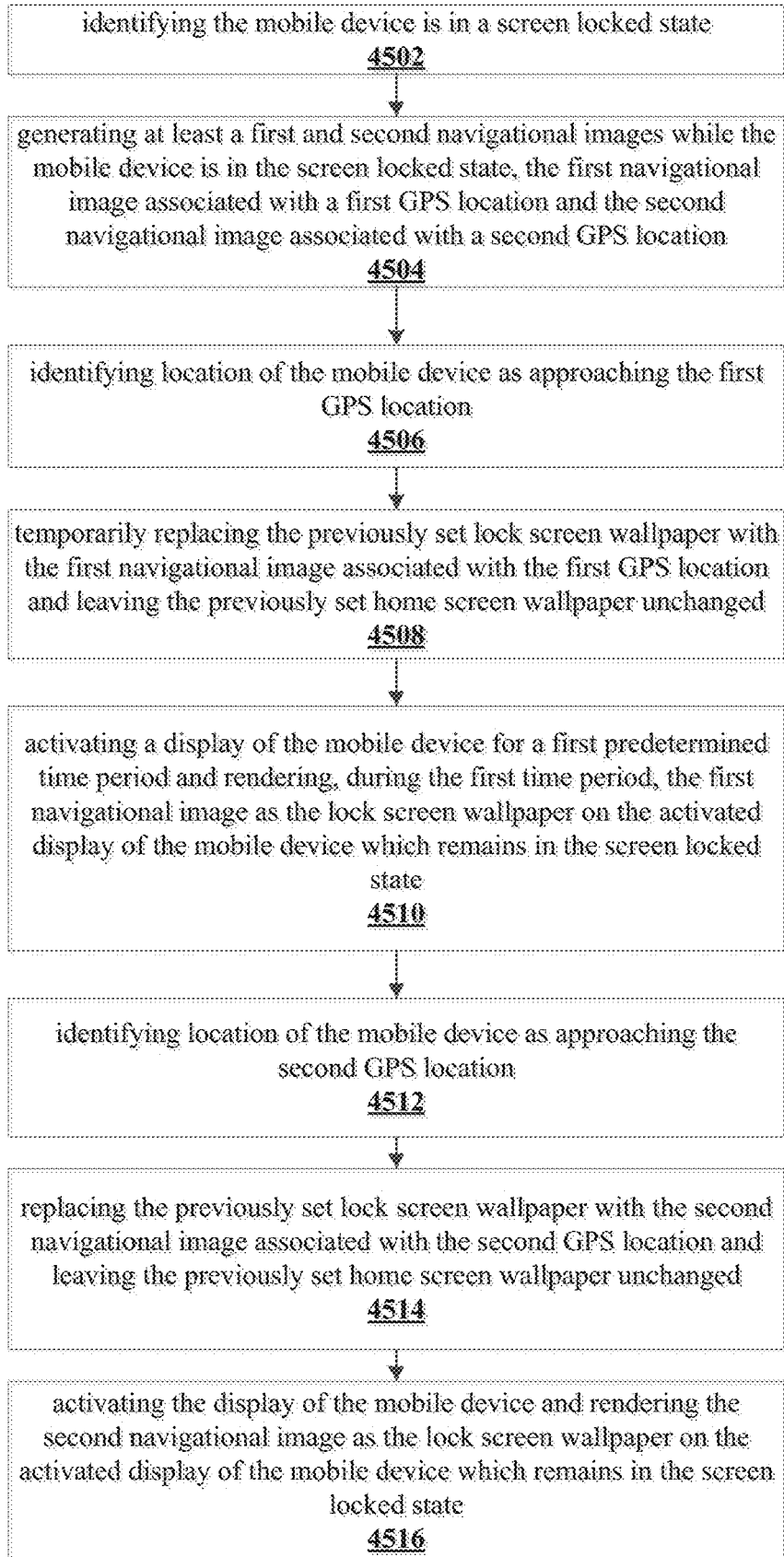
FIG. 45 depicts another embodiment where a first and second navigational image are used as lock screen wallpapers at a first and second GPS location.

In one embodiment, as depicted in FIG. 45, the present invention discloses a method as implemented in a mobile device having a previously set lock screen wallpaper and a previously set home screen wallpaper, the method comprising: identifying the mobile device is in a screen locked state—step 4502; generating at least a first and second navigational images while the mobile device is in the screen locked state, the first navigational image associated with a first GPS location and the second navigational image associated with a second GPS location—step 4504; identifying location of the mobile device as approaching the first GPS location—step 4506; temporarily replacing the previously set lock screen wallpaper with the first navigational image associated with the first GPS location and leaving the previously set home screen wallpaper unchanged—step 4508; activating a display of the mobile device for a first predetermined time period and rendering, during the first time period, the first navigational image as the lock screen wallpaper on the activated display of the mobile device which remains in the screen locked state—step 4510; identifying location of the mobile device as approaching the second GPS location—step 4512; replacing the previously set lock screen wallpaper with the second navigational image associated with the second GPS location and leaving the previously set home screen wallpaper unchanged—step 4514; and activating the display of the mobile device and rendering the second navigational image as the lock screen wallpaper on the activated display of the mobile device which remains in the screen locked state—step 4516. In another embodiment, the present invention discloses an article of manufacture having non-transitory computer readable storage medium comprising computer readable program code executable by a processor in a mobile device to implement the method depicted in FIG. 45.

Figure 46:
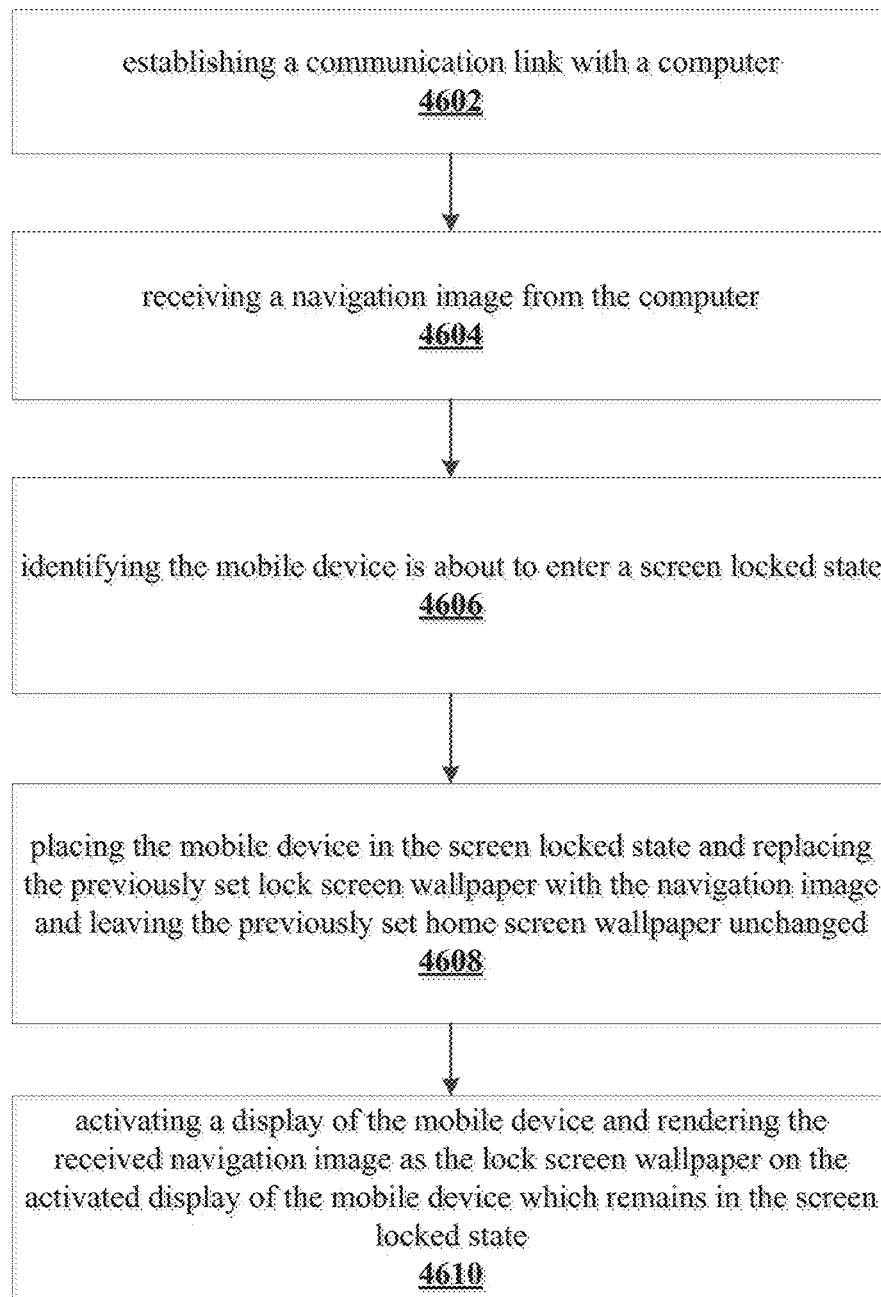
FIG. 46 depicts another embodiment where a navigation image received over a communication link is used as the lock screen wallpaper.

In one embodiment, as depicted in FIG. 46, the present invention discloses a method as implemented in a mobile device having a previously set lock screen wallpaper and a previously set home screen wallpaper, the method comprising: establishing a communication link with a computer—step 4602; receiving a navigation image from the computer—step 4604; identifying the mobile device is about to enter a screen locked state—step 4606; placing the mobile device in the screen locked state and replacing the previously set lock screen wallpaper with the navigation image and leaving the previously set home screen wallpaper unchanged—step 4608; activating a display of the mobile device and rendering the received navigation image as the lock screen wallpaper on the activated display of the mobile device which remains in the screen locked state—step 4610; and wherein the navigation image used as lock screen wallpaper providing navigation information received from the computer on the display of the mobile device in the screen locked state, without having to unlock the mobile device. In another embodiment, the present invention discloses an article of manufacture having non-transitory computer readable storage medium comprising computer readable program code executable by a processor in a mobile device to implement the method depicted in FIG. 46. In one specific implementation, the communication link is a short-range communication link like an RF communication link, an Infrared (IR) communication link, Bluetooth communication link, Near Field Communication (NFC) link, a wireless personal area network (WPAN) communication link, etc.

Figure 47:
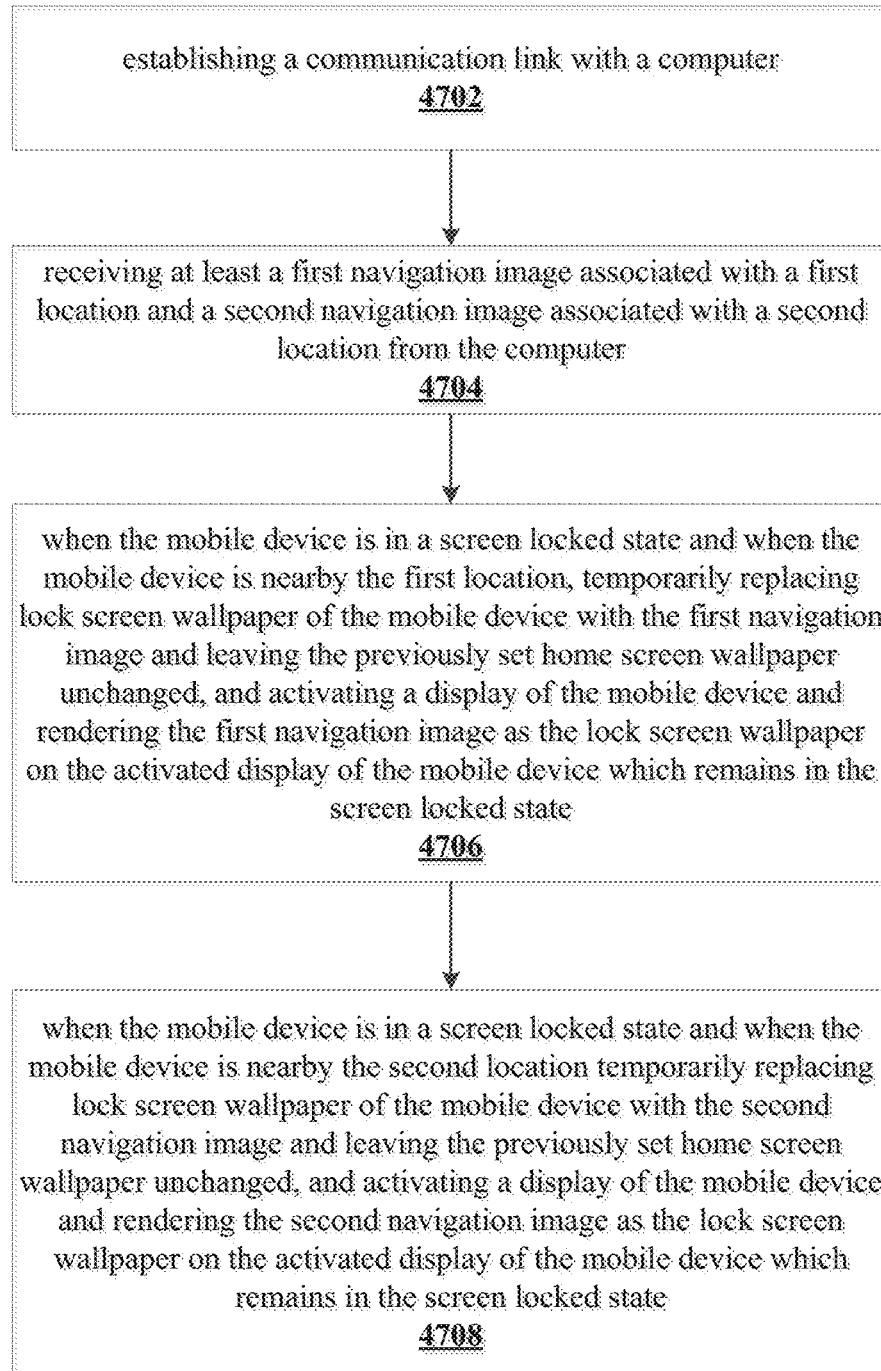
FIG. 47 depicts another embodiment where navigation images received over a communication link are used as lock screen wallpapers at different locations.

In one embodiment, as depicted in FIG. 47, the present invention discloses a method as implemented in a mobile device having a previously set lock screen wallpaper and a previously set home screen wallpaper, the method comprising: establishing a communication link with a computer—step 4702; receiving at least a first navigation image associated with a first location and a second navigation image associated with a second location from the computer—step 4704; when the mobile device is in a screen locked state and when the mobile device is nearby the first location, temporarily replacing lock screen wallpaper of the mobile device with the first navigation image and leaving the previously set home screen wallpaper unchanged, and activating a display of the mobile device and rendering the first navigation image as the lock screen wallpaper on the activated display of the mobile device which remains in the screen locked state—step 4706, and when the mobile device is in a screen locked state and when the mobile device is nearby the second location temporarily replacing lock screen wallpaper of the mobile device with the second navigation image and leaving the previously set home screen wallpaper unchanged, and activating a display of the mobile device and rendering the second navigation image as the lock screen wallpaper on the activated display of the mobile device which remains in the screen locked state—step 4708; wherein the first and second navigation images received from the computer used as lock screen wallpaper provide navigation directions proximate to the first and second locations, without having to unlock the mobile device. In another embodiment, the present invention discloses an article of manufacture having non-transitory computer readable storage medium comprising computer readable program code executable by a processor in a mobile device to implement the method depicted in FIG. 47. In one specific implementation, the communication link is a short-range communication link like an RF communication link, an Infrared (IR) communication link, Bluetooth communication link, Near Field Communication (NFC) link, a wireless personal area network (WPAN) communication link, etc.

In one embodiment, as depicted in FIG. 48, the present invention discloses a method as implemented in a mobile device having a previously set lock screen wallpaper and a previously set home screen wallpaper, the method comprising: accessing a first image (e.g., the image may be a navigation image, an image depicting information associated with the first GPS location, an image depicting information with a location-based service associated with the first GPS location, an image of a reminder associated with the first GPS location, etc.), the first image associated with a first GPS location—step 4802; identifying location of the mobile device as being within a first pre-determined radius of the first GPS location—step 4804; while the mobile device is within the first pre-determined radius of the first GPS location and while the mobile device is in a screen locked state, temporarily replacing the previously set lock screen wallpaper with the first image associated with the first GPS location and leaving the previously set home screen wallpaper unchanged—step 4806; while the mobile device is within the first pre-determined radius of the first GPS location and while the mobile device is in the screen locked state, activating a display of the mobile device (e.g., automatically activating the display of the mobile device for the first pre-determined time when the mobile device enters the first pre-determined radius of the first GPS location while the mobile device remains in the screen locked state, or receiving an input, such as a user input, that triggers the activation of the display of the mobile device which remains in the screen locked state) for a first pre-determined time period and rendering, during the pre-determined time period, the temporarily replaced image as the lock screen wallpaper on the activated display of the mobile device—step 4808, and wherein the first image used as lock screen wallpaper provides a glimpse into information associated with the first GPS location, without having to unlock the mobile device. Optionally, when the mobile device moves out of the first pre-determined radius the lock screen wallpaper may be updated to the default set lock screen wallpaper (i.e., the previously set lock screen wallpaper). In another embodiment, the present invention discloses an article of manufacture having non-transitory computer readable storage medium comprising computer readable program code executable by a processor in a mobile device to implement the method depicted in FIG. 48.

As noted in previous examples, this embodiment may also work with a plurality of images. For example, a second image and a third image may be accessed, where both the second and third image are associated with the first GPS location, where the first and second images are superimposed to form the first image associated with the first GPS location. Alternatively, transparency of at least one of the second or third image may be varied, prior to such a superimposing step (see FIGS. 55A-C), should the details of one of the images have to be emphasized more than the other. For example, if the second image need to be emphasized more than the third image (e.g., when a stored profile may indicate the preference of a user, where the user had previously identified that the third image details takes precedence over the second image details, so may want the preferred details shown more clearly in a superposition scenario), the transparency with the second image may be controlled (e.g., by varying the transparency associated with the background of the second image) (see FIGS. 55A-C) where the details of the second image is more opaque and less transparent with respect to its background, while the transparency associated with the third image may be adjusted such that its details are less opaque and more transparent with respect to its background, so when the second and third images are superimposed, the details of the second image is seen more clearly as it is rendered against a less transparent and more opaque background. Similarly, more than two images may be used as well, where the transparency of at least one of the images may be controlled for preferential viewing of the details of the at least one image. As above, each of the plurality of images may be any of the following: navigation image, image depicting information associated with the first GPS location, image depicting information with a location-based service associated with the first GPS location, or image of a reminder associated with the first GPS location.

Figure 49A:
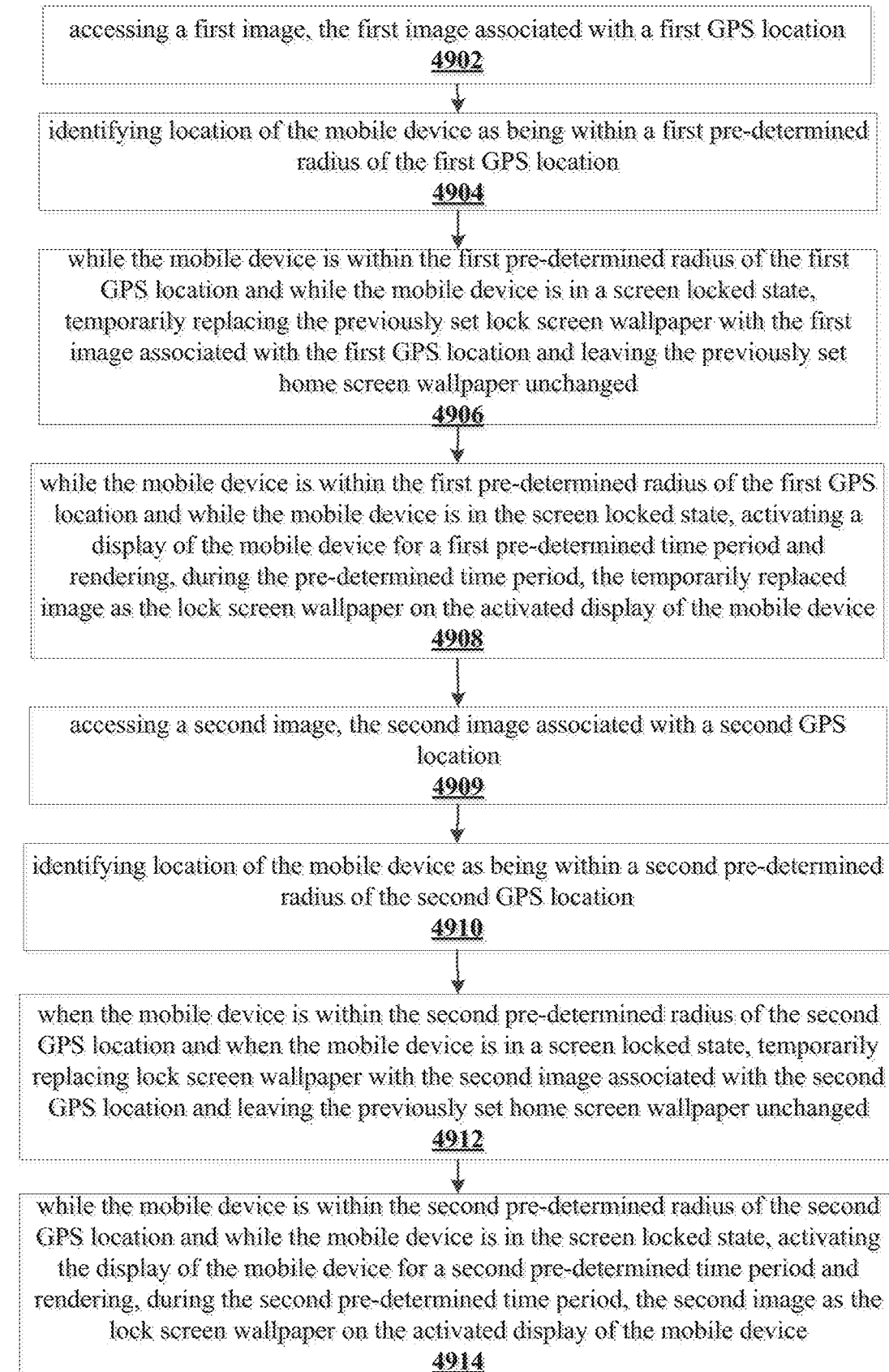
FIGS. 49A-B depict another embodiment where at least a first and second image are used as lock screen wallpapers while a mobile device is within a first and second pre-determined radius of a first and second GPS location, respectively, where the first and second pre-determined radiuses do not overlap.
Figure 49B:
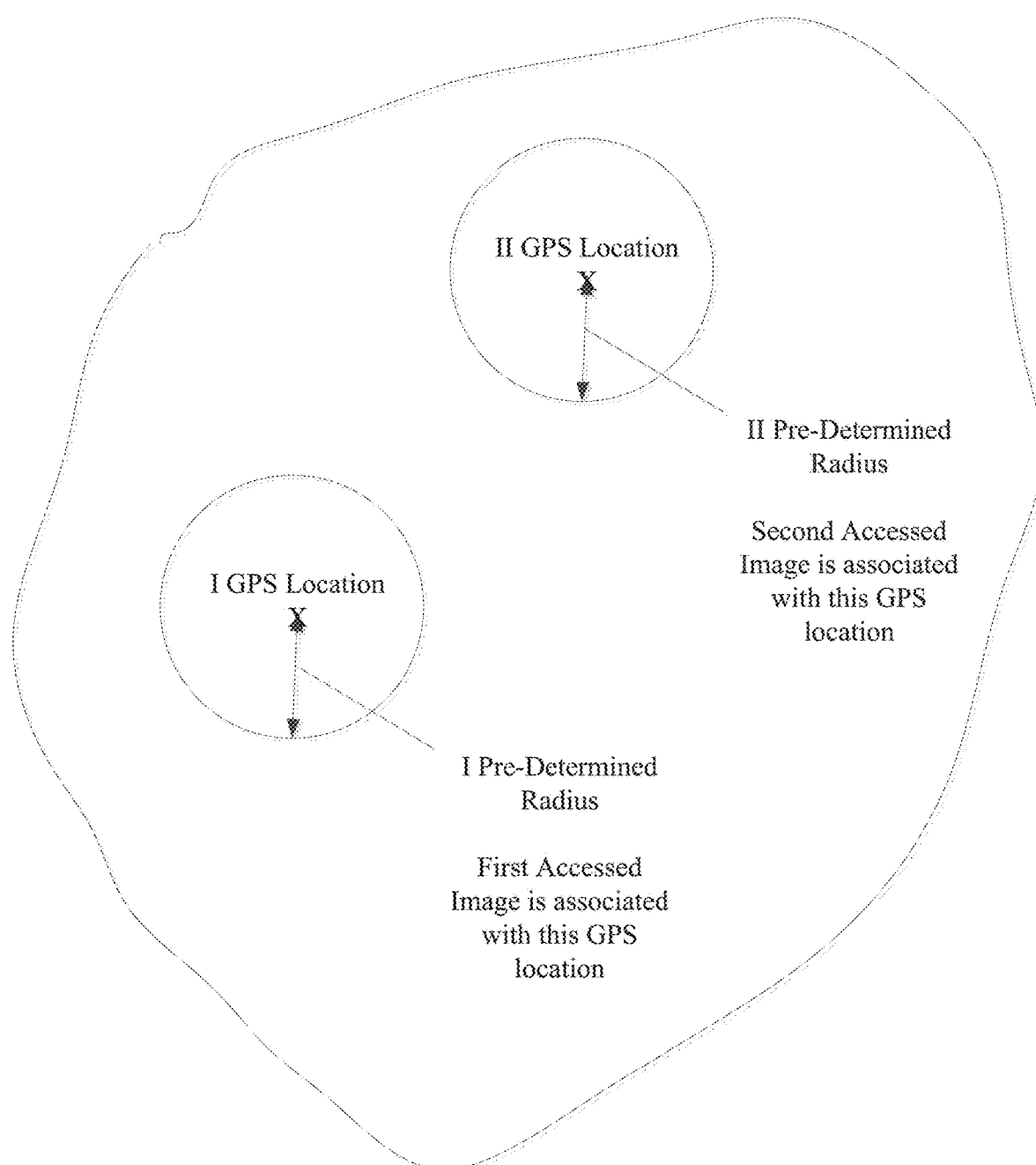

In one embodiment, as depicted in FIG. 49A, the present invention discloses a method as implemented in a mobile device having a previously set lock screen wallpaper and a previously set home screen wallpaper, the method comprising: accessing a first image (these images may be accessed either from a nearby device via short-range communication (like RF, IR, NFC, Bluetooth, etc.) or from another device over a network such as a cellular network or the Internet) (e.g., the image may be a navigation image, an image depicting information associated with the first GPS location, an image depicting information with a location-based service associated with the first GPS location, an image of a reminder associated with the first GPS location, etc.), the first image associated with a first GPS location—step 4902; identifying location of the mobile device as being within a first pre-determined radius of the first GPS location—step 4904; while the mobile device is within the first pre-determined radius of the first GPS location and while the mobile device is in a screen locked state, temporarily replacing the previously set lock screen wallpaper with the first image associated with the first GPS location and leaving the previously set home screen wallpaper unchanged—step 4906; while the mobile device is within the first pre-determined radius of the first GPS location and while the mobile device is in the screen locked state, activating a display of the mobile device (e.g., automatically activating the display of the mobile device for the first pre-determined time when the mobile device enters the first pre-determined radius of the first GPS location while the mobile device remains in the screen locked state, or receiving an input, such as a user input, that triggers the activation of the display of the mobile device which remains in the screen locked state) for a first pre-determined time period and rendering, during the pre-determined time period, the temporarily replaced image as the lock screen wallpaper on the activated display of the mobile device—step 4908, and wherein the first image used as lock screen wallpaper provides a glimpse into information associated with the first GPS location, without having to unlock the mobile device; accessing a second image, the second image associated with a second GPS location—step 4909; identifying location of the mobile device as being within a second pre-determined radius of the second GPS location—step 4910, and when the mobile device is within the second pre-determined radius of the second GPS location and when the mobile device is in a screen locked state, temporarily replacing lock screen wallpaper with the second image associated with the second GPS location and leaving the previously set home screen wallpaper unchanged—step 4912; while the mobile device is within the second pre-determined radius of the second GPS location and while the mobile device is in the screen locked state, activating the display of the mobile device for a second pre-determined time period and rendering, during the second pre-determined time period, the second image as the lock screen wallpaper on the activated display of the mobile device—step 4914, and wherein the second image used as lock screen wallpaper provides a glimpse into information associated with the second GPS location, without having to unlock the mobile device. FIG. 49B depicts a map showing the two GPS locations and their associated pre-determined radiuses as per the embodiment depicted in FIG. 49A. The first time period may be equal to the second time period and the first pre-determined radius is equal to the second pre-determined radius. As above, the first and second images may be any of the following: navigation image, image depicting information associated with the first or second GPS location, image depicting information with a location-based service associated with the first or second GPS location, image of a reminder associated with the first or second GPS location. In another embodiment, the present invention discloses an article of manufacture having non-transitory computer readable storage medium comprising computer readable program code executable by a processor in a mobile device to implement the method depicted in FIG. 49A.

Figure 50B:
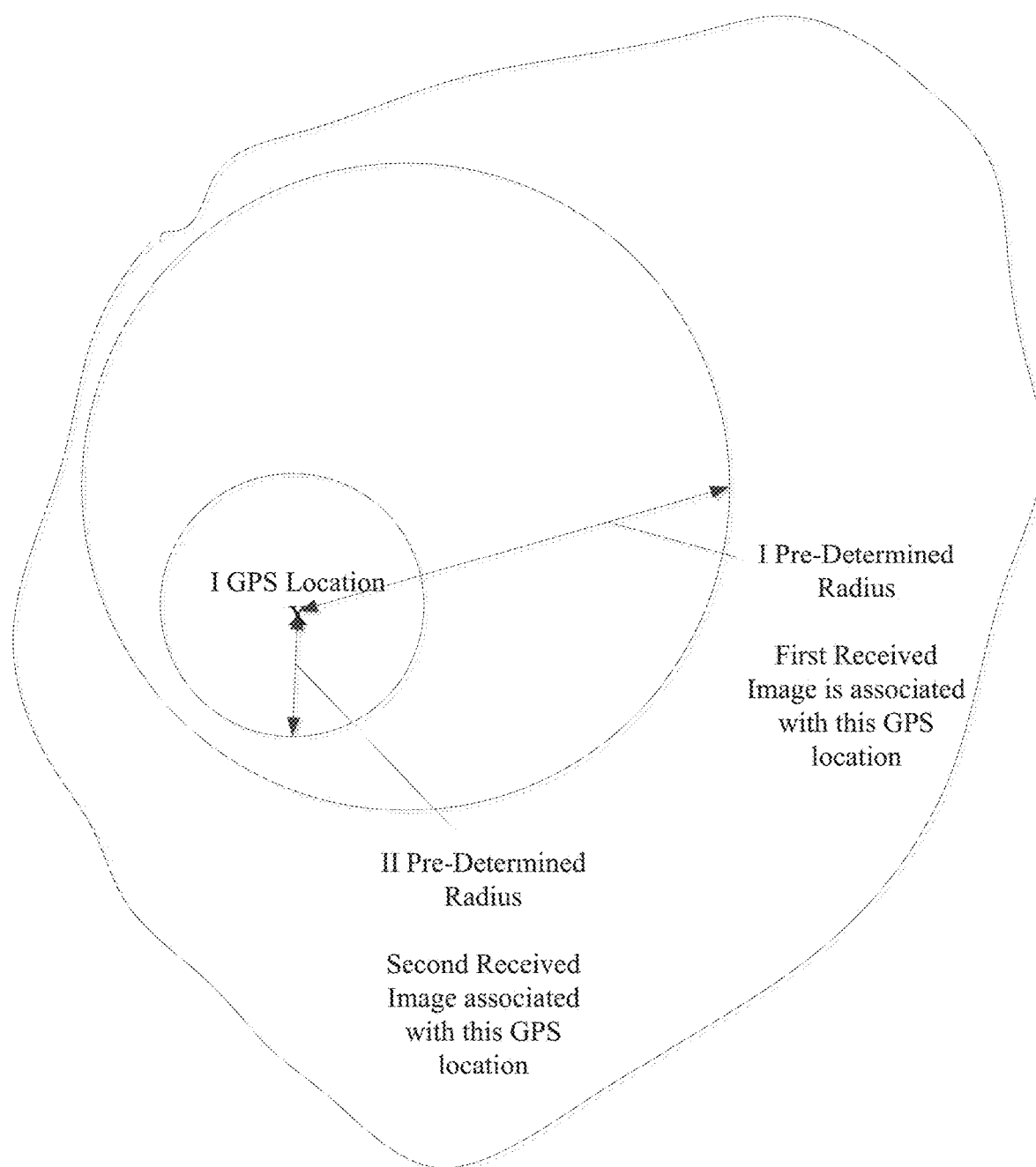

In one embodiment, as depicted in FIG. 50A, the present invention discloses a method as implemented in a mobile device having a previously set lock screen wallpaper and a previously set home screen wallpaper, the method comprising: receiving a first image and second image (such images may be received via a short range communication, such as, but not limited to, RF, IR, NFC, or Bluetooth communications with another device), both the first image and second image associated with a first GPS location—step 5002; identifying location of the mobile device as being within a first pre-determined radius of the first GPS location and outside a second pre-determined radius of the first GPS location—step 5004; while the mobile device is within the first pre-determined radius of the first GPS location and outside the second pre-determined radius of the first GPS location and while the mobile device is in a screen locked state, temporarily replacing the previously set lock screen wallpaper with the first image associated with the first GPS location and leaving the previously set home screen wallpaper unchanged—step 5006; while the mobile device is within the first pre-determined radius of the first GPS location and outside the second pre-determined radius of the first GPS location and while the mobile device is in the screen locked state, activating a display of the mobile device for a first pre-determined time period and rendering, during the first pre-determined time period, the first image as the lock screen wallpaper on the activated display of the mobile device—step 5008; identifying location of the mobile device as being within a first pre-determined radius of the first GPS location and inside a second pre-determined radius of the first GPS location—step 5010; while the mobile device is within the first pre-determined radius of the first GPS location and inside the second pre-determined radius of the first GPS location and while the mobile device is in a screen locked state, temporarily replacing lock screen wallpaper with the second image associated with the first GPS location and leaving the previously set home screen wallpaper unchanged—step 5012; while the mobile device is within the first pre-determined radius of the first GPS location and inside the second pre-determined radius of the first GPS location and while the mobile device is in the screen locked state, activating a display of the mobile device for a second pre-determined time period and rendering, during the second pre-determined time period, the second image as the lock screen wallpaper on the activated display of the mobile device—step 5014; wherein the first image and second image used as lock screen wallpaper at different distances from the first GPS location provide varying levels of information associated with the first GPS location, without having to unlock the mobile device. FIG. 50B depicts a map showing the GPS location and the two associated pre-determined radiuses as per the embodiment depicted in FIG. 50A. In another embodiment, the present invention discloses an article of manufacture having non-transitory computer readable storage medium comprising computer readable program code executable by a processor in a mobile device to implement the method depicted in FIG. 50A.

Figure 51B:
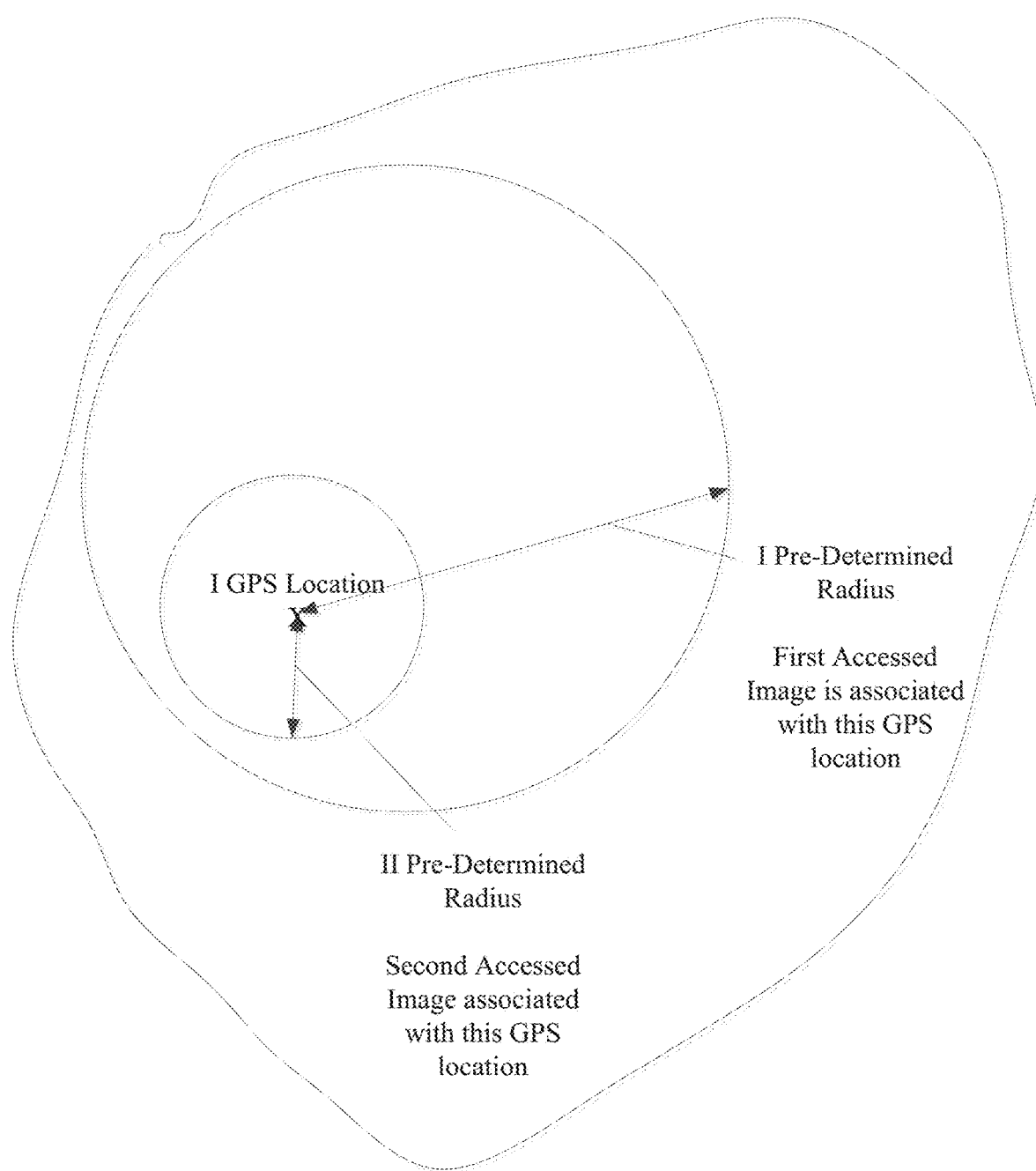

In one embodiment, as depicted in FIG. 51A, the present invention discloses a method as implemented in a mobile device having a previously set lock screen wallpaper and a previously set home screen wallpaper, the method comprising: accessing a first image and second image (these images may be accessed either from a nearby device via short-range communication (like RF, IR, NFC, Bluetooth, etc.) or from another device over a network such as a cellular network or the Internet), both the first image and second image associated with a first GPS location—step 5102; identifying location of the mobile device as being within a first pre-determined radius of the first GPS location and outside a second pre-determined radius of the first GPS location—step 5104; while the mobile device is within the first pre-determined radius of the first GPS location and outside the second pre-determined radius of the first GPS location and while the mobile device is in a screen locked state, temporarily replacing the previously set lock screen wallpaper with the first image associated with the first GPS location and leaving the previously set home screen wallpaper unchanged—step 5106; while the mobile device is within the first pre-determined radius of the first GPS location and outside the second pre-determined radius of the first GPS location and while the mobile device is in the screen locked state, activating a display of the mobile device for a first pre-determined time period and rendering, during the first pre-determined time period, the first image as the lock screen wallpaper on the activated display of the mobile device—step 5108; identifying location of the mobile device as being within a first pre-determined radius of the first GPS location and inside a second pre-determined radius of the first GPS location—step 5110; while the mobile device is within the first pre-determined radius of the first GPS location and inside the second pre-determined radius of the first GPS location and while the mobile device is in a screen locked state, temporarily replacing lock screen wallpaper with the second image associated with the first GPS location and leaving the previously set home screen wallpaper unchanged—step 5112; while the mobile device is within the first pre-determined radius of the first GPS location and inside the second pre-determined radius of the first GPS location and while the mobile device is in the screen locked state, activating a display of the mobile device for a second pre-determined time period and rendering, during the second pre-determined time period, the second image as the lock screen wallpaper on the activated display of the mobile device—step 5114; wherein the first image and second image used as lock screen wallpaper at different distances from the first GPS location provides varying levels of information associated with the first GPS location, without having to unlock the mobile device. FIG. 51B depicts a map showing the GPS location and the two associated pre-determined radiuses as per the embodiment depicted in FIG. 51A. In another embodiment, the present invention discloses an article of manufacture having non-transitory computer readable storage medium comprising computer readable program code executable by a processor in a mobile device to implement the method depicted in FIG. 51A.

Figure 52A:
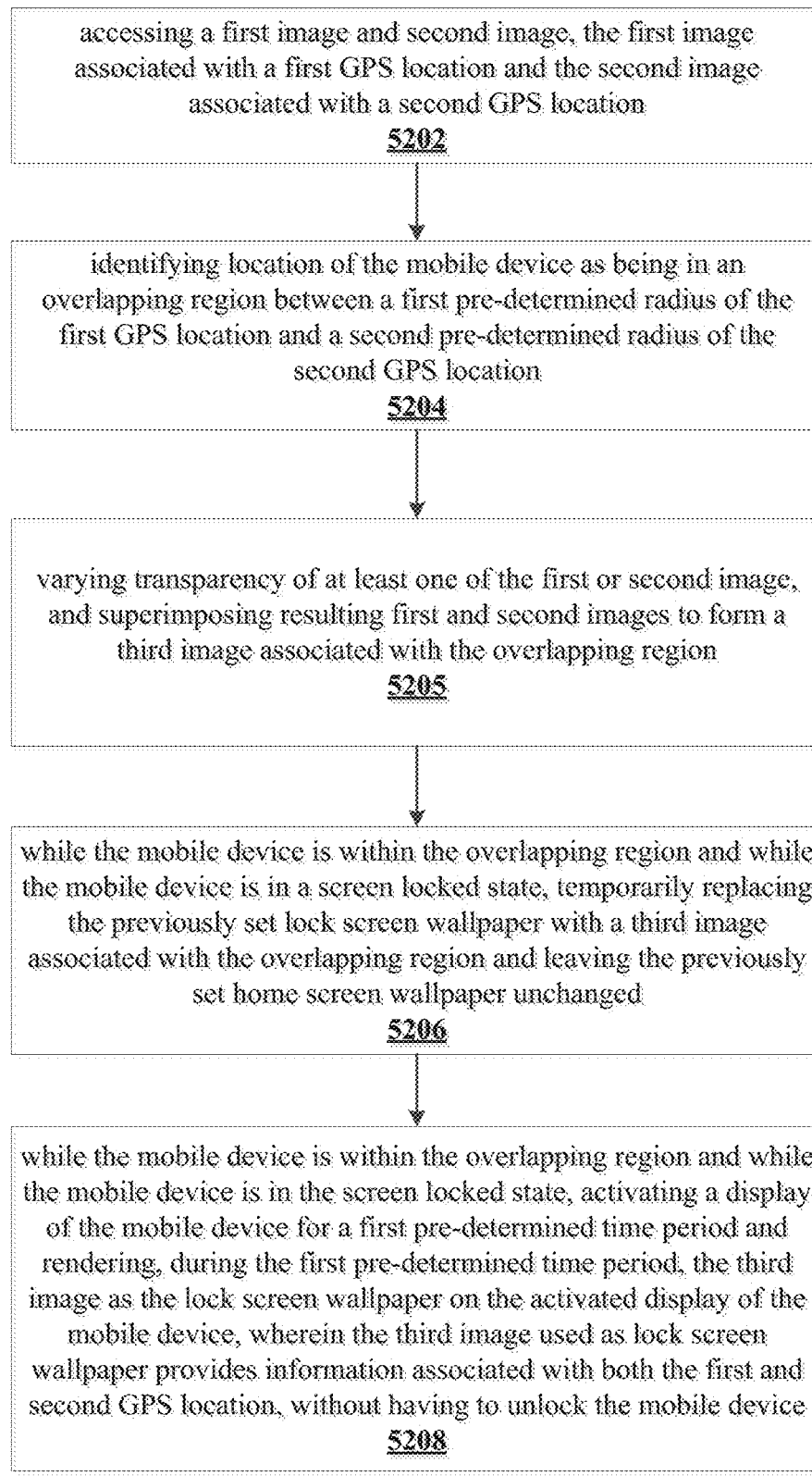
FIGS. 52A-B depict another embodiment where a third image, formed by superimposing and varying transparency of a first accessed image and a second accessed image, is used as a lock screen wallpaper while a mobile device is within an overlapping region formed by a first pre-determined radius and a second pre-determined radius associated with first and second GPS locations, respectively.
Figure 52B:
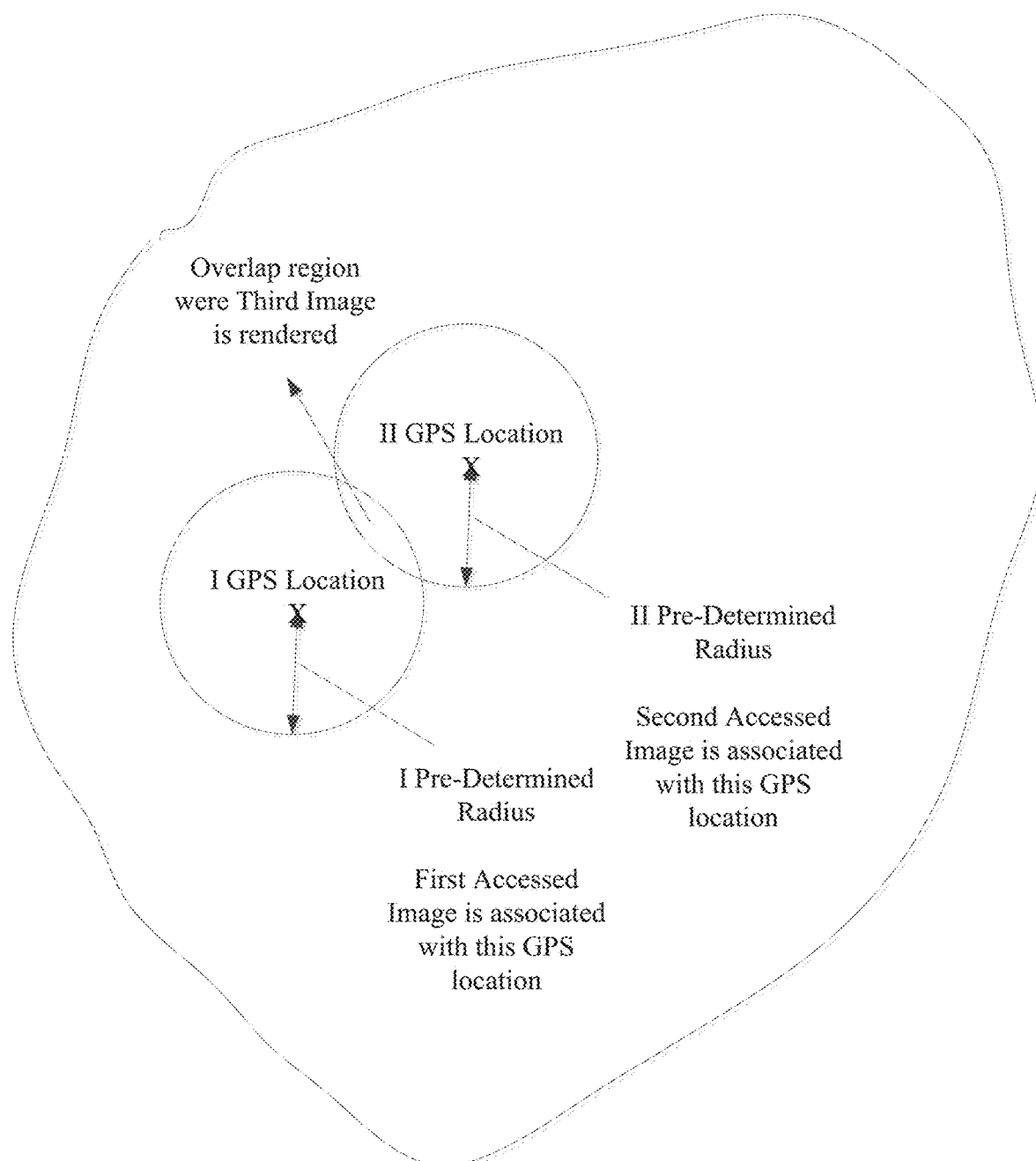

In one embodiment, as depicted in FIG. 52A, the present invention discloses a method as implemented in a mobile device having a previously set lock screen wallpaper and a previously set home screen wallpaper, the method comprising: accessing a first image and second image (these images may be accessed either from a nearby device via short-range communication (like RF, IR, NFC, Bluetooth, etc.) or from another device over a network such as a cellular network or the Internet), the first image associated with a first GPS location and the second image associated with a second GPS location—step 5202; identifying location of the mobile device as being in an overlapping region between a first pre-determined radius of the first GPS location and a second pre-determined radius of the second GPS location—step 5204; varying transparency of at least one of the first or second image, and superimposing resulting first and second images to form a third image (see FIGS. 55A-C) associated with the overlapping region—step 5205; while the mobile device is within the overlapping region and while the mobile device is in a screen locked state, temporarily replacing the previously set lock screen wallpaper with a third image associated with the overlapping region and leaving the previously set home screen wallpaper unchanged—step 5206; while the mobile device is within the overlapping region and while the mobile device is in the screen locked state, activating a display of the mobile device for a first pre-determined time period and rendering, during the first pre-determined time period, the third image as the lock screen wallpaper on the activated display of the mobile device, wherein the third image used as lock screen wallpaper provides information associated with both the first and second GPS location, without having to unlock the mobile device—step 5208. FIG. 52B depicts a map showing the two GPS locations, the two associated pre-determined radiuses, and the overlap region as per the embodiment depicted in FIG. 52A. In another embodiment, the present invention discloses an article of manufacture having non-transitory computer readable storage medium comprising computer readable program code executable by a processor in a mobile device to implement the method depicted in FIG. 52A.

Figure 53A:
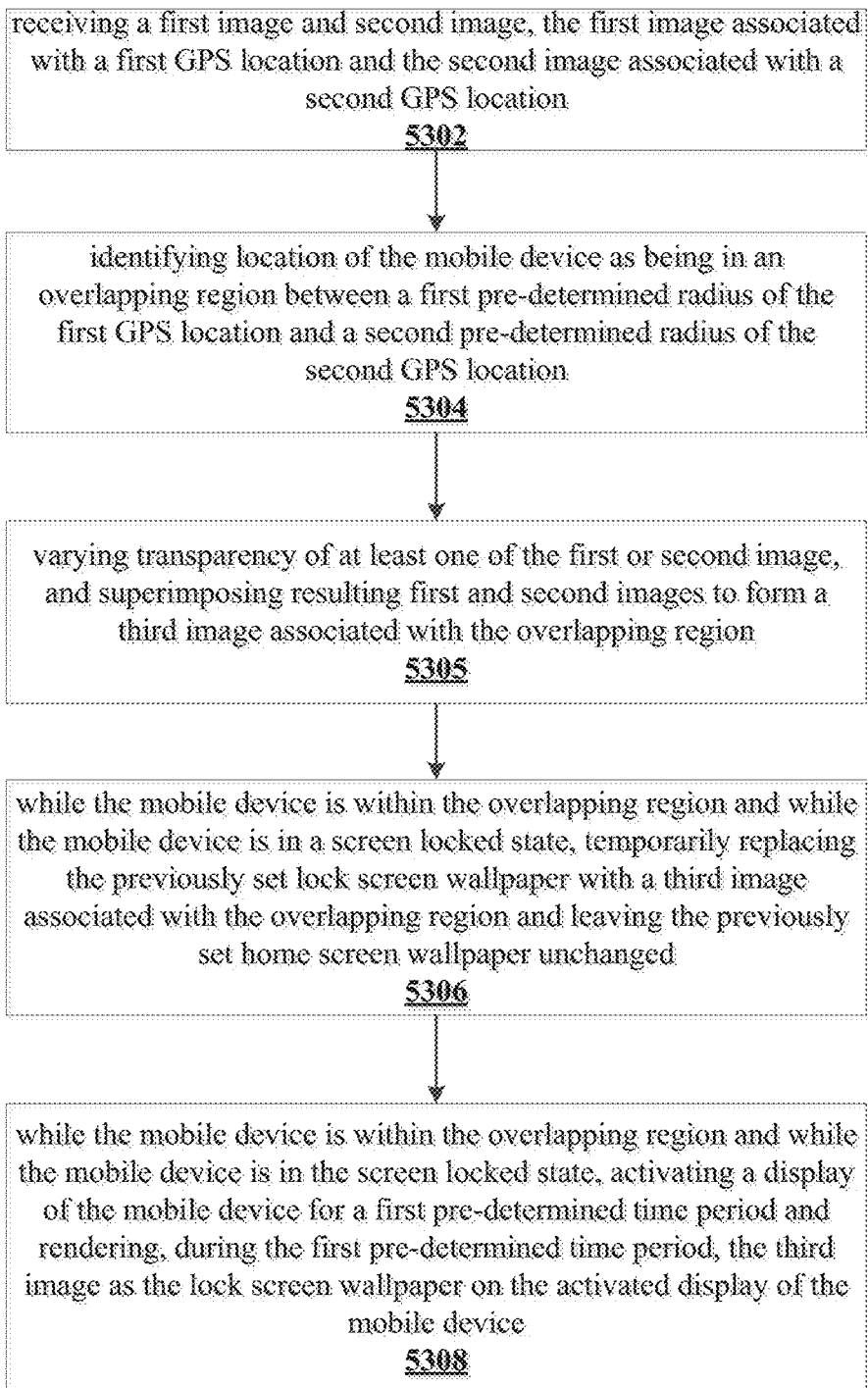
FIGS. 53A-B depict another embodiment where a third image, formed by superimposing and varying transparency of a first received image and a second received image, is used as a lock screen wallpaper while a mobile device is within an overlapping region formed by a first pre-determined radius and a second pre-determined radius associated with first and second GPS locations, respectively.
Figure 53B:
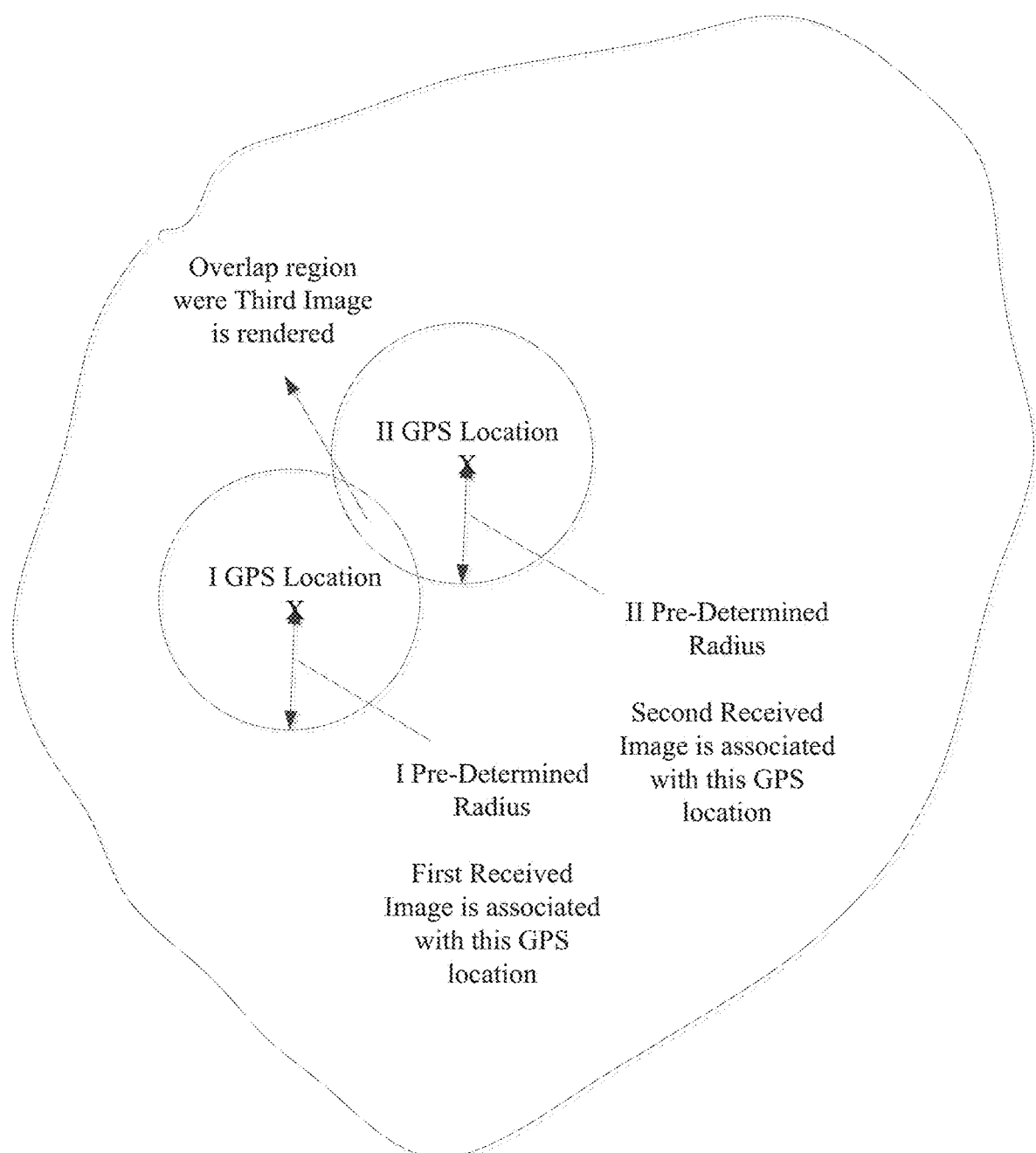

In one embodiment, as depicted in FIG. 53, the present invention discloses a method as implemented in a mobile device having a previously set lock screen wallpaper and a previously set home screen wallpaper, the method comprising: receiving a first image and second image (such images may be received via a short range communication, such as, but not limited to, RF, IR, NFC, or Bluetooth communications with another device), the first image associated with a first GPS location and the second image associated with a second GPS location—step 5302; identifying location of the mobile device as being in an overlapping region between a first pre-determined radius of the first GPS location and a second pre-determined radius of the second GPS location—step 5304; varying transparency of at least one of the first or second image, and superimposing resulting first and second images to form a third image (see FIGS. 55A-C) associated with the overlapping region; while the mobile device is within the overlapping region and while the mobile device is in a screen locked state, temporarily replacing the previously set lock screen wallpaper with a third image associated with the overlapping region and leaving the previously set home screen wallpaper unchanged—step 5306; while the mobile device is within the overlapping region and while the mobile device is in the screen locked state, activating a display of the mobile device for a first pre-determined time period and rendering, during the first pre-determined time period, the third image as the lock screen wallpaper on the activated display of the mobile device—step 5308, wherein the third image used as lock screen wallpaper provides information associated with both the first and second GPS location, without having to unlock the mobile device. FIG. 53B depicts a map showing the two GPS locations, the two associated pre-determined radiuses, and the overlap region as per the embodiment depicted in FIG. 53A. In another embodiment, the present invention discloses an article of manufacture having non-transitory computer readable storage medium comprising computer readable program code executable by a processor in a mobile device to implement the method depicted in FIG. 53A.

Figure 54:
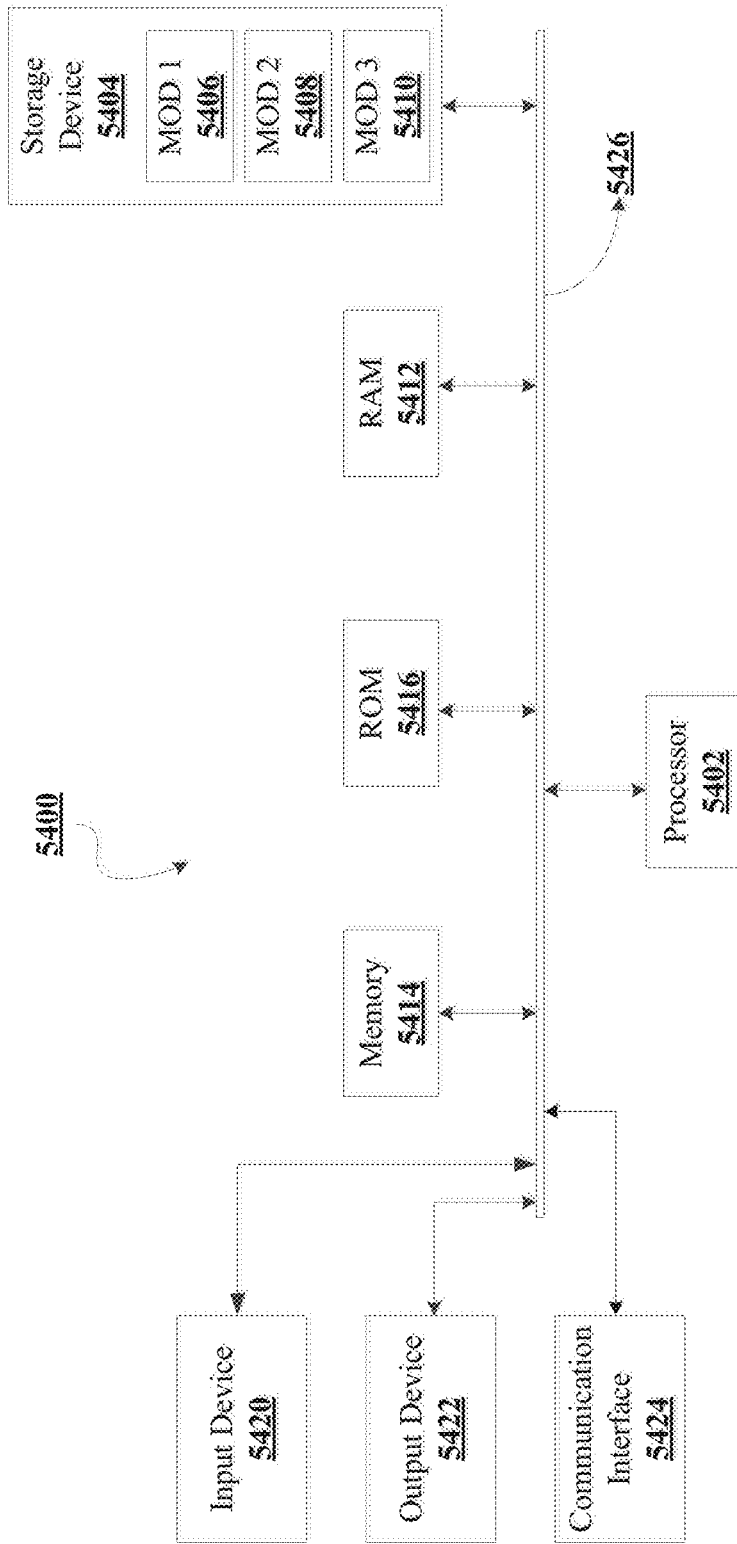
FIG. 54 depicts an exemplary system including a general-purpose computing device used to practice various methods described in FIG. 9 through FIGS. 53A-B.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 5400 shown in FIG. 54 can practice all or part of the recited methods, can be a part of the recited systems, and/or can operate according to instructions in the recited non-transitory computer-readable storage media. With reference to FIG. 54, an exemplary system includes a general-purpose computing device 5400, including a processing unit (e.g., CPU) 5402 and a system bus 5426 that couples various system components including the system memory such as read only memory (ROM) 5416 and random access memory (RAM) 5412 to the processing unit 5402. Other system memory 5414 may be available for use as well. It can be appreciated that the invention may operate on a computing device with more than one processing unit 5402 or on a group or cluster of computing devices networked together to provide greater processing capability. A processing unit 5420 can include a general purpose CPU controlled by software as well as a special-purpose processor.

The computing device 5400 further includes storage devices such as a storage device 5404 such as, but not limited to, a magnetic disk drive, an optical disk drive, tape drive or the like. The storage device 5404 may be connected to the system bus 5426 by a drive interface. The drives and the associated computer readable media provide nonvolatile storage of computer readable instructions, data structures, program modules and other data for the computing device 5400. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 5400, an input device 5420 represents any number of input mechanisms, such as a microphone for speech, a touch-sensitive screen for gesture or graphical input, keyboard, mouse, motion input, speech and so forth. The output device 5422 can also be one or more of a number of output mechanisms known to those of skill in the art. In some instances, multimodal systems enable a user to provide multiple types of input to communicate with the computing device 5400. The communications interface 5424 generally governs and manages the user input and system output. There is no restriction on the invention operating on any particular hardware arrangement and therefore the basic features here may easily be substituted for improved hardware or firmware arrangements as they are developed.

Logical operations can be implemented as modules configured to control the processor 5402 to perform particular functions according to the programming of the module. FIG. 54 also illustrates three modules MOD 1 5406, MOD 2 5408 and MOD 3 5410, which are modules controlling the processor 5402 to perform particular steps or a series of steps.

These modules may be stored on the storage device 5404 and loaded into RAM 5412 or memory 5414 at runtime or may be stored as would be known in the art in other computer-readable memory locations.

Modules MOD 1 5406, MOD 2 5408 and MOD 3 5410 may, for example, be modules controlling the processor 5402 to perform the following steps of the various methods described above.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

The above embodiments show a system, method, and article of manufacture to continuously provide a glimpse into a navigation application running in the background of the mobile device that is in a screen locked state. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:

1. An article of manufacture having a non-transitory computer readable storage medium comprising computer readable program code executable by a processor in a mobile device configured to run applications in either a foreground or a background, the non-transitory computer readable storage medium comprising:

(a) computer readable program code running a navigation application in the foreground while the mobile device is not in a screen locked state;

(b) computer readable program code running another application in the foreground after placing the navigation application in the background while the mobile device is not in the screen locked state;

(c) computer readable program code receiving an input to place the mobile device in the screen locked state and responsive to the input, running both the navigation application and the another application in the background, wherein the another application running in the background is a last run application in the mobile device and the navigation application running in the background is not the last run application in the mobile device;

(d) computer readable program code accessing a profile storing at least one preference associated with the mobile device, the at least one preference in the profile identifying the navigation application running in the background for which a glimpse is to be provided when the mobile device is in the screen locked state even when the navigation application is not the last run application in the mobile device;

(e) computer readable program code activating a display of the mobile device while the mobile device remains in the screen locked state;

(f) computer readable program code rendering a first image on the display of the mobile device in the screen locked state when the mobile device is located within a first pre-determined radius, of a first GPS location but not in an overlap region between the first pre-determined radius of the first GPS location and a second pre-determined radius of a second GPS location, the first image providing the glimpse of the navigation application running in the background of the mobile device when the mobile device is at the first GPS location;

(g) computer readable program code rendering a second image on the display of the mobile device in the screen locked state when the mobile device is located in the overlap region, the second image providing the glimpse of the navigation application running in the background of the mobile device when the mobile device is in the overlap region;

(h) computer readable program code rendering a third image on the display of the mobile device in the screen locked state when the mobile device is located within the second-pre-determined radius of the second GPS location but not in the overlap region, the third image providing the glimpse of the navigation application running in the background of the mobile device when the mobile device is at the second GPS location; and wherein the first, second, and third images provide a continuous glimpse into the navigation application identified by the at least one preference stored in the profile even though the navigation application was not the last run application in the mobile device and even though the mobile device remains in the screen locked state.

2. The article of manufacture of claim 1, wherein, the input in (c) that places the mobile device in the screen lock state is a signal to screen lock the mobile device after expiration of a pre-determined time period.

3. The article of manufacture of claim 1, wherein the input in (c) that places the mobile device in a screen lock state is a user input to place the mobile device in the screen lock state.

4. The article of manufacture of claim 1, wherein the activating in step (e) is based on an instruction from the navigation application.

5. The article of manufacture of claim 1, wherein the non-transitory computer readable storage medium further comprises computer readable program code receiving another input, the another input triggering the activating of the display in (e) while the mobile device remains in the screen locked state.

6. The article of manufacture of claim 5, wherein the another input corresponds to an external button disposed on the mobile device being depressed to activate the display while the mobile device remains in the screen locked state.

7. The article of manufacture of claim 5, wherein the display is a touch screen display and the another input corresponds to a touch input to activate the display while the mobile device remains in the screen locked state.

8. The article of manufacture of claim 1, wherein the non-transitory computer readable storage medium further comprises computer readable program code, upon unlocking the mobile device, exiting the screen locked state and displaying the navigation application identified by the at least one preference in profile even though the navigation application was not the last run application in the mobile device.

9. The article of manufacture of claim 1, wherein the mobile device is any of the following: a mobile phone, a smartphone, a cellular phone, a portable media player, a tablet, a handheld gaming console, or a personal navigational device.

10. The article of manufacture of claim 9, wherein the mobile device is a smartphone.

11. The article of manufacture of claim 1, wherein the profile is accessed over a network.

12. The article of manufacture of claim 11, wherein the network is any of the following: the Internet or a cellular network.

13. The article of manufacture of claim 1, wherein the profile is locally stored in the mobile device.

14. A mobile device comprising:
a processor;
a display;
storage storing computer readable programmable code executable by the processor in a mobile device, the mobile device configured to run applications in either a foreground or a background, the storage comprising:
 (a) computer readable program code running a navigation application in the foreground while the mobile device is not in a screen locked state;
 (b) computer readable program code running another application in the foreground after placing the navigation application in the background while the mobile device is not in the screen locked state;
 (c) computer readable program code receiving an input to place the mobile device in the screen locked state and responsive to the input, running both the navigation application and the another application in the background, wherein the another application running in the background is a last run application in the mobile device and the navigation application running in the background is not the last run application in the mobile device;

(d) computer readable program code accessing a profile storing at least one preference associated with the mobile device, the at least one preference in the profile identifying the navigation application running in the background for which a glimpse is to be provided when the mobile device is in the screen locked state even when the navigation application is not the last run application in the mobile device;

(e) computer readable program code activating a display of the mobile device while the mobile device remains in the screen locked state;

(f) computer readable program code rendering a first image on the display of the mobile device in the screen locked state when the mobile device is located within a first pre-determined radius, of a first GPS location but not in an overlap region between the first pre-determined radius of the first GPS location and a second pre-determined radius of a second GPS location, the first image providing the glimpse of the navigation application running in the background of the mobile device when the mobile device is at the first GPS location;

(g) computer readable program code rendering a second image on the display of the mobile device in the screen locked state when the mobile device is located in the overlap region, the second image providing the glimpse of the navigation application running in the background of the mobile device when the mobile device is in the overlap region;

(h) computer readable program code rendering a third image on the display of the mobile device in the screen locked state when the mobile device is located within the second-pre-determined radius of the second GPS location but not in the overlap region, the third image providing the glimpse of the navigation application running in the background of the mobile device when the mobile device is at the second GPS location; and wherein the first, second, and third images provide a continuous glimpse into the navigation application identified by the at least one preference stored in the profile even though the navigation application was not the last run application in the mobile device and even though the mobile device remains in the screen locked state.

15. The mobile device of claim 14, wherein, the input in (c) that places the mobile device in the screen lock state is a signal to screen lock the mobile device after expiration of a pre-determined time period.

16. The mobile device of claim 14, wherein the input in (c) that places the mobile device in a screen lock state is a user input to place the mobile device in the screen lock state.

17. The mobile device of claim 14, wherein the activating in step (e) is based on an instruction from the navigation application.

18. The mobile device of claim 14, wherein the non-transitory computer readable storage medium further comprises computer readable program code receiving another input, the another input triggering the activating of the display in (e) while the mobile device remains in the screen locked state.

19. The mobile device of claim 18, wherein the another input corresponds to an external button disposed on the mobile device being depressed to activate the display while the mobile device remains in the screen locked state.

20. The mobile device of claim 18, wherein the display is a touch screen display and the another input corresponds to a touch input to activate the display while the mobile device remains in the screen locked state.

21. The mobile device of claim 14, wherein the non-transitory computer readable storage medium further comprises computer readable program code, upon unlocking the mobile device, exiting the screen locked state and displaying the navigation application identified by the at least one preference in profile even though the navigation application was not the last run application in the mobile device.

22. The mobile device of claim 14, wherein the mobile device is any of the following: a mobile phone, a smartphone, a cellular phone, a portable media player, a tablet, a handheld gaming console, or a personal navigational device.

23. The mobile device of claim 22, wherein the mobile device is a smartphone.

24. The mobile device of claim 14, wherein the profile is accessed over a network.

25. The mobile device of claim 24, wherein the network is any of the following: the Internet or a cellular network.

26. The mobile device of claim 14, wherein the profile is locally stored in the mobile device.

\* \* \* \* \*